United States Patent
Jakobsson

(10) Patent No.: US 12,170,738 B2
(45) Date of Patent: Dec. 17, 2024

(54) COMPOSITE CRYPTOGRAPHIC SYSTEMS WITH VARIABLE CONFIGURATION PARAMETERS AND MEMORY BOUND FUNCTIONS

(71) Applicant: Artema Labs, Inc, Los Angeles, CA (US)

(72) Inventor: Bjorn Markus Jakobsson, Portola Valley, CA (US)

(73) Assignee: Artema Labs, Inc, Los Angeles, CA (US)

( * ) Notice: Subject to any disclaimer, the term of this patent is extended or adjusted under 35 U.S.C. 154(b) by 272 days.

(21) Appl. No.: 17/806,060

(22) Filed: Jun. 8, 2022

(65) Prior Publication Data

US 2022/0393892 A1 Dec. 8, 2022

Related U.S. Application Data

(60) Provisional application No. 63/228,803, filed on Aug. 3, 2021, provisional application No. 63/228,065, filed (Continued)

(51) Int. Cl.
*H04L 9/00* (2022.01)
*H04L 9/32* (2006.01)

(52) U.S. Cl.
CPC . *H04L 9/50* (2022.05); *H04L 9/32* (2013.01)

(58) Field of Classification Search
None
See application file for complete search history.

(56) References Cited

U.S. PATENT DOCUMENTS 10,747,878 B1 8/2020 Jakobsson
10,901,983 B2 * 1/2021 Zhang ................ G06F 16/2379
(Continued)

FOREIGN PATENT DOCUMENTS

WO WO-2018126344 A1 * 7/2018 ............ G06F 21/64
WO 2022261649 A2 12/2022
WO 2022261649 A3 1/2023

OTHER PUBLICATIONS

Bentov I, Lee C, Mizrahi A, Rosenfeld M. Proof of activity: Extending bitcoin's proof of work via proof of stake [extended abstract] y. ACM Sigmetrics Performance Evaluation Review. Dec. 8, 2014;42(3):34-7. (Year: 2014).*
(Continued)

*Primary Examiner* — James R Turchen
(74) *Attorney, Agent, or Firm* — KPPB LLP

(57) ABSTRACT

Various methods for implementing cryptographic systems can reduce the likelihood of security vulnerabilities. A cryptographic system can utilize a combination of cryptographic processes to securely construct immutable ledgers and/or blockchains. These cryptographic systems can be referred to as composite cryptographic systems. A device can be configured to add a block to a distributed ledger maintained by a composite cryptographic system. The device can include a network interface, memory, and a processor. The processor can be configured to obtain a first proof using a first cryptographic system, obtain a second proof using a second cryptographic system; and broadcast a block to securely add the block to a distributed ledger. The block can be capable of being validated by using the first cryptographic system to generate the first proof and by using the second cryptographic system to generate the second proof.

25 Claims, 45 Drawing Sheets

Related U.S. Application Data on Jul. 31, 2021, provisional application No. 63/224,345, filed on Jul. 21, 2021, provisional application No. 63/208,374, filed on Jun. 8, 2021.

(56) References Cited

U.S. PATENT DOCUMENTS

| | | | |
|---|---|---|---|
| 11,017,036 B2 | 5/2021 | Jakobsson | |
| 11,093,651 B2* | 8/2021 | Qiu | G06Q 20/065 |
| 11,418,402 B1 | 8/2022 | Jakobsson et al. | |
| 2019/0294636 A1* | 9/2019 | Albrecht | G06F 16/9038 |
| 2019/0340267 A1* | 11/2019 | Vo | G06F 16/2365 |
| 2020/0050774 A1* | 2/2020 | Unagami | H04L 9/3247 |
| 2020/0364373 A1* | 11/2020 | Huang | H04L 9/3239 |
| 2020/0396072 A1* | 12/2020 | Maurer | G06F 16/2379 |
| 2021/0176202 A1* | 6/2021 | Tran | G06Q 20/389 |

OTHER PUBLICATIONS

Kan L, Wei Y, Muhammad AH, Siyuan W, Gao LC, Kai H. A multiple blockchains architecture on inter-blockchain communication. In2018 IEEE international conference on software quality, reliability and security companion (QRS-C) Jul. 16, 2018 (pp. 139-145). IEEE. (Year: 2018).*

Wu K, Dai G, Hu X, Li S, Xie X, Wang Y, Xie Y. Memory-bound proof-of-work acceleration for blockchain applications. InProceedings of the 56th Annual Design Automation Conference 2019 Jun. 2, 2019 (pp. 1-6). (Year: 2019).*

International Preliminary Report on Patentability for International Application PCT/US2022/072828, Report issued Nov. 21, 2023, Mailed on Dec. 21, 2023, 08 Pgs.

International Search Report and Written Opinion for International Application No. PCT/US2022/072828, Search completed Oct. 26, 2022, Mailed Nov. 21, 2022, 16 Pgs.

Impagliazzo et al., "Pseudo-Random Generation From One-Way Functions", STOC 1989, Proceedings of the 21st Annual ACM Symposium on Theory of Computing, Feb. 1989.

Jakobsson, Markus, "Fair and Affordable Mining", Retrieved from: http://web.archive.org/web/20210728233609/https://egni.io/wp-content/uploads/2019/03/fair_and_affordable_mining_asic-resistance_mobile_mining_markus_jakobsson-1.pdf, Wayback Machine Capture: Jul. 28, 2021.

Stewart, Guy, "The Detrimental Nature of Proofs of Work, and Risks to Cryptocurrencies", RSA Conference, Mar. 4-8, 2019, San Francisco, Presentation, Retrieved from: https://www.rsaconference.com/Library/presentation/USA/2019/the-detrimental-nature-of-proofs-of-work-and-risks-to-cryptocurrencies, 53 pgs.

* cited by examiner

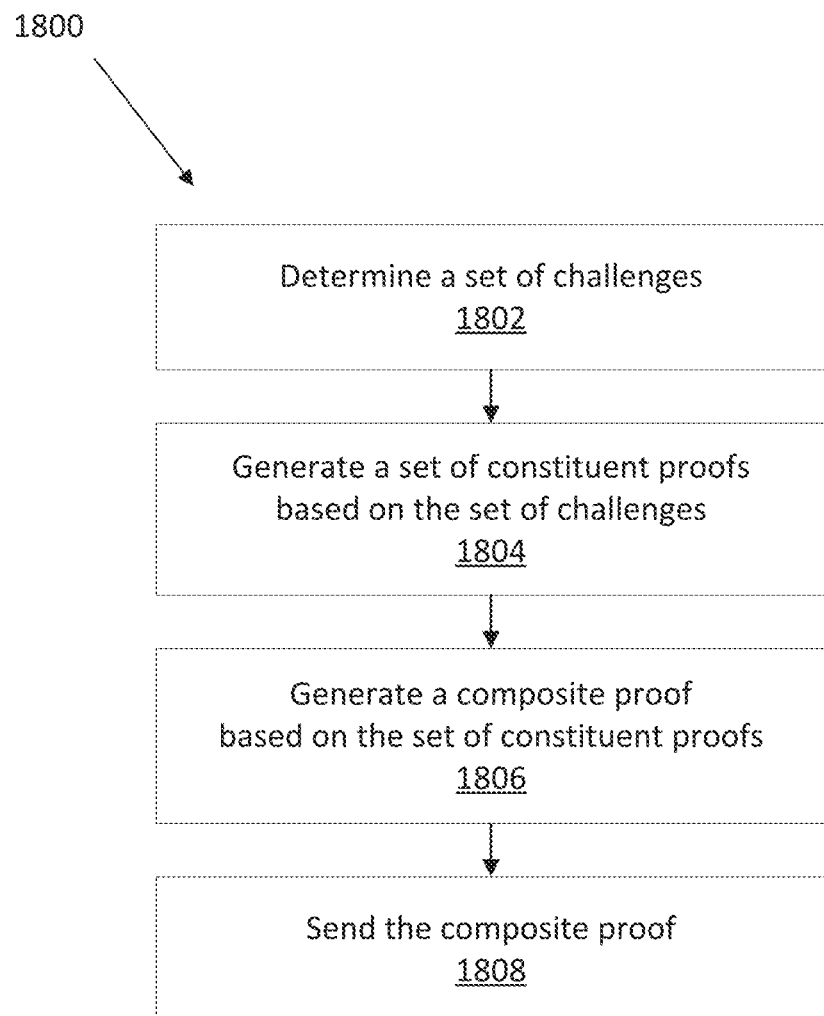
FIGURE 18.1

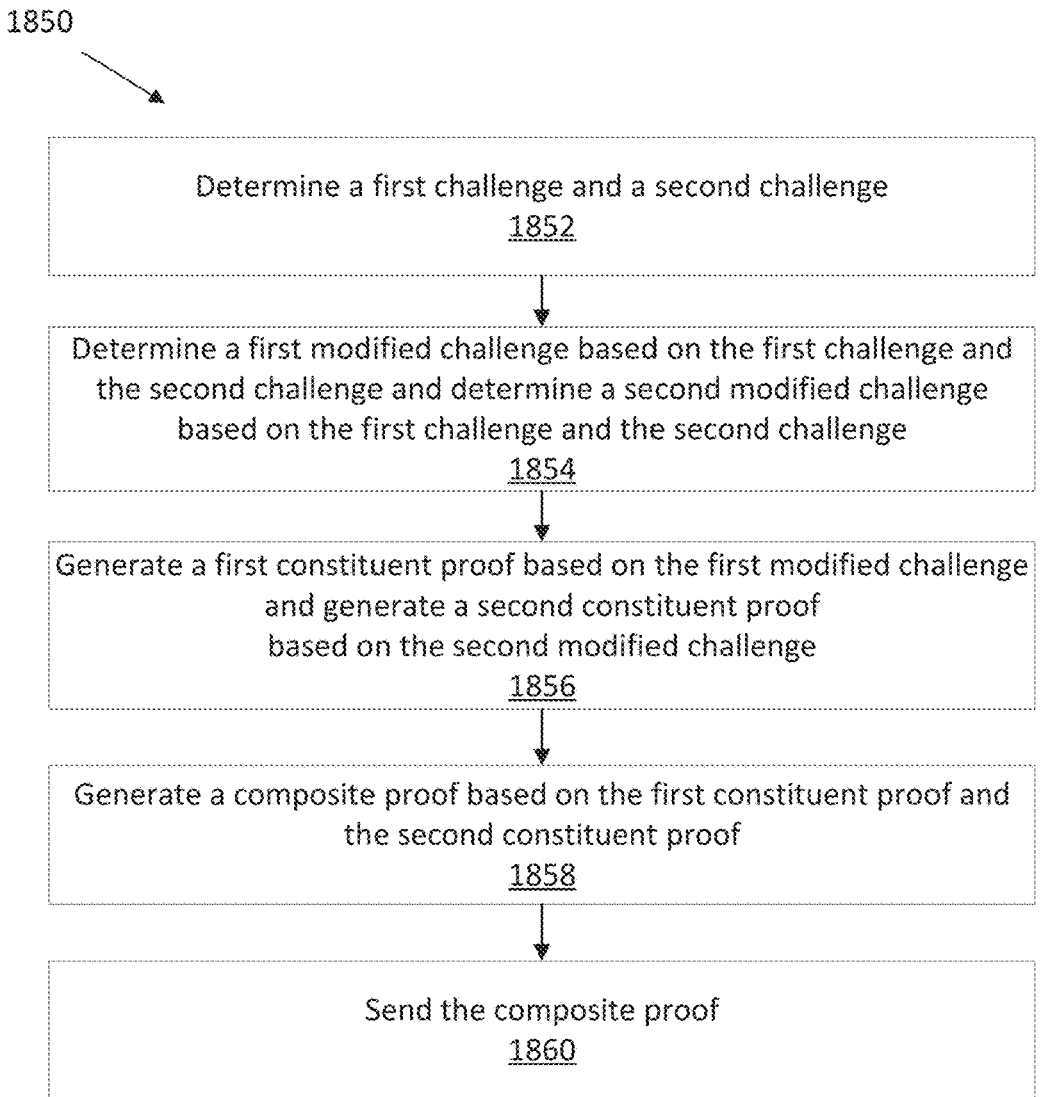
FIGURE 18.2

COMPOSITE CRYPTOGRAPHIC SYSTEMS WITH VARIABLE CONFIGURATION PARAMETERS AND MEMORY BOUND FUNCTIONS

CROSS-REFERENCE TO RELATED APPLICATIONS

The current application claims the benefit of and priority under 35 U.S.C. § 119 (e) to U.S. Provisional Patent Application No. 63/208,374 titled "Composite Cryptosystems with Automated Reparametrization", U.S. Provisional Patent Application No. 63/224,345 filed Jul. 21, 2021 titled "Cost Reduction for Crypto Mining", U.S. Provisional Patent Application No. 63/228,065 filed Jul. 31, 2021 titled "Secure Delay Function Method and Apparatus", and U.S. Provisional Patent Application No. 63/228,803 filed Aug. 3, 2021 titled "Practical Memory-Bound Delay Functions", the disclosures of which are hereby incorporated by reference in their entireties for all purposes.

FIELD OF THE INVENTION

This invention relates to cryptography. More particularly it relates to cryptographic systems for maintaining distributed ledgers.

BACKGROUND OF THE INVENTION

Cryptography can be used to provide security, privacy and authenticity to transactions. Some cryptographic components, such as digital signatures and encryption functions, are standardized and well-studied with known security characteristics. Cryptography can be used to create immutable ledgers such as (but not limited to) blockchains. Immutable ledgers and blockchains can be based on a variety of cryptographic methods. In some implementations of immutable ledgers and blockchains, mining is used to securely add information. Mining can include computer systems (often referred to as "miners") generating proofs based on computational challenges. Generally, a proof can be an output of a function that conforms to one or more requirements defined by a challenge. A proof protocol can be a function used to generate a proposed proof. The proof protocol can be iteratively performed until a proof is generated which meets the requirements of the challenge. The requirements of the challenge can be based on a difficulty. Mining can also include the use of computer systems known as "verifiers" that perform processes to check the generated proofs. In many instances, a proof can be easily verified based on providing successful inputs to a verifier. Miners and verifies can be implemented using any one or more of personal computers, application-specific integrated circuits, mobile devices (e.g. a mobile phone or tablet), server computer systems, virtual machines executing on computer systems, and/or any other form of computing device capable of performing computations associated with the performance of a particular mining or verifier function.

SUMMARY OF THE INVENTION

A device can be configured to add a block to a distributed ledger maintained by a composite cryptographic system. In an embodiment, the device includes a network interface, memory, and a processor. The processor configured to obtain a first proof using a first cryptographic system, obtain a second proof using a second cryptographic system; and broadcast a block to securely add the block to a distributed ledger. The block is capable of being validated by using the first cryptographic system to generate the first proof and by using the second cryptographic system to generate the second proof.

In another embodiment, the processor is further configured to receive the block, the first proof is obtained based on the block, and the second proof is obtained based on the block.

In a further embodiment, the first proof is generated based on an iterative process, and the second proof is generated based on an iterative process.

In still another embodiment, the processor is further configured to generate the block.

In a still further embodiment, the second proof is obtained based on at least the first proof.

In yet another embodiment, the first cryptographic system utilizes a first cryptographic process and the second cryptographic system utilizes a different cryptographic process to the first cryptographic process.

In another additional embodiment, the first proof and the second proof are each constituent proofs and the processor is further configured to combine the first proof and the second proof to obtain a composite proof.

In a further additional embodiment, the first cryptographic system utilizes a Proof of Work mechanism.

In another embodiment again, the first cryptographic system utilizes a Proof of Space mechanism.

In a further embodiment again, the first cryptographic system utilizes a Proof of Stake mechanism.

In still yet another embodiment, the first cryptographic system utilizes a Proof of Bus mechanism.

In a still yet further embodiment, the first cryptographic system utilizes a memory bound function.

In still another additional embodiment, the second cryptographic system utilizes a Proof of Work mechanism.

In a still further additional embodiment, the second cryptographic system utilizes a Proof of Space mechanism.

In still another embodiment again, the second cryptographic system utilizes a Proof of Stake mechanism.

In yet another additional embodiment, the second cryptographic system utilizes a Proof of Bus mechanism.

In a yet further additional embodiment, the second cryptographic system utilizes a memory bound function.

In yet another embodiment again, a first proof is based on a configuration parameter.

In a yet further embodiment again, obtaining a second proof is based on a configuration parameter.

In another additional embodiment again, the first cryptographic system and the second cryptographic system form a composite cryptographic system and a characteristic of a composite cryptographic system is based on a configuration parameter.

In a further additional embodiment again, the processor is further configured to vary a configuration parameter in response to a detected condition.

In still yet another additional embodiment, a configuration parameter is varied in response to a detected attack.

In another embodiment, a configuration parameter is a difficulty parameter associated with a first cryptographic system.

In a further embodiment, a configuration parameter is a difficulty parameter associated with a first cryptographic system.

In still another embodiment, the block can include the first proof.

In a still further embodiment, the block can include the second proof.

In yet another embodiment, obtaining a first proof is based on a first modified challenge.

In a yet further embodiment, obtaining a second proof is based on a second modified challenge.

In another additional embodiment, a first modified challenge is based on a first challenge and a second challenge.

In a further additional embodiment, a second modified challenge is based on a first challenge, a second challenge, and a third challenge.

In still yet another embodiment, a third challenge is based on the first proof.

In a still yet further embodiment, a first challenge is based on a state of the distributed ledger.

In still another additional embodiment, a second challenge is based on a state of the distributed ledger.

In a still further additional embodiment, wherein a first modified challenge is generated by selecting a portion of a combination of a first challenge and a second challenge.

In still another embodiment again, the selected portion has a length corresponding to an input requirement of the first cryptographic system.

In a still further embodiment again, a second modified challenge is generated by selecting a portion of a combination of a first challenge, a second challenge, and a third challenge.

In yet another additional embodiment, the selected portion has a length corresponding to an input requirement of the second cryptographic system.

A device can be device configured to add a block to a distributed ledger maintained by a cryptographic system. In an embodiment, the device includes a network interface, memory, and a processor. The processor is configured to generate a first proof based on a first configuration parameter, generate a second proof based on a second configuration parameter, and broadcast a block to securely add the block to a distributed ledger. The block is capable of being validated by generating the first proof and the second proof.

In yet another embodiment again, the processor is further configured to vary at least one of the first configuration parameter and the second configuration parameter in response to a detected condition.

In a yet further embodiment again, a configuration parameter is varied in response to a detected attack.

In another additional embodiment again, a detected condition is a number of proofs having been generated.

In another embodiment, a detected condition is an amount of time elapsing.

In a further embodiment, a detected condition is a proof generation time.

In a still further embodiment, a detected condition is detected based on a quorum agreement among one or more miners.

In yet another embodiment, a detected condition is a detection of an attack based on a quorum agreement among one or more miners.

In a yet further embodiment, a detected condition is a detection of an attack based on comparing long-term proof interarrival times and short-term proof interarrival times.

In another additional embodiment, a detected condition is a detection of an attack based on receiving two consecutive proofs, wherein the two consecutive proofs are both capable of being validated utilizing a first cryptographic system.

In a further additional embodiment, the processor is further configured to receive the block, the first proof is obtained based on the block, and the second proof is obtained based on the block.

In another embodiment again, the first proof is generated based on an iterative process, and the second proof is generated based on an iterative process.

In a further embodiment again, the processor is further configured to generate the block.

In still yet another embodiment, the second proof is obtained based on at least the first proof.

In a still yet further embodiment, the first proof is obtained using a first cryptographic system and the second proof is obtained using a second cryptographic system.

In still another additional embodiment, the first cryptographic system utilizes a first cryptographic process and the second cryptographic system utilizes a different cryptographic process to the first cryptographic process.

In a still further additional embodiment, the first proof and the second proof are each constituent proofs and the processor is further configured to combine of the first proof and the second proof to obtain a composite proof.

In still another embodiment again, the first proof is obtained utilizing a Proof of Work mechanism.

In a still further embodiment again, the first proof is obtained utilizing a Proof of Space mechanism.

In yet another additional embodiment, the first proof is obtained utilizing a Proof of Stake mechanism.

In yet another embodiment again, the first proof is obtained utilizing a Proof of Bus mechanism.

In a yet further embodiment again, the first proof is obtained utilizing a memory bound function.

In another additional embodiment again, the second proof is obtained utilizing a Proof of Work mechanism.

In a further additional embodiment again, the second proof is obtained utilizing a Proof of Space mechanism.

In still yet another additional embodiment, the second proof is obtained utilizing a Proof of Stake mechanism.

In another embodiment, the second proof is obtained utilizing a Proof of Bus mechanism.

In a further embodiment, the second proof is obtained utilizing a memory bound function.

In a still further embodiment, the first cryptographic system and the second cryptographic system form a composite cryptographic system. A characteristic of the composite cryptographic system is based on a configuration parameter.

In yet another embodiment, a configuration parameter is a difficulty parameter associated with a first cryptographic system.

In a yet further embodiment, a configuration parameter is a difficulty parameter associated with a first cryptographic system.

In another additional embodiment, the block can include the first proof.

In a further additional embodiment, the block can include the second proof.

In another embodiment again, obtaining a first proof is based on a first modified challenge.

In a further embodiment again, obtaining a second proof is based on a second modified challenge.

In still yet another embodiment, a first modified challenge is based on a first challenge and a second challenge.

In a still yet further embodiment, a second modified challenge is based on a first challenge, a second challenge, and a third challenge.

In a still further additional embodiment, a third challenge is based on the first proof.

In still another embodiment again, a first challenge is based on a state of the distributed ledger.

In a still further embodiment again, a second challenge is based on a state of the distributed ledger.

In yet another additional embodiment, a first modified challenge is generated by selecting a portion of a combination of a first challenge and a second challenge.

In yet another embodiment again, the selected portion has a length corresponding to an input requirement of the first cryptographic system.

In a yet further embodiment again, a second modified challenge is generated by selecting a portion of a combination of a first challenge, a second challenge, and a third challenge.

In another additional embodiment again, the selected portion has a length corresponding to an input requirement of the second cryptographic system.

A device can be configured to add a block to a distributed ledger maintained by a cryptographic system. In an embodiment the device includes a network interface, memory, and a processor. The processor is configured to obtain a qualitative proof, obtain a qualifying proof based at least on the qualitative proof, and broadcast a block to securely add the block to a distributed ledger. The block is capable of being validated by generating the qualitative proof and by generating the qualifying proof.

In a further additional embodiment again, the processor is further configured to obtain the qualifying proof conditional on obtaining the qualitative proof.

In still yet another additional embodiment, the qualitative proof is generated based on a limited search space.

In still another additional embodiment, the limited search space is defined based on a configuration parameter.

In another embodiment, a configuration parameter is varied in response to a detected condition.

In a further embodiment, a configuration parameter is varied in response to a detected attack.

A device can be configured to add a block to a distributed ledger maintained by a cryptographic system. In an embodiment the device includes a network interface, memory, and a processor. The processor is configured to obtain a first proof, obtain a second proof, and broadcast a block to securely add the block to a distributed ledger. The block is capable of being validated by generating the first proof based on a first identity and by generating the second proof.

In a still further embodiment, the first identity is a public key.

In yet another embodiment, the first identity corresponds to a transferrable fungible asset.

In a yet further embodiment, the first identity corresponds to a transferrable non-fungible asset.

In another additional embodiment, the block is received and wherein the first proof is obtained based on the block, and the second proof is obtained based on the block.

In a further additional embodiment, the first proof is generated based on an iterative process, and the second proof is generated based on an iterative process.

In another embodiment again, the processor is further configured to generate the block.

In a still further additional embodiment, the second proof is obtained based on at least the first proof.

In still another embodiment again, the first proof is obtained using a first cryptographic system and the second proof is obtained using a second cryptographic system.

In a still further embodiment again, the first cryptographic system utilizes a first cryptographic process and the second cryptographic system utilizes a different cryptographic process to the first cryptographic process.

In yet another additional embodiment, the block is capable of being validated by generating the first proof based on a first identity and by generating the second proof based on a second identity.

In yet another embodiment again, the first identity is associated with a first search space.

In a yet further embodiment again, the second identity is associated with a second search space.

In another additional embodiment again, the first identity is associated with a first configuration parameter.

In a further additional embodiment again, the second identity is associated with a second configuration parameter.

A device can be configured to add a block to a distributed ledger maintained by a cryptographic system. In an embodiment, the device includes a network interface, memory, and a processor. The processor is configured to generate a first proof, wherein generating the first proof is iterative. Each iteration includes loading a graph into a cache, generating a partial proof based on the graph, and determining whether a partial proof matches a target. The processor is further configured to broadcast a block to securely add the block to a distributed ledger. The block is capable of being validated by validating the first proof.

In still yet another additional embodiment, each iteration is associated with waiting for responses to memory requests.

In a further embodiment, each iteration further comprises loading data block by block into the cache.

In still another embodiment, the graph is based on a seed.

In a still further embodiment again, the seed is received.

In yet another additional embodiment, the graph is a table.

In another embodiment, the table can be contained within at least one level of a memory caching hierarchy of the device.

In a still further embodiment, the table is non-indexable.

In yet another embodiment, the table is indexable.

In a yet further embodiment, each table entry in the table is determined based on a seed and an identifier.

In another additional embodiment, the processor is further configured to generate the block.

In a further additional embodiment, the block comprises a witness that enables efficient verification of the block.

A device can be configured to add a block to a distributed ledger maintained by a cryptographic system. In an embodiment the device includes a network interface, memory, and a processor. The processor is configured to obtain a first proof, perform a secure delay function, and broadcast a block to securely add the block to a distributed ledger. The block is capable of being validated by generating the first proof.

In another embodiment again, the secure delay function is performed based on the first proof.

In a further embodiment again, performing the secure delay function comprises selecting a value from a range.

In still yet another embodiment, the range can be based on an identifier.

In yet another embodiment again, the identifier is a public key. performing the delay function comprises selecting a value from a range.

In a yet further embodiment again, performing the delay function includes transmitting a secure delay function request to a proxy, and receiving a secure delay function response from the proxy.

In another additional embodiment again, the proxy is a network resource.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 18.1 conceptually illustrates an example of a process for generating a composite proof.

FIG. 18.2 conceptually illustrates an example of a process for generating a composite proof based on constituent proofs generated in parallel.

DETAILED DESCRIPTION

Figure 1:
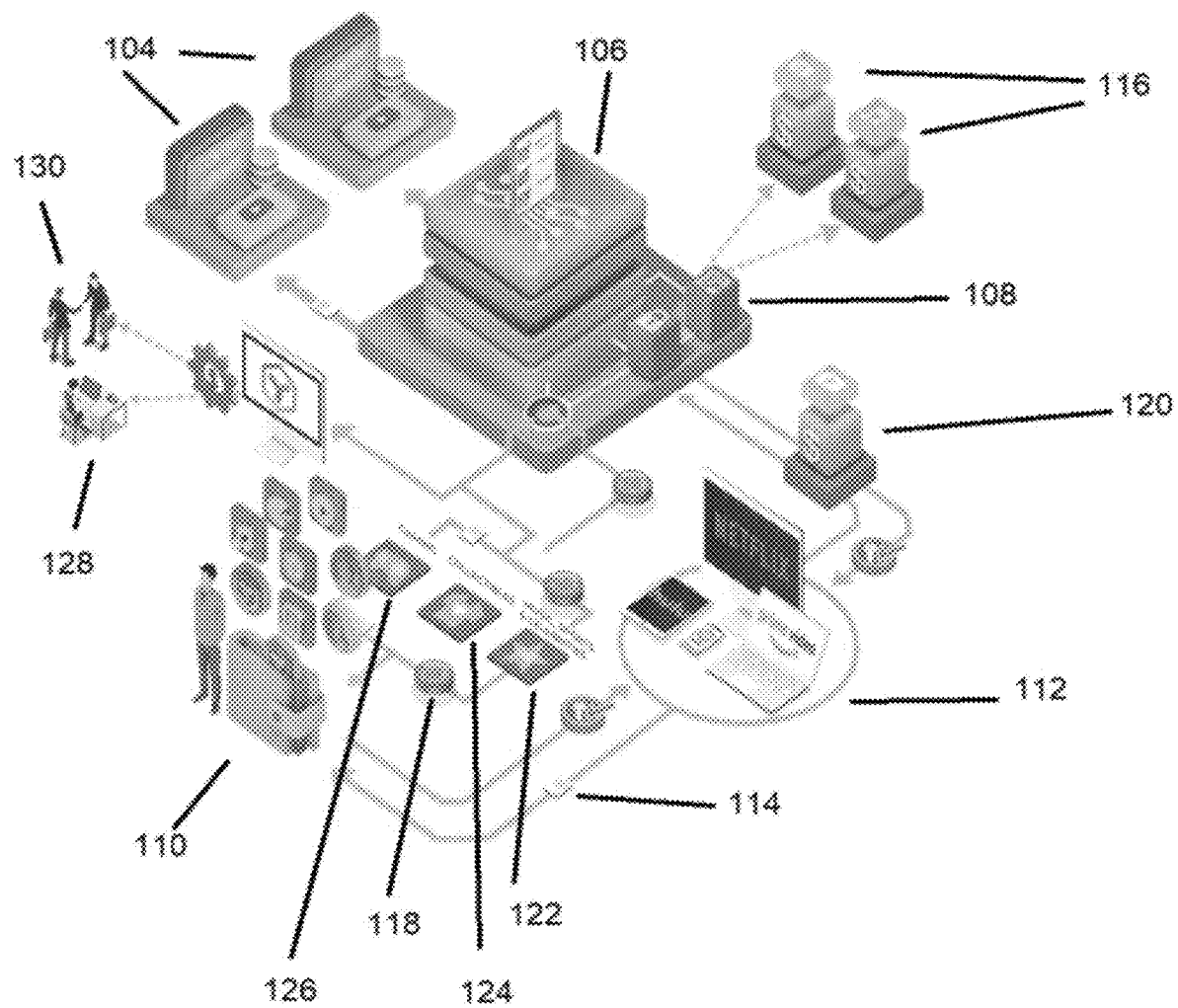
FIG. 1 is a conceptual diagram of an NFT platform in accordance with an embodiment of the invention.

Turning now to the drawings, composite cryptographic systems and composite proof methods in accordance with various embodiments of the invention are illustrated. A challenge associated with the introduction of new cryptographic methods for constructing immutable ledgers and/or blockchains is that potential security vulnerabilities in new cryptographic processes have a tendency to emerge over time with use. Accordingly, the longer term security of immutable ledgers and/or blockchains constructed using new cryptographic techniques is often difficult to assess. A result is that older, less energy efficient cryptographic systems currently dominate because many users are hesitant to assume the risk associated with using a less-proven cryptographic system—even if it offers other advantages including (but not limited to) greater energy efficiency. Various methods for implementing cryptographic systems that leverage new cryptographic processes in a manner that reduces the likelihood of security vulnerabilities in accordance with various embodiments of the invention are discussed further below. In many embodiments, the cryptographic systems utilize a combination of cryptographic processes to securely construct immutable ledgers and/or blockchains. As a result of the use of a combination of cryptographic processes, these cryptographic systems can be referred to as composite cryptographic systems. In a number of embodiments, composite cryptographic systems are able to process transactions associated with an immutable ledger securely and more computationally efficiently than through the use of a single conventional proof mechanism, such as Proof of Work.

Composite cryptographic systems in accordance with various embodiments of the invention can include computer systems that are configured to securely write blocks to immutable ledgers and/or blockchains. In a number of embodiments, the composite cryptographic systems can include immutably stored information, where the stored information includes transactions associated with one or more public keys. In several embodiments, the transactions can be stored in blocks, and the blocks can be ordered. In certain embodiments, the composite cryptographic systems can rely upon the application of one or more of a variety of proof-based consensus mechanisms such as (but not limited to) Proof of Work (PoW), Proof of Space (PoS), Proof of Stake (PoSt), Proof of Bus (PoB), and/or other methods. A PoW based system can rely on a network of miners performing computations, including computations such as (but not limited to) hash functions, until an output is achieved with certain characteristics. A PoS system can rely on a network of mining machines performing computations to which a necessary input is a particular data structure such as (but not limited to) a graph or a portion of a graph stored in the memory of the miners. A PoSt system can rely on a network of miners performing computations to which a necessary input is a proof of a particular stake. For example, the stake may be (but is not limited to) a quantity of tokens associated with a private key. A PoB system can rely on a network of miners performing computations for which the speed of the computations is limited by the bus speed of the computer system acting as the miner. As is discussed further below, the specific proof mechanism(s) and the manner in which the proof mechanism(s) are used as part of a combination of cryptographic processes is largely reliant upon the requirements of specific applications.

In a number of embodiments, composite cryptographic systems utilize a combination of cryptographic processes including at least one well-studied cryptographic process, such as a Proof of Work based consensus mechanism. Accordingly, the use of a proven proof mechanism can provide a degree of confidence with respect to security. Composite cryptographic systems in accordance with many embodiments of the invention also provide access to the advantages of additional cryptographic processes. In a number of embodiments, composite cryptographic systems are utilized that allow for the combining of features from two or more cryptographic systems. The resultant cryptographic system can provide energy savings, low risk testing of new features, and/or other benefits. A composite cryptographic system can be the combination of one or more cryptographic systems based on well-studied cryptographic systems, such as (but not limited to) Proof of Work, with one or more instances of lesser-known cryptographic systems, such as (but not limited to) Proof of Space based systems. As can readily be appreciated the specific combination of cryptographic processes utilized within a composite cryptographic system typically depend upon the requirements of specific applications.

In some embodiments of the invention, a qualitative-qualifying proof system can improve energy efficiency in cryptographic systems (e.g. PoS systems) by a combination of one or more qualitative proofs and one or more qualifying proofs. The qualitative proof can conform to the established notion of a proof, such as typically associated with a proof protocol (e.g. PoW, PoS, PoSt, PoB or others). The qualifying proof can differ in that at least the qualifying proof can be performed conditionally on the successful completion of a qualitative proof. This arrangement can limit the number of machines active during the computation of the qualifying proof to those machines which succeeded in producing a qualitative proof. The result can be that a subset of the machines can be idle, or free to work on other tasks, during the computation of the qualifying proof, thereby reducing the energy consumed by the system in order to perform the proof. A variety of qualitative-qualifying proof systems implemented in accordance with various embodiments of the invention that can be utilized within cryptographic systems including (but not limited to) the various composite cryptographic systems described herein are discussed further below.

Cryptographic systems including (but not limited to cryptographic systems) can also be combined with reparameterization mechanisms. In several embodiments, reparameterization mechanisms can enable changing the relationships between various parts of the cryptographic system to adjust to changing conditions. A potential problem facing new cryptographic systems is that previously unknown vulnerabilities could be discovered. The exploit of a vulnerability could compromise the security of an immutable ledger. Reparameterization mechanisms within a cryptographic system (e.g. a composite cryptographic system) can solve this problem by changing parameters of the cryptographic system in response to detected conditions. For example, the conditions could be an attack on the system. In the event that the new less-tested portion of a composite cryptographic system becomes vulnerable, or becomes attacked, a reparameterization mechanism can be used to shift the composite cryptographic system to rely more heavily on the well-tested portion thereby stemming any damage possible through the vulnerability. In this way, the reparameterization mechanism can act as a "cryptographic airbag" in the event of newly discovered security vulnerability. Once the condition changes again, the system can further reparametrize to improve a different characteristic, such as energy efficiency. Furthermore, introduction of new cryptographic processes (potentially in response to a detected security vulnerability) can also be treated as a reparameterization. As can readily be appreciated, the specific reparameterization process utilized within a composite cryptographic system is largely dependent upon the requirements of a specific application. A variety of reparameterization mechanisms implemented in accordance with various embodiments of the invention that can be utilized within cryptographic systems, including (but not limited to) the many composite cryptographic systems described herein, are discussed further below.

In some embodiments of the invention, a method for reducing energy consumption through parameter and identity control is utilized. For example, miners can be provided with a limited size range (e.g. a search space) of inputs to use for solving a proof. Only when the miners fail to find a solution in this first search space, is the search space enlarged to allow searching to continue. Alternatively, or additionally, eligible miners can be determined based on a set of parameters or credentials. In some embodiments, only miners with proper parameters or credentials, of which there may be a controlled supply, are allowed to mine. Miner parameter and identity control systems are further described herein. A variety of miner parameter and identity control systems implemented in accordance with various embodiments of the invention that can be utilized within cryptographic systems, including (but not limited to) the many composite cryptographic systems described herein, are discussed further below.

In some embodiments, cryptographic systems can achieve increased energy efficiency through the use of secure delay functions to enforce processor idle time within the computer systems utilized to implement miners. In a number of embodiments, delay functions are computed by proxies (e.g. network or cloud-based resources). In several embodiments, delay functions are memory bound functions. In certain embodiments, memory-bound functions are used as part of a proof protocol and in a manner that is independent of serving as a delay function. Irrespective of the mechanism utilized to implement the delay function, a potential benefit of the use of a delay function is allowing a portion of the mining systems on the network to idle (or at least not participate in the proof generation for the system) at times while the delay function is being computed. This can reduce energy consumption because idle computer systems can be less energy intensive than loaded systems.

In some embodiments, an output of a cryptographic process, such as (but not limited to) the output of a proof protocol, can be an input to the delay function. This can prevent precomputation of the delay function. Some embodiments include a delay function whose computational time can be primarily dependent on the processor bus speed instead of the processor speed. This can be advantageous in systems in which miners have relatively similar bus speeds. Therefore, the time for computation of the delay function can be relatively consistent between different systems. In some embodiments, a delay function is computed by a trusted network resource. In this way the time to compute the delay function can be consistent and differences in the computation abilities of the various miners can have little or no impact on the time to compute the delay function. The network resource can be rewarded for computing the delay function by receiving a portion of the mining rewards. A network resource delay function is further discussed herein.

Some cryptographic systems can suffer from a concentration of mining power because specialized machines can be so dominant at the tasks involved in PoW. PoW can be parallelized easily and is readily adapted to ASICs. In many embodiments, utilization of a memory bound and/or bus limited proof function within a cryptographic system can flatten the performance of various computer systems employed by miners. In a number of embodiments, use of a bus limited proof mechanism can enable mobile phones and tablets, as well as personal computers, to be miners, potentially broadening the network of miners and improving the security of the system. Memory bound, or bus limited functions are further discussed herein. They are considered with respect to delay functions and as a proof function. A variety of memory bound and/or bus limited functions that can be utilized to implement delay and/or proof processes in accordance with various embodiments of the invention that can be utilized within cryptographic systems, including (but not limited to) the many composite cryptographic systems described herein, are discussed further below.

Various cryptographic systems, including (but not limited to) composite cryptographic systems, and cryptographic processes that can be implemented within cryptographic systems in accordance with a number of embodiments of the invention are discussed further below. As can readily be appreciated, cryptographic systems in accordance with various embodiments of the invention may be composite cryptographic systems and can include one or a combination of a qualitative-qualifying proof system, a reparameterization mechanism, a parameter and identify control process, a secure delay function, a memory bound proof function and/or a bus limited proof to achieve desired characteristics including (but not limited to) security and/or efficiency characteristics. In addition, cryptographic systems are discussed below in the context of rich media platforms. As can readily be appreciated, the various cryptographic systems and cryptographic processes described herein are not limited to use within rich media platforms and can deployed in a variety of applications including (but not limited to) applications involving recording transactions in an immutable ledger and/or maintaining a blockchain. Accordingly, the description of rich media platforms that follows and the manner in which cryptographic systems and cryptographic processes are described in the context of rich media platforms should be understood as illustrative and not limiting.

Blockchain-Based Non-Fungible Token Platforms

While cryptographic systems can be utilized in a variety of applications, it can be helpful to consider the role that cryptographic systems play in specific applications such as blockchain-based Non-Fungible Token (NFT) platforms. Referring again to the drawings, systems and methods for implementing blockchain-based Non-Fungible Token (NFT) platforms that incorporate cryptographic systems in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state. In several embodiments, the immutable ledger is maintained using any of the various composite cryptographic systems described below.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity. As is discussed further below, blockchains utilized within rich media platforms in accordance with various embodiments of the invention can use any of the composite cryptographic systems discussed in detail below.

Figure 2:
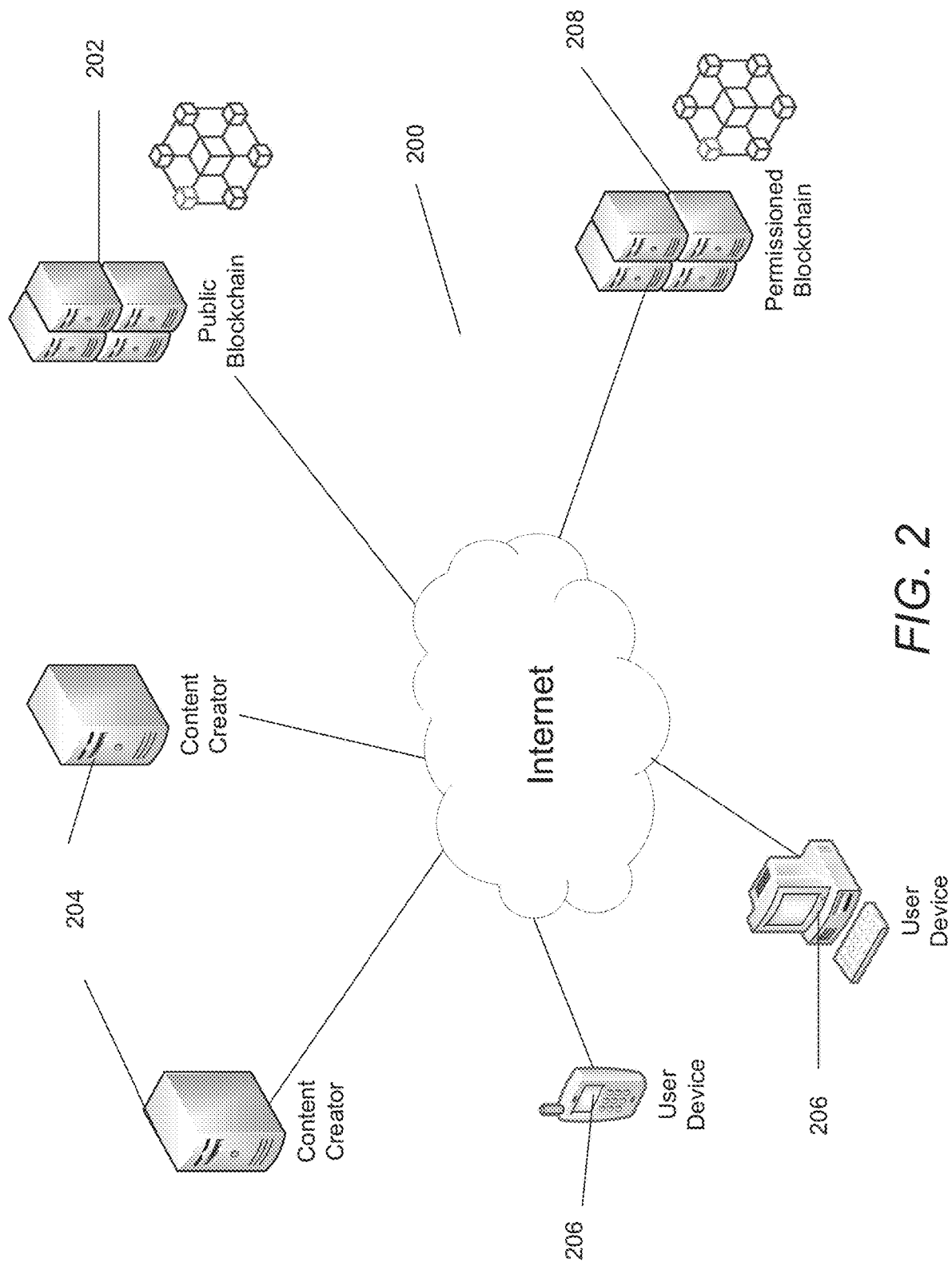
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity. and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
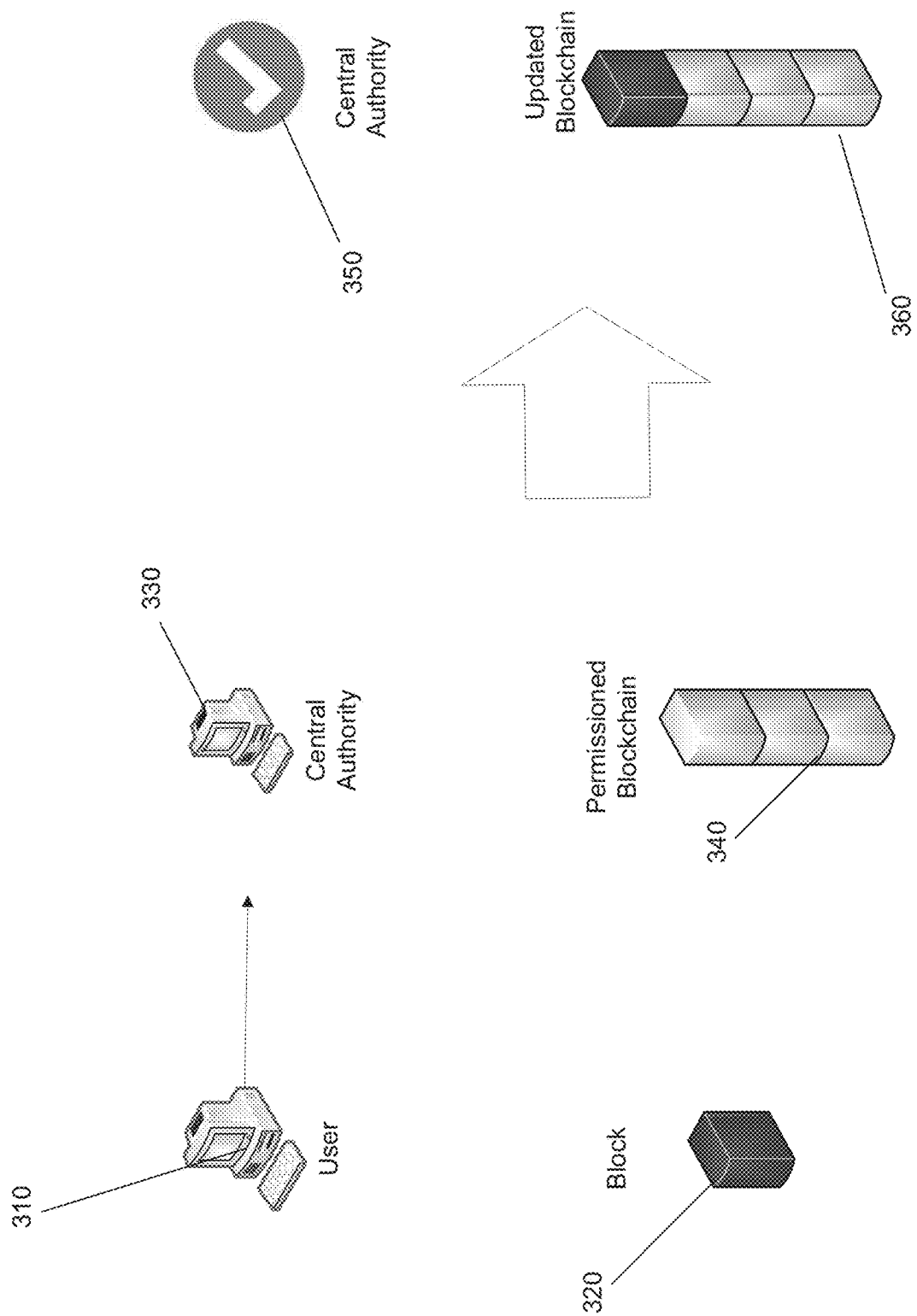
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
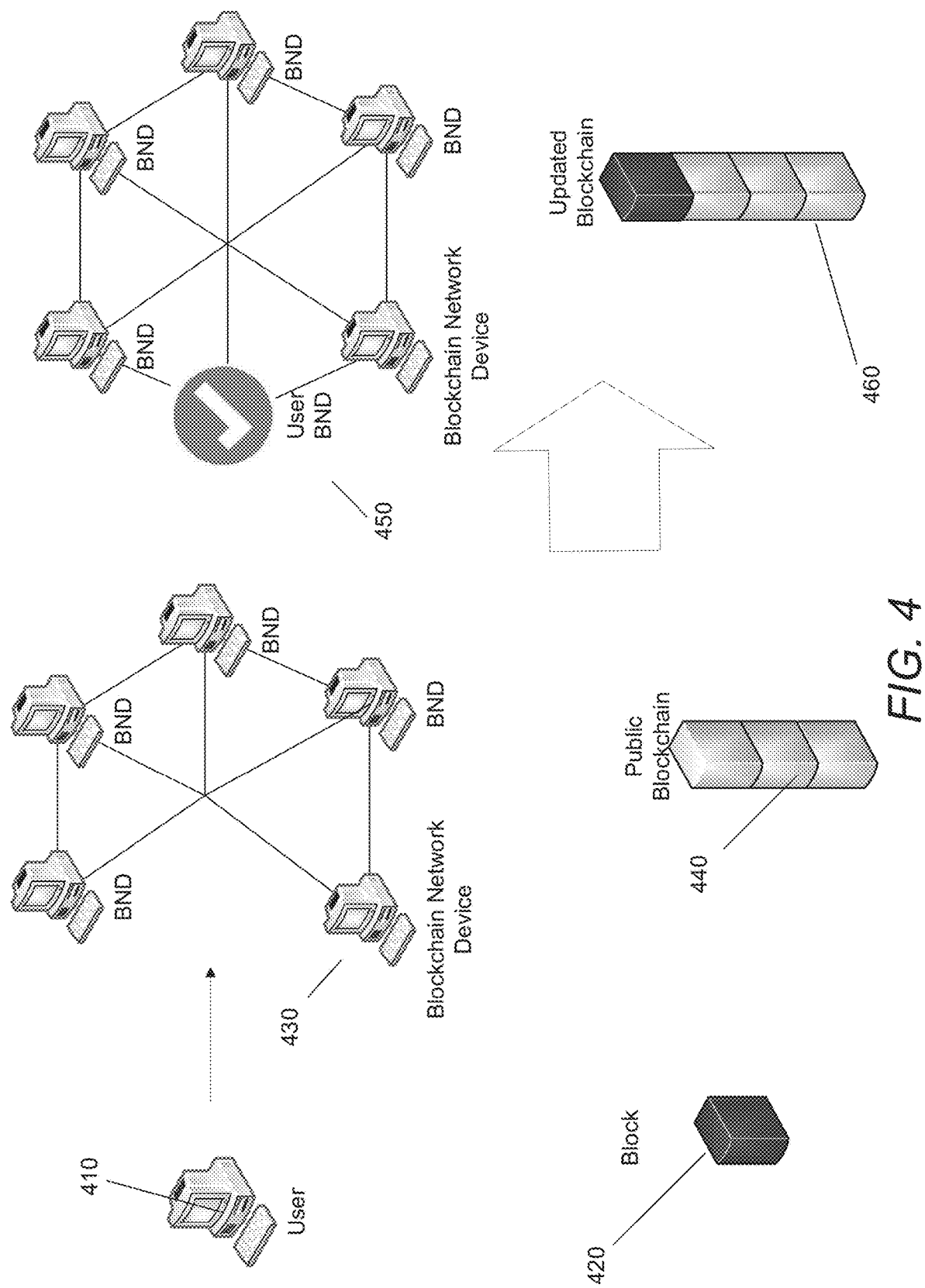
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, proof of stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
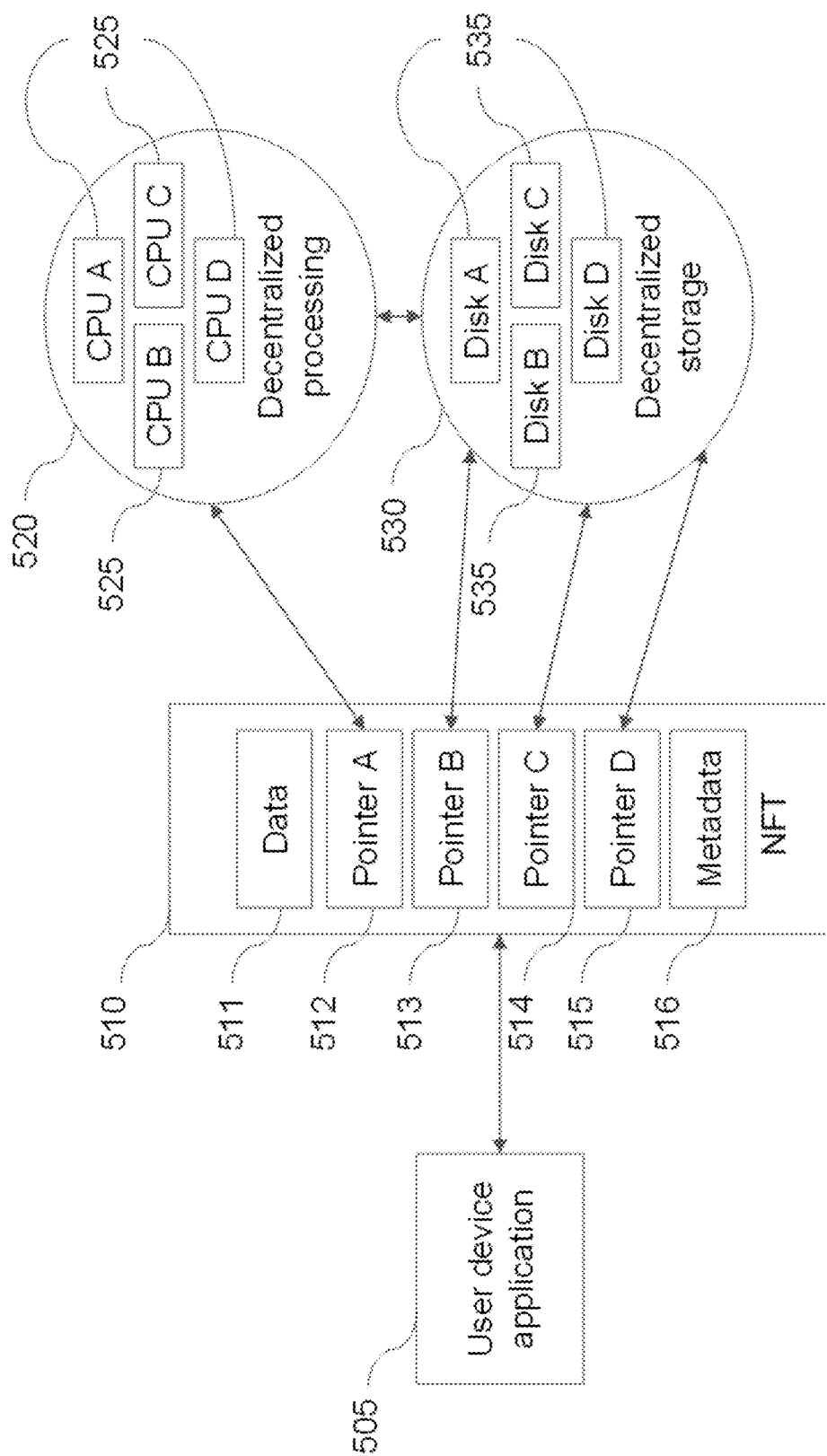
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
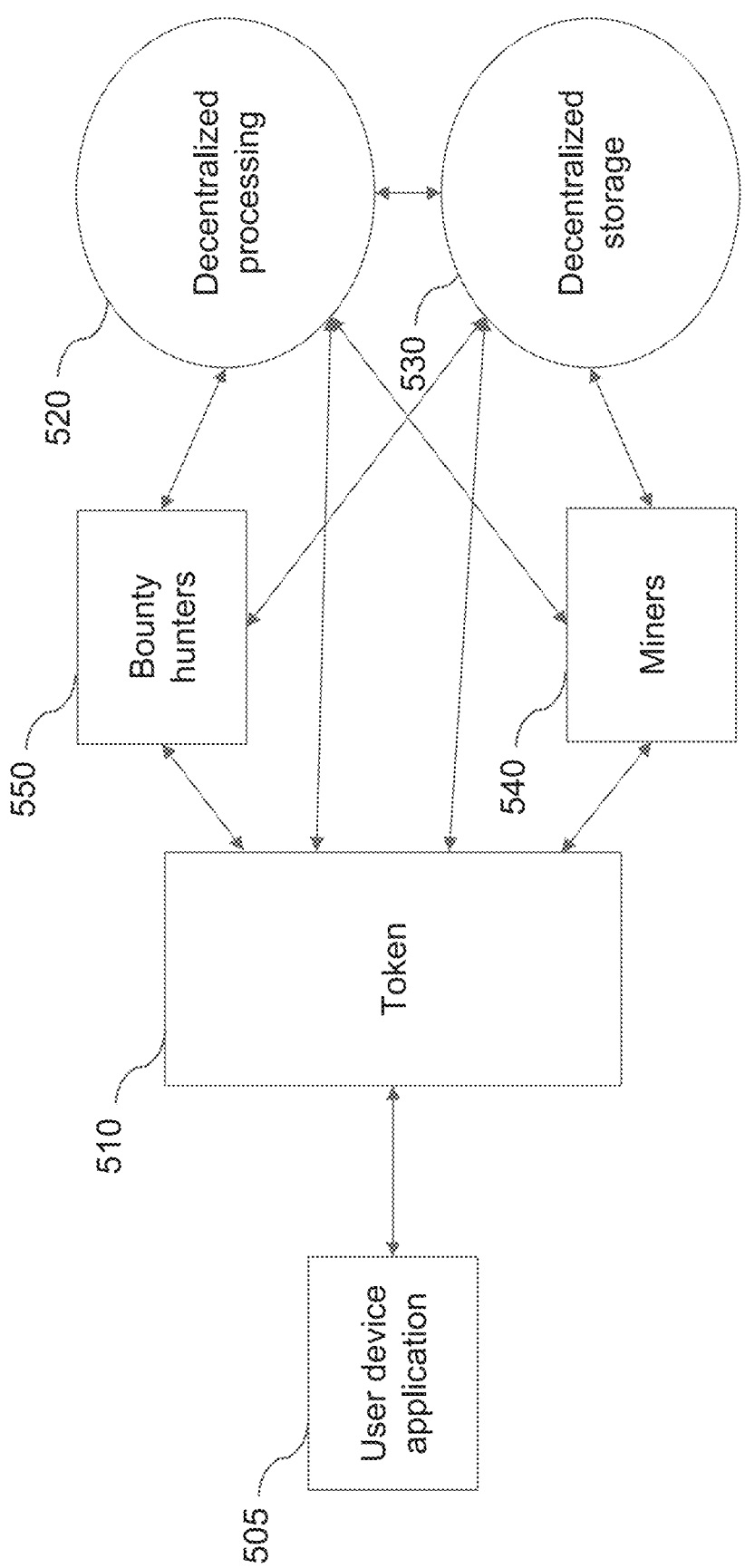

An additional benefit of dual blockchains exists in the possibility of incorporating methods for detection of abuse, essentially a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored.

The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
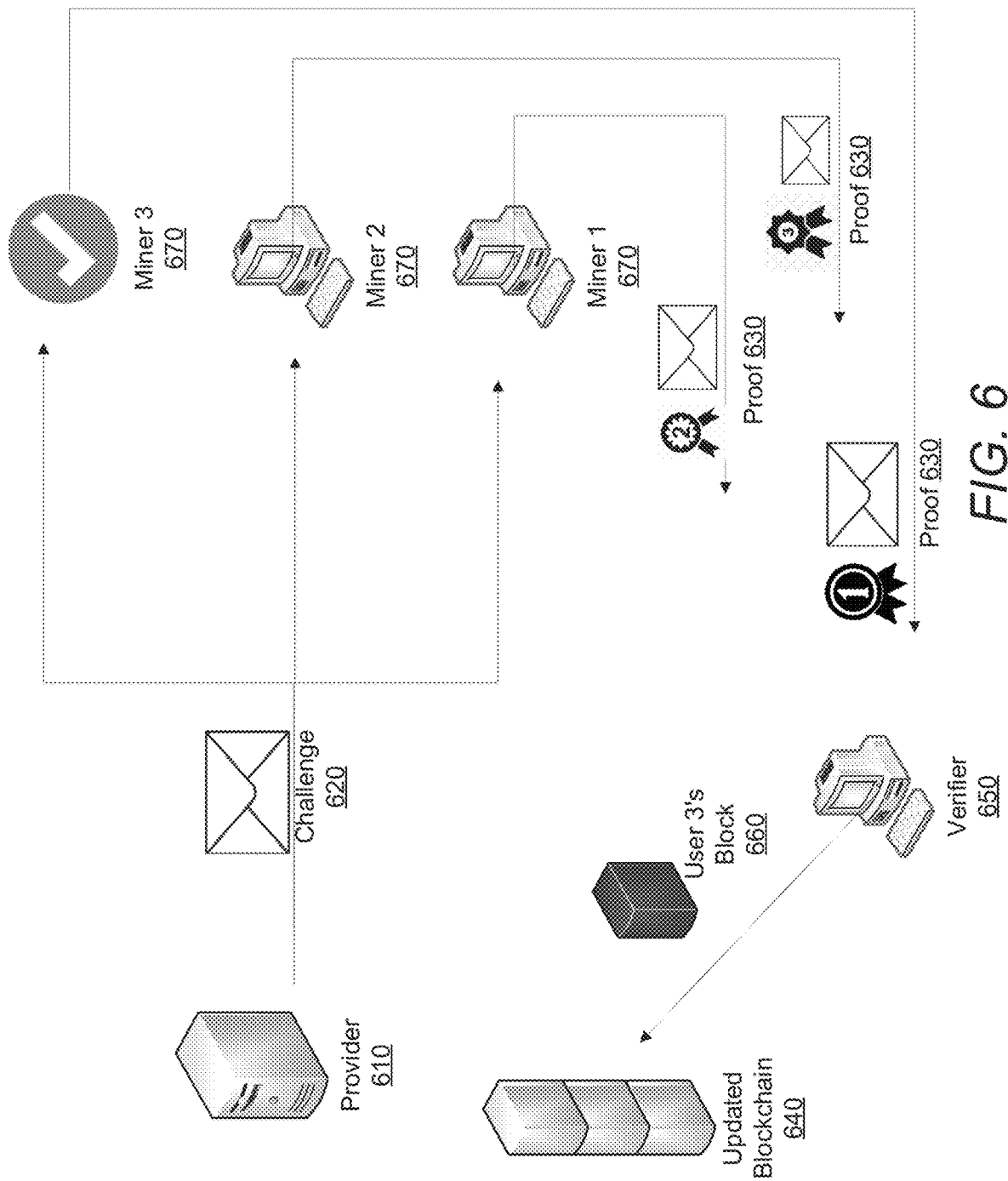
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge—response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
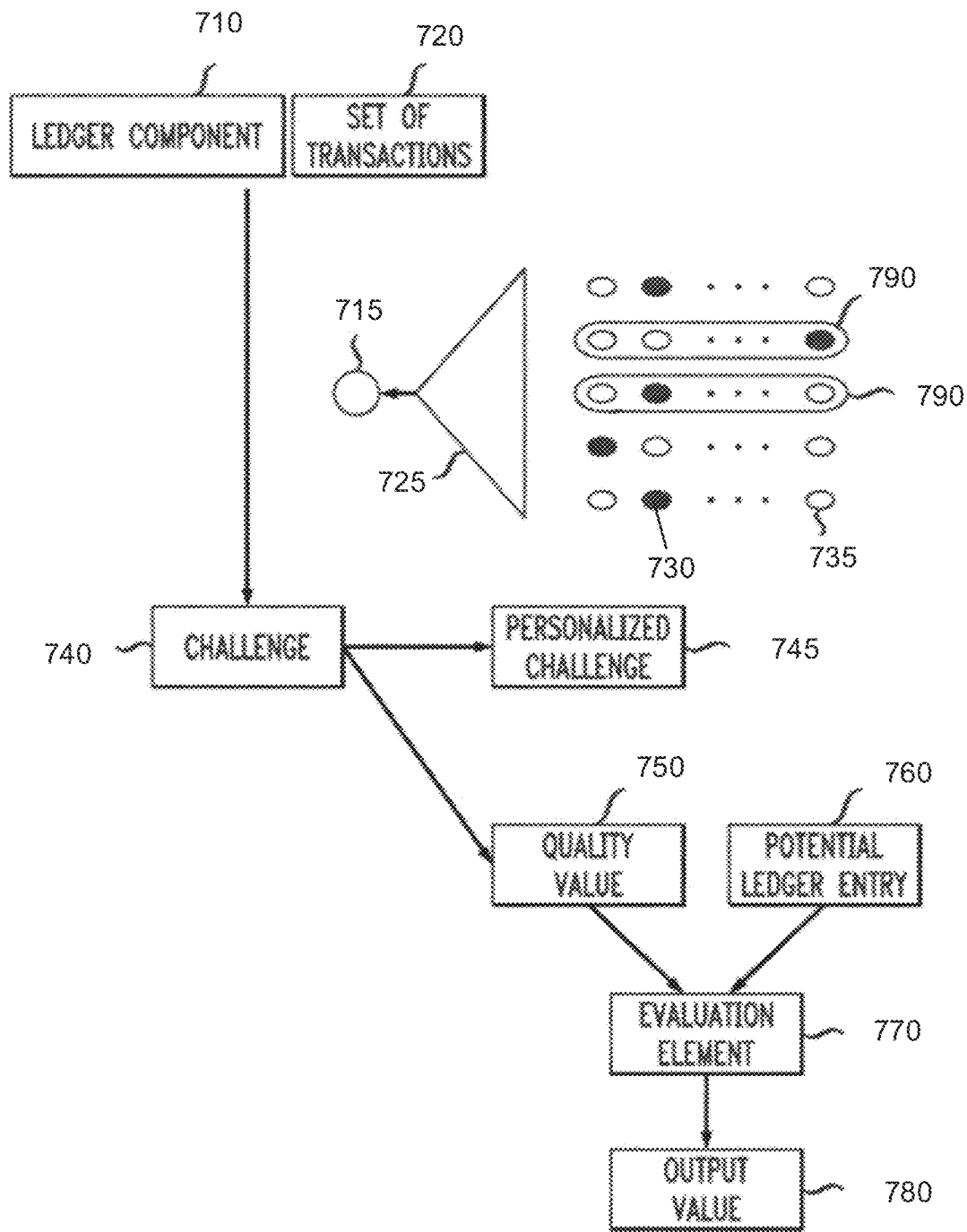
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also operate as public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
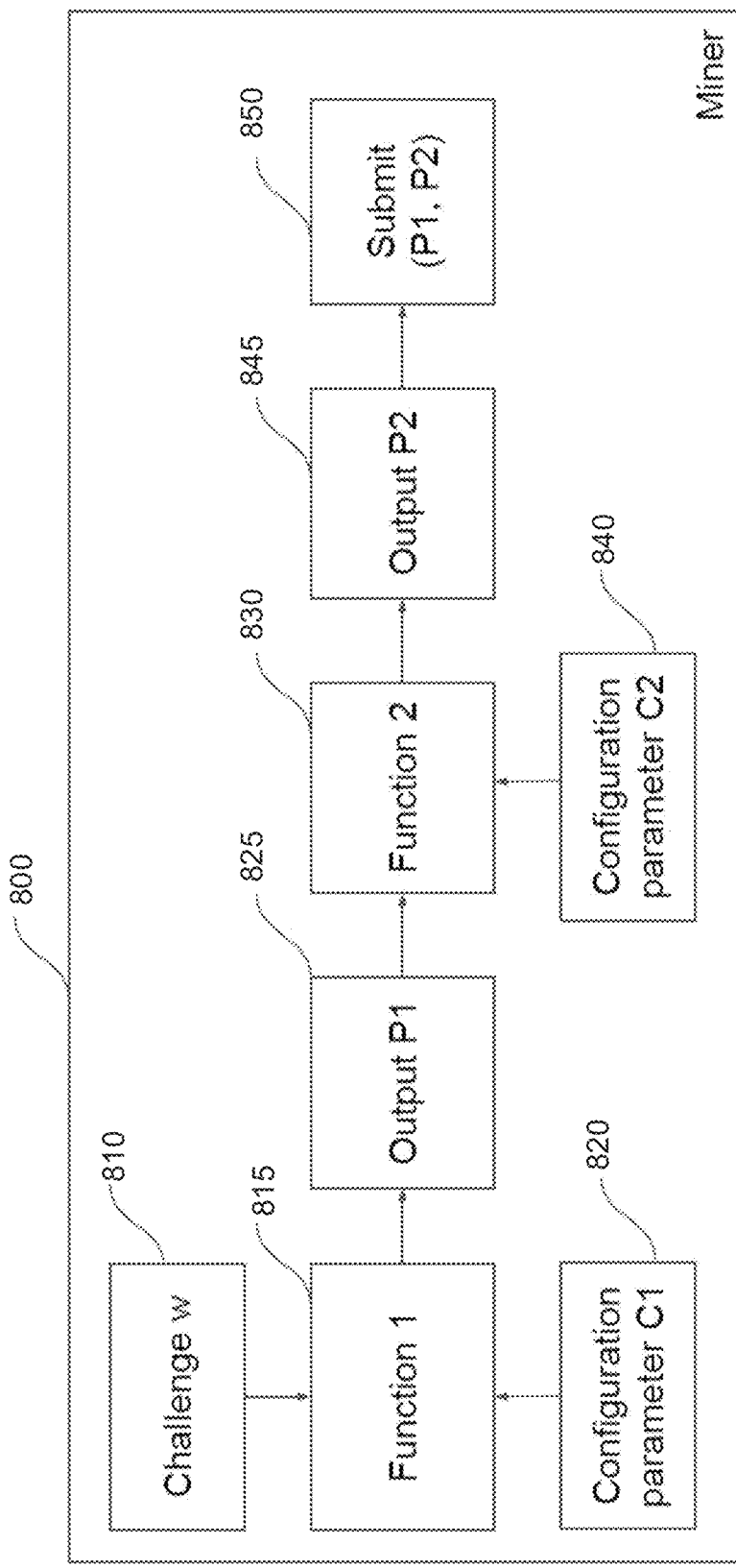
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
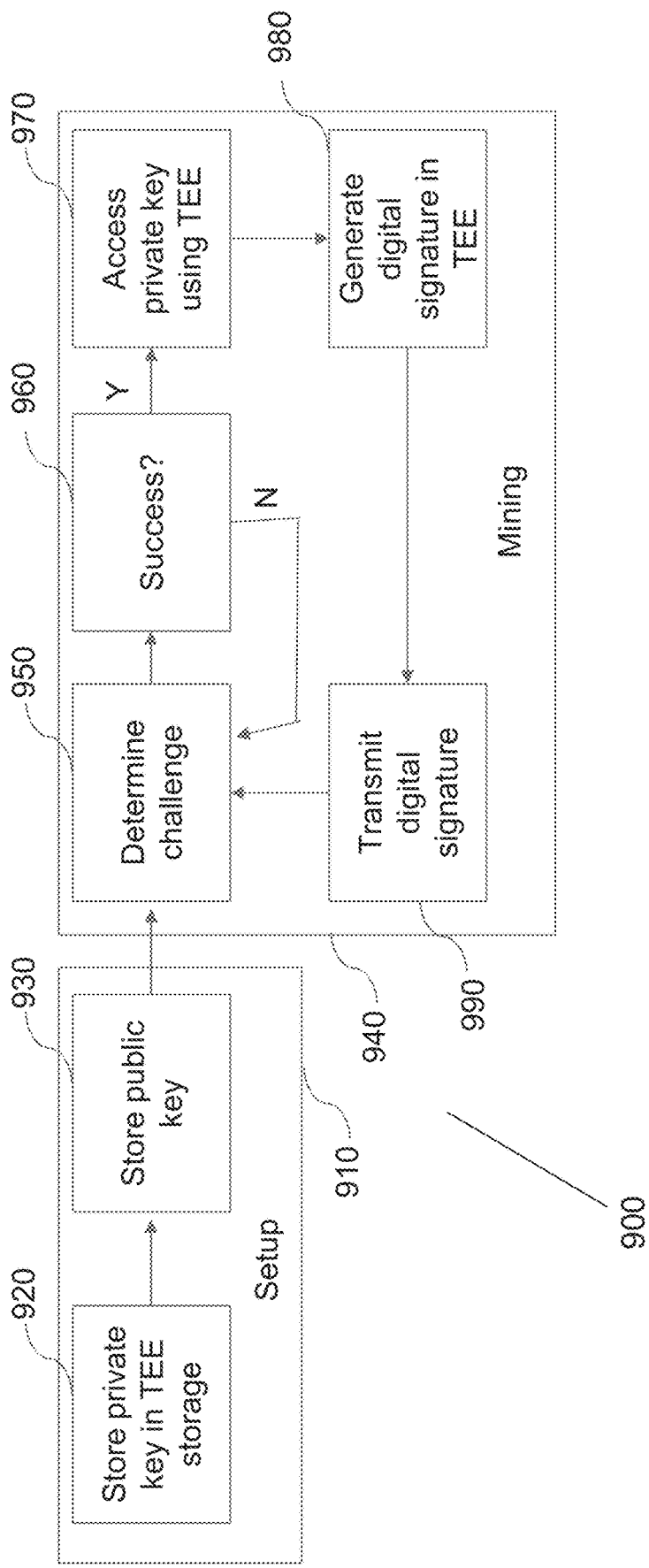
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, proof of stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

Composite Cryptographic Systems

A variety of systems that can incorporate cryptographic systems, including rich media systems, are described above. As previously noted, such systems can incorporate composite cryptographic systems. Composite cryptographic systems in accordance with a variety of embodiments of the invention can combine constituent cryptographic systems to achieve characteristics that are typically not capable of being achieved by application of a single cryptographic system.

In several embodiments, a composite cryptographic system can inherit properties from each of its constituent cryptographic systems. For example, if a first constituent cryptographic system is secure but inefficient, and a second constituent cryptographic system has unknown security but high energy efficiency, then the combination of them, depending on configuration parameters, could possess high security and low efficiency or unknown security and high efficiency. Composite cryptographic systems can provide favorable characteristics from the two or more constituent cryptographic systems.

In many embodiments, the composite cryptographic system uses its constituent cryptographic system(s) to generate composite proofs. Composite proofs can incorporate two or more constituent proofs. In many embodiments, constituent proofs used to form a composite proof correspond to different constituent cryptographic systems. In several embodiments, constituent proofs used to form a composite proof correspond to the same cryptographic system configured using different parameters. In a number of embodiments, the composite cryptographic system can inherit properties from all its constituent cryptographic systems. For example, if a first constituent cryptographic system is secure but inefficient, and a second constituent cryptographic system has unknown security but high energy efficiency, then the combination of them, depending on configuration parameters, could possess high security and low efficiency or unknown security and high efficiency. Using composite cryptographic systems can allow obtaining favorable characteristics from the two or more constituent cryptographic systems.

Composite cryptographic systems in accordance with several embodiments of the invention can combine two or more constituent cryptographic systems. The two or more constituent cryptographic systems can each be used to generate proofs. The proofs generated by the constituent cryptographic systems can be combined to form a composite proof. The proofs forming the composite proof can be constituent proofs. Each constituent proof may be generated by the associated constituent cryptographic system.

In various embodiments, constituent proofs generated by each of the constituent cryptographic systems can be determined based on configuration parameters. Varying the configuration parameters can change the characteristics of a composite cryptographic system. The configuration parameters can be varied in response to a detected condition. For example, the configuration parameters can be varied in response to a detection of an attack on the security on a constituent cryptographic system. Varying the configuration parameters can include varying the absolute and relative difficulty parameter for the constituent cryptographic systems. By way of example, a composite cryptographic system based on a graph can maintain the same graph size and graph structure as the composite cryptographic system modifies the difficulty, allowing any pre-generated material in the form of graphs to be continued to be used. Similarly, if a certain insight is gained regarding what structures are secure and which ones are not, the composite cryptographic system can ban insecure structures after such an insight is gained. In many embodiments, banning a structure can force the recomputation of affected graphs, but not other graphs. For example, if graphs with a particular topology (such as having only even in-degree for all nodes) are found to be vulnerable, then this particular type of graph can be banned, but others allowed. In the time from the discovery of the existence of a vulnerability to the time when the fix is determined (where the fix may be to prevent certain structures), it is important that the composite cryptosystem remain as secure as possible.

Varying the configuration parameters may allow obtaining the best properties of multiple constituent cryptographic systems at different times and/or under a variety of circumstances. In many embodiments, changes in the parameters are implemented in response to detection of a specific condition. Such a condition may be the discovery of a flaw, expressed in a manner that can be publicly verified. Yet another type of condition triggering the automated modification of one or more parameters, such as parameters governing the difficulty of finding a proof is a publicly detectable condition related to the context of successful miners. For example, consider a system that thrives on having a particular geographic balance among miners, such as no more than 20% of miners may come from any one out of ten geographical areas. If this takes place, then constraints are automatically added to the requirements for mining, forcing a geographic alignment of the success among miners. As long as at least 50% of the miners are in agreement, this type of balancing act will be successful. Therefore, it is not only security properties that can be obtained and maintained using automated reparameterization, but any property that can be expressed in terms of parameter choices, including policies governing what makes a proof successful. This enables new types of properties to be maintained, for the common good of the system, and according to policies that are associated with the generation of thresholds and parameter choices. As can readily be appreciated, the specific conditions and automated reparameterizations that can occur within a cryptographic system implemented in accordance with various embodiments of the invention is largely dependent upon the requirements of a given application.

The automated reparameterization processes discussed herein can be used alone, without the use of a composite cryptosystem. The reparameterization processes can also can be used outside the context of detecting an attack. For example, processes in accordance with many embodiments of the invention can be used to automatically adjust the level of difficulty for mining in order to make mining easier or harder, whether this is a proof of work based mining, proof of space based mining, or based on another resource for which there is an assessment of whether a mining instance is successful or not. The level of difficulty can be used to select how likely an instance is to succeed. For example, if the difficulty is set to $0=2"\{-20\}$, that may indicate that two hash values need to match in their 20 least significant bits (LSB), or some other 20-bit predefined portion of the two values. Changing the difficulty to $0=2"\{-21\}$ makes it more difficult to succeed, as the two values need to match in 21 positions instead. It is also possible with levels of difficulty that are not of the form $2"x$ for an integer x. For example, if the system sets $0=2"\{-20\}/sqrt(2)$, which is the same as $0=2"\{-20.5\}$, then this can be achieved by matching the two values on the 21 LSB, and accept if they match, but if they do not then match the two values on the 20 LSB and pass if the first value is in a pre-defined range, such as its most significant bit is 0. This corresponds to a success rate of $D=2"\{-20.5\}$. This can also be achieved in other ways, including (but not limited to) only determining whether the values match on the 20 LSB and one or both are within a given range, as will be understood by a skilled artisan. In this way, difficulty levels can be adjusted in a very fine-tuned manner, and based on automated assessment of conditions. Such conditions may include (but are not limited to) the speed of mining. As can readily be appreciated, any of a variety of techniques can be utilized for adjusting the difficulty of performing specific cryptographic processes within a cryptographic system implemented in accordance with various embodiments of the invention as appropriate to the requirements of a given application.

In some embodiments, the constituent cryptographic systems can have various inputs. The inputs required for each of the constituent cryptographic systems can involve generating constituent proofs in a particular order. In some instances, the output of a first constituent cryptographic system can be used as an input to a second constituent cryptographic system. In this way, the constituent cryptographic systems can be arranged in series.

Composite cryptographic systems in accordance with many embodiments of the invention can generate composite proofs from the constituent proofs. The composite proofs can incorporate two or more constituent proofs. Composite proofs in various embodiments of the invention can be written to a ledger associated with the composite cryptographic system. Composite proofs can be used to add a block to a blockchain associated with the composite cryptographic system.

In some embodiments, composite proofs can be generated to facilitate the use of a composite cryptographic system. The generation of composite proofs can enable a composite cryptographic system to inherit some properties of constituent cryptographic systems. The composite proof can include constituent proofs. An example of a process for generating a composite proof is conceptually illustrated in FIG. 18.1. Processes for generating composite proofs in accordance with various embodiments of the invention can be executed by a miner.

Process 1800 determines (1802) a set of challenges. In several embodiments, the number of challenges in the set of challenges is equal to the number of constituent cryptographic systems incorporated into the composite cryptographic system. The set of challenges in accordance with certain embodiments of the invention can be determined based on the state of a ledger. Ledgers in accordance with various embodiments of the invention can be associated with the composite cryptographic system. Processes in accordance with several embodiments of the invention may receive information about the ledger state over a network. In a variety of embodiments, each challenge in the set of challenges can be determined based on previous proofs, previous ledger entries on a ledger associated with the composite cryptographic system, configuration parameters, and/or on information associated with a miner.

Process 1800 generates (1804) a set of constituent proofs. In some embodiments, the number of constituent proofs in the set of constituent proofs is equal to the number of constituent cryptographic systems. In numerous embodiments, each constituent cryptographic system can be used to generate a corresponding constituent proof based on one or more challenges from the set of challenges. In many embodiments, the set of constituent proofs includes multiple proofs generated using the same constituent cryptographic system configured in different ways. As can readily be appreciated, the specific constituent cryptographic systems that are utilized within a given composite cryptographic system are largely dependent upon the requirements of a given application. Each constituent cryptographic system can be used to generate a corresponding constituent proof based on one or more challenges from the set of challenges. For example, a first constituent cryptographic system generates a first constituent proof based on at least a first challenge; a second constituent cryptographic system generates a second constituent proof based on at least a second challenge; . . . an nth constituent cryptographic system generates an nth constituent proof based on at least an nth challenge. In several embodiments, the generation of each constituent proof can be further based on a difficulty parameter associated with each constituent cryptographic system used to generate the constituent proof. In some embodiments, the difficulty parameter can be adjusted based on a detected condition. A detected condition could include (but is not limited to) the detection of an attack on the security of the composite cryptographic system. In some embodiments the set of constituent proofs can be generated based on one or more configuration parameters. Changing configuration parameters, including a difficulty parameter, is discussed further below.

Process 1800 generates (1806) a composite proof. In some embodiments the composite proof can be a combination of constituent proofs. For example, a composite proof can include an ordered list of constituent proofs. The order of the ordered list of constituent proofs can be a predetermined order corresponding to the composite cryptographic system. In various embodiments a composite proof can be a combination of proofs. The manner in which composite proofs can be constructed in accordance with various embodiments of the invention is discussed further below and is typically dependent upon the requirements of specific applications.

Process 1800 sends (1808) the composite proof. The composite proof can be sent over a network. For example, processes in accordance with numerous embodiments of the invention can transmit the composite proof and use write access to write the proof to the ledger. In some embodiments, decentralized proof selection methods for identifying and selecting the most suitable proof can be used. In several embodiments, the decentralized proof selection methods in accordance with several embodiments of the invention can be based on quorum agreement among one or more miners. As can readily be appreciated, the specific decentralized proof selection method that is utilized is largely dependent upon the requirements of specific applications. In some embodiments, the process can submit the composite proof to a verifier, in order to validate a ledger associated with one or more challenges. In some embodiments, the process can also submit the composite proof to be accessed by a 3rd-party verifier. In various embodiments the process can send one, or any combination, of the constituent proofs over a network.

FIG. 18.1. illustrates a composite cryptographic system implemented using constituent cryptographic systems arranged in a general structure. Various arrangements of constituent cryptographic systems are possible. The arrangement of the constituent cryptographic systems can correspond to the input requirements of each constituent cryptographic system. This example can be modified to incorporate a specific number of constituent cryptographic systems and associated constituent proofs. For example, the constituent cryptographic systems can be arranged in series, in parallel, and/or in a combination of serial and/or parallel stages. The constituent cryptographic systems can be specified as particular cryptographic systems such as PoW, PoS, PoSt, PoB, PoM, or may themselves be composite cryptographic systems. The constituent cryptographic systems can be the same or different. Furthermore, the depicted composite cryptographic system can be incorporated with a method for modifying configuration parameters. This can be beneficial to allow the system to adjust which characteristics of the associated constituent cryptographic systems are more prominent. For example, the computation of the constituent proofs can be based on one or more configuration parameters, such as one or more difficulty parameters, that can be changed. The various composite cryptographic systems described with reference to FIG. 18.1 can be modified, and/or combined and/or utilized within any of the various rich media networks and/or other systems described herein.

While specific processes for generating a composite proof are described above, any of a variety of processes can be utilized to generate a composite proof as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

In some embodiments, composite proofs are generated from constituent proofs arranged in parallel. Constituent proofs arranged in parallel can refer to a set of constituent proofs that can be generated in any order. An example of a process for generating a composite proof based on constituent proofs generated in parallel is conceptually illustrated in FIG. 18.2. Processes for generating a composite proof based on constituent proofs generated in parallel in accordance with various embodiments of the invention can be executed by a miner.

Process 1850 determines (1852) a first challenge and a second challenge. In various embodiments, the first and second challenges can be determined based on a state of a ledger associated with the composite cryptographic system.

Process 1850 determines (1854) a first modified challenge and a second modified challenge. In a variety of embodiments, the first modified challenge and the second modified challenge are based on a first challenge and a second challenge. In some embodiments, to determine the first modified challenge and the second modified challenge, the process can combine the first challenge and the second challenge by performing a process including (but not limited to) XORing them, by hashing them, by concatenating them, or using a combination of these and other methods. Determining the first modified challenge and the second modified challenge may also include selecting a portion of the combined first challenge and second challenge. The selected portion for a first modified challenge may correspond to a first suitable length. The first suitable length can correspond to a requirement of a first constituent cryptographic system. The selected portion for a second modified challenge may correspond to a second suitable length. The second suitable length can correspond. to a requirement of a second constituent cryptographic system. In some embodiments the length of the first challenge may equal the length of the first modified challenge. In some embodiments the length of the second challenge may equal the length of the second modified challenge.

Process 1850 generates (1856) a first constituent proof and a second constituent proof. In some embodiments, the first constituent proof is generated using a first constituent cryptographic system and is based on at least a first modified challenge. The generation of the first constituent proof can be further based on a first difficulty parameter. In some embodiments, the first difficulty parameter can be adjusted based on one or more detected conditions. The second constituent proof can be generated using the second constituent cryptographic system and can be based on at least the second modified challenge. The generation of the second constituent proof can be further based on a second difficulty parameter. In some embodiments, the second difficulty parameter can be adjusted based on the one or more detected conditions. In various embodiments, the process can generate the first constituent proof based on the first challenge. In various embodiments, the process can generate the second constituent proof based on the second challenge. In some embodiments, the first constituent proof can be generated based on one or more configuration parameters. In some embodiments, the second constituent proof can be generated based on one or more configuration parameters.

Process 1850 generates (1858), a composite proof. In some embodiments the composite proof can be a combination of constituent proofs. For example, the composite proof can include an ordered list of constituent proofs. The order of the ordered list can be a pre-determined order corresponding to the composite cryptographic system.

Process 1850 sends (1860) the composite proof. The composite proof can be sent over a network. For example, processes in accordance with numerous embodiments of the invention can transmit the composite proof and use write access to write the proof to the ledger. In some embodiments, decentralized proof selection methods for identifying and selecting the most suitable proof can be used. Decentralized proof selection methods in accordance with several embodiments of the invention can be based on quorum agreement among one or more miners.

While specific processes for generating a composite proof are described above, any of a variety of processes can be utilized to generate a composite proof as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere in this document.

Figure 19:
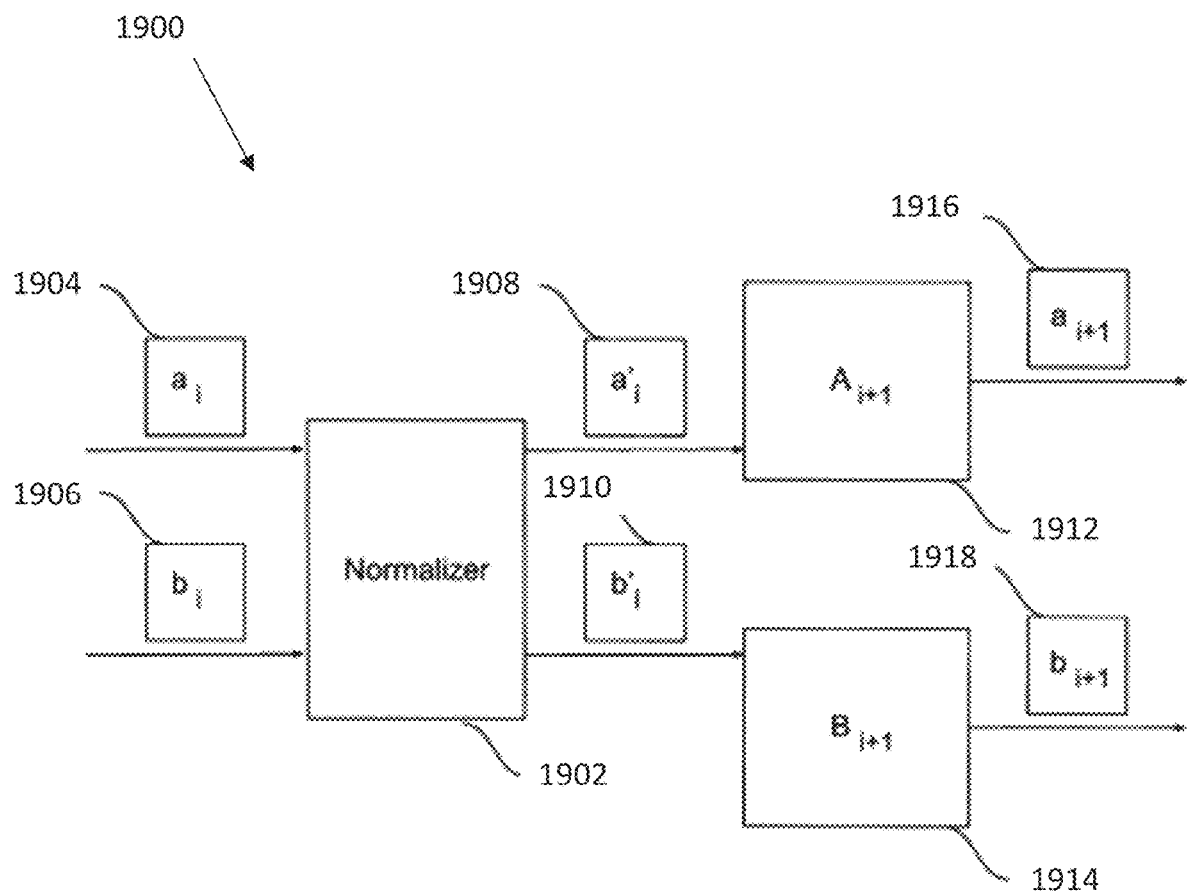
FIG. 19 conceptually illustrates an example of a parallel arrangement of cryptographic systems.

In some embodiments, composite cryptographic systems may include constituent cryptographic systems arranged in parallel. An example of a parallel arrangement of cryptographic systems A and B is illustrated in FIG. 19. In this figure a system 1900 includes a normalizer 1902. The normalizer 1902 receives challenge ai 1904 and challenge bi 1906 and determines modified challenges a'i 1908 and b'i 1910 as described throughout this description. The modified challenge a'i 1908 is used to generate the proof Ai+1 1912 as described throughout this description. The modified challenge b'i 1910 is used to generate the proof Bi+1 1914 as described throughout this description. The challenge ai+1 1916 is determined based on the proof Ai+1 1912. The challenge bi+1 1918 is determined based on the proof Bi+1 1914. Some aspects of the system 1900 may correspond to the process 1800.

Normalizers in accordance with some embodiments of the invention may combine challenges using various combination methods, such as (but not limited to) by XORing them, by hashing them, by concatenating them, and/or using other combination methods. In some embodiments, normalizers can generate modified challenges from the combined challenges by modifying the combination. The modification of the combination can include (but is not limited to) a selection of a portion of the combination. The selected portion may correspond in length to a requirement of an associated constituent cryptographic systems. For example, a first modified challenge could have the same format as a first modified challenge. The format could be determined based on the constituent cryptographic system associated with the first modified challenge and the first challenge. In some embodiments the normalizer can be omitted.

In some embodiments the first constituent cryptographic system can generate a first constituent proof based on a first modified challenge. The first constituent proof may be further based on a first difficulty parameter. Similarly, the second constituent cryptographic system can generate a second constituent proof based on a second modified challenge. The second constituent proof may be further based on a second difficulty parameter. As is described elsewhere, the first and second difficulty parameter may be variable.

While specific components relating to various composite cryptographic systems that generate a composite proof are described above, any of a variety of components can be utilized to generate a composite proof as appropriate to the requirements of specific applications. In some embodiments, one or more of the above components may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 20:
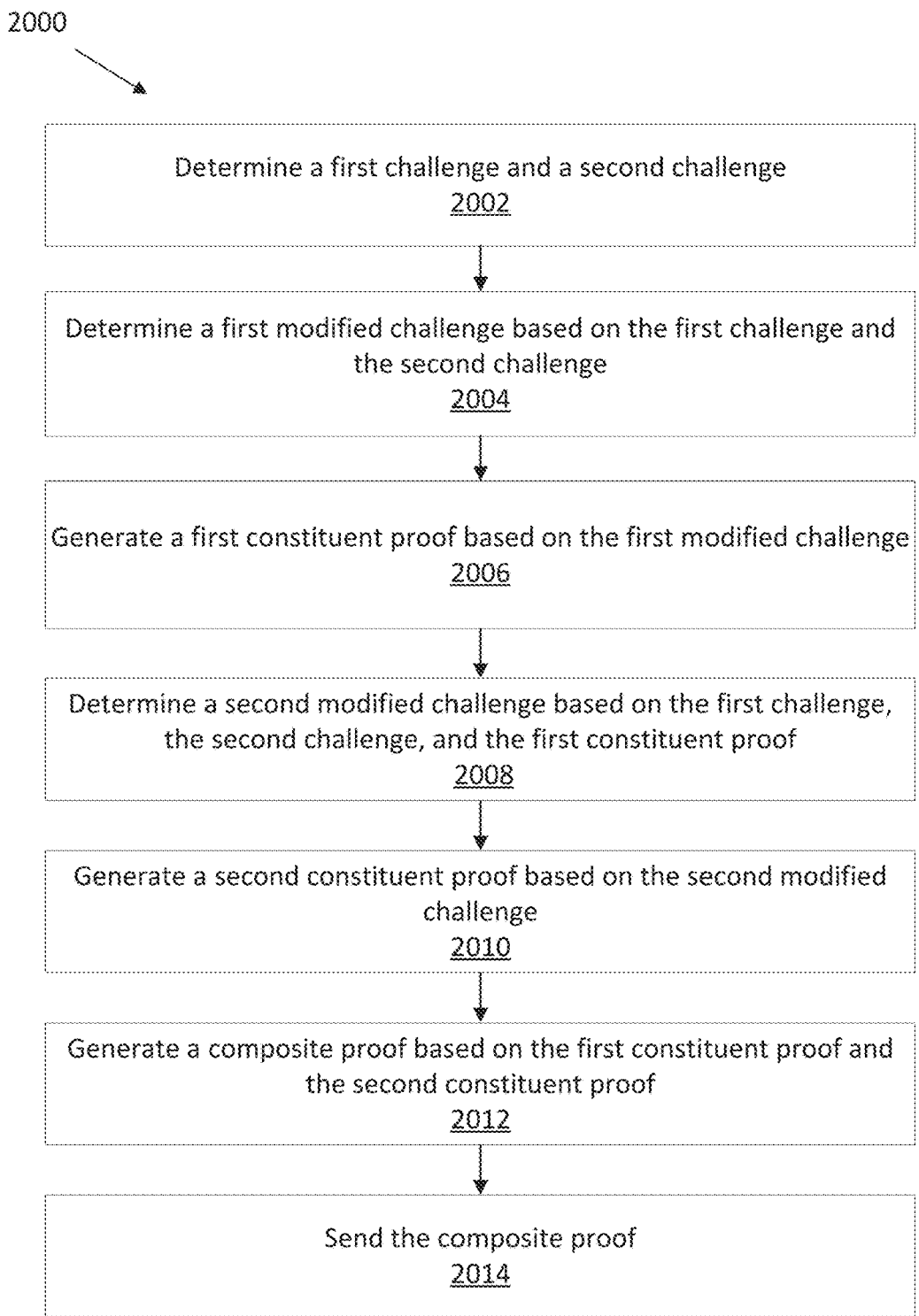
FIG. 20 conceptually illustrates an example of a process for generating a composite proof based on constituent proofs generated in series.

In some embodiments, composite proofs are generated from constituent proofs arranged in series. Constituent proofs arranged in series can refer to a set of constituent proofs that must be generated in a particular order. An example of a process for generating a composite proof based on constituent proofs generated in series is conceptually illustrated in FIG. 20. Processes for generating a composite proof based on constituent proofs generated in series in accordance with various embodiments of the invention can be executed by a miner.

Process 2000 determines (2002) a first challenge and a second challenge. In various embodiments, the first and second challenge can be determined based on a state of a ledger associated with the composite cryptographic system.

Process 2000 determines (2004) a first modified challenge. In a variety of embodiments, the first modified challenge can be based on a first challenge and a second challenge. In some embodiments, to determine the first modified challenge, the process can combine the first challenge and the second challenge by performing a process including (but not limited to) XORing them, by hashing them, by concatenating them, or using a combination of these and other methods. Determining the first modified challenge may also include selecting a portion of the combined first challenge and second challenge. The selected portion for a first modified challenge may correspond to a first suitable length. The first suitable length can correspond to a requirement of a first constituent cryptographic system. In some embodiments the length of the first challenge may equal the length of the first modified challenge.

Process 2000 generates (2006) a first constituent proof. In some embodiments, the first constituent proof is generated using a first constituent cryptographic system and is based on at least a first modified challenge. The generation of the first constituent proof can be further based on a first difficulty parameter. In some embodiments, the first difficulty parameter can be adjusted based on one or more detected conditions. In various embodiments, the process can generate the first constituent proof based on the first challenge. In some embodiments the first constituent proof can be generated based on one or more configuration parameters.

Process 2000 determines (2008) a second modified challenge. In a variety of embodiments, the second modified challenge can be based on a first challenge, a second challenge and the first constituent proof. In some embodiments, to determine the first modified challenge, the system can combine two or more of the first challenge, the second challenge, and the first constituent proof by performing a process including (but not limited to) XORing them, by hashing them, by concatenating them, or using a combination of these and other methods. Determining the second modified challenge may also include selecting a portion of the combined first challenge, second challenge, and first constituent proof. The selected portion for a second modified challenge may correspond to a second suitable length. The second suitable length can correspond to a requirement of a second constituent cryptographic system. In some embodiments the length of the second challenge may equal the length of the second modified challenge.

Process 2000 generates (2010) a second constituent proof. In some embodiments, the second constituent proof is generated using a second constituent cryptographic system and is based on at least a second modified challenge. The generation of the second constituent proof can be further based on a second difficulty parameter. In some embodiments, the second difficulty parameter can be adjusted based on one or more detected conditions. In various embodiments, the process can generate the second constituent proof based on the second challenge. In some embodiments the second constituent proof can be generated based on one or more configuration parameters.

Process 2000 generates (2012), a composite proof. In some embodiments the composite proof can be a combination of constituent proofs. For example, composite proof can include an ordered list of constituent proofs. The order of the ordered list can be a pre-determined order corresponding to the composite cryptographic system.

Process 2000 sends (2014) the composite proof. The composite proof can be sent over a network. For example, processes in accordance with numerous embodiments of the invention can transmit the composite proof and use write access to write the proof to the ledger. In some embodiments, decentralized proof selection methods for identifying and selecting the most suitable proof can be used. Decentralized proof selection methods in accordance with several embodiments of the invention can be based on quorum agreement among one or more miners.

While specific processes for generating composite proofs are described above, any of a variety of processes can be utilized to generate a composite proof as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 21:
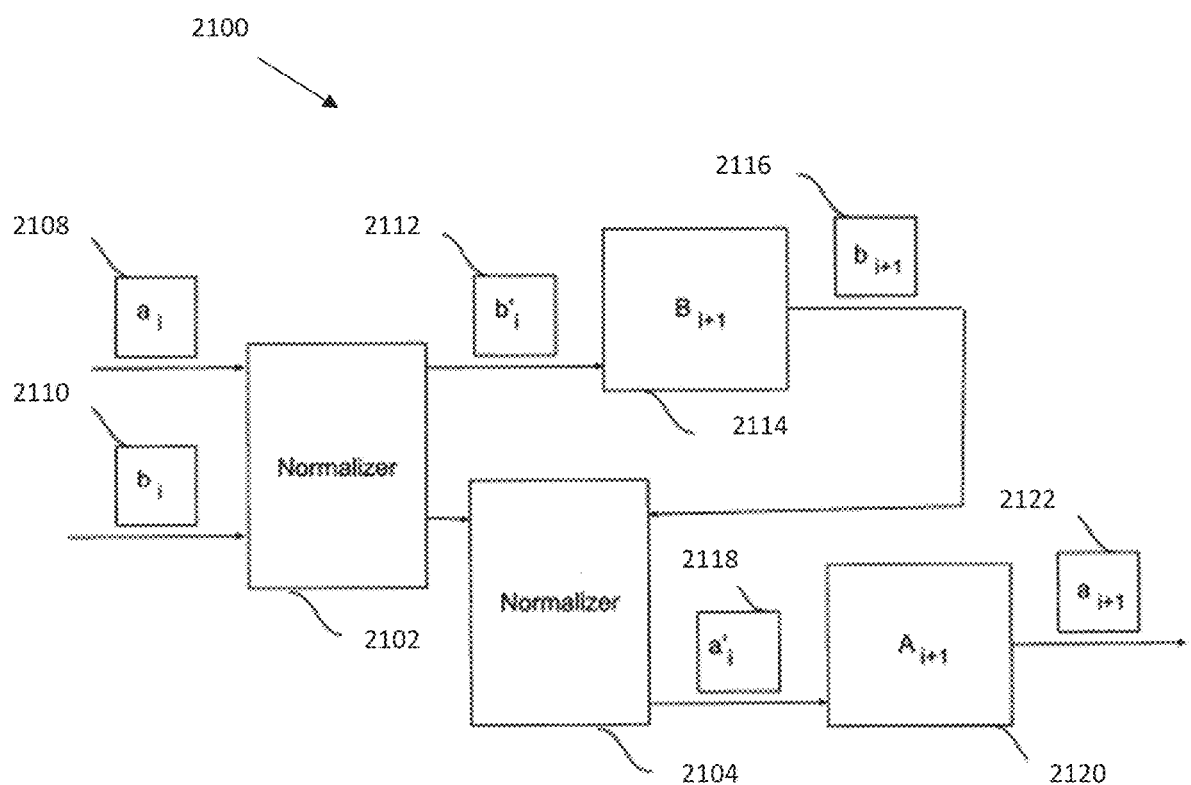
FIG. 21 conceptually illustrates an example of a series arrangement of cryptographic systems.

In some embodiments, composite cryptographic systems may include constituent cryptographic systems arranged in series. An example of a series arrangement of cryptographic systems A and B is illustrated in FIG. 21. In this figure a system 2100 includes a normalizer 2102, and a normalizer 2104. The normalizer 2102 receives challenge $a_i$ 2108 and challenge $b_i$ 2110 and determines modified challenge $b'_i$ 2112 as described throughout this description. The modified challenge $b'_i$ 2112 is used to generate the constituent proof Bi+1 2114 as described throughout this description. A challenge bi+1 2116 is determined based on the constituent proof Bi+1 2112. The normalizer 2104 receives bi+1 2116 and receives an output from the normalizer 2102. The normalizer 2102 determines a modified challenge a'i 2118. The modified challenge a'i 2118 is used to generate the constituent proof Ai+1 2120 as described throughout this description. A challenge ai+1 2122 is determined based on the constituent proof Ai+1 2120. Some aspects of the system 2100 may correspond to the process 2000.

In accordance with various embodiments of the invention, the constituent cryptographic system with the lowest operation costs can be arranged first in a series of constituent cryptographic systems. In a serial arrangement a constituent cryptographic system arranged after a first constituent cryptographic system is only used to generate a constituent proof if a constituent proof has been successfully generated on the first constituent cryptographic system. In some embodiments, the challenge b(i+1) can be omitted as an input to a normalizer for generating a modified challenge a'i. The normalizer can determine a'i based on ai.

While specific components relating to composite cryptographic systems that generate a composite proof are described above, any of a variety of components can be utilized to generate a composite proof as appropriate to the requirements of specific applications. In some embodiments, one or more of the above components may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 22:
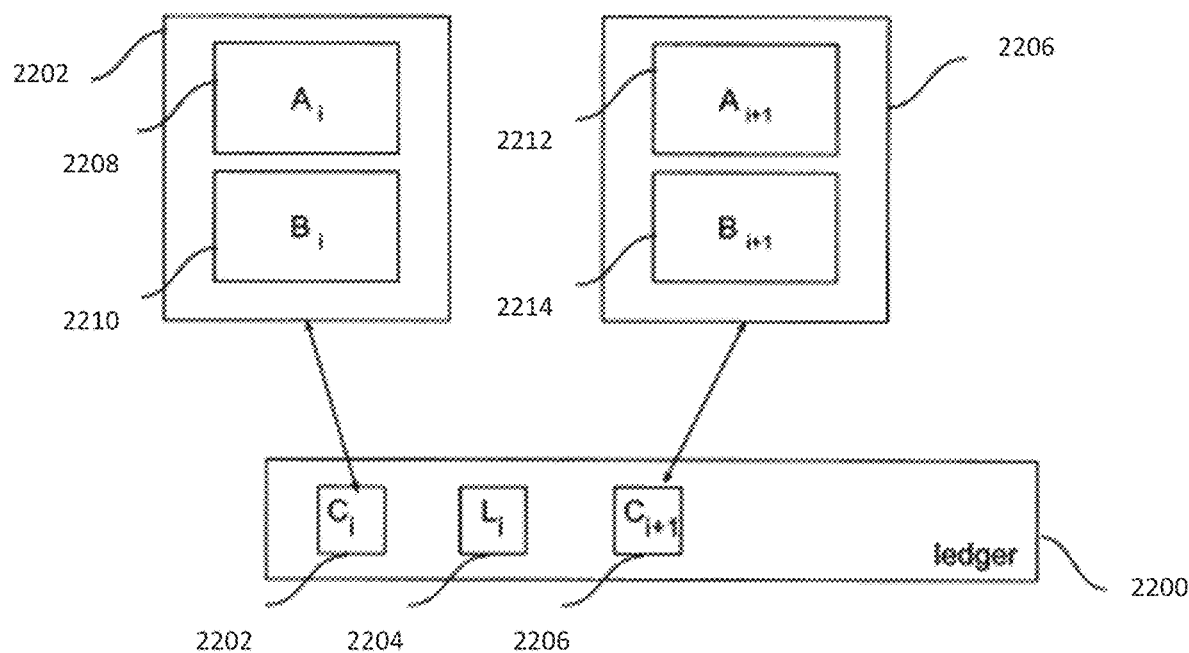
FIG. 22 conceptually illustrates an example of a ledger associated with a composite cryptographic system and incorporating composite proofs.

In some embodiments, composite cryptographic systems write composite proofs to a ledger. The ledger can store information and proofs associated with the composite cryptographic system. An example of a ledger associated with a composite cryptographic system and incorporating composite proofs is illustrated in FIG. 22. In this figure A ledger 2202 can include a composite proof Ci 2202, a ledger entry Li 2204 and a composite proof C(i+1) 2206. The contents of ledger 2200 can be accessed by miners. Composite Proof Ci 2202, can include a constituent proof Ai 2208 and a constituent proof Bi 2210. Composite proof C(i+1) 2206 can include a constituent proof A(i+1) 2212 and a constituent proof B(i+1) 2214.

In some embodiments each of the constituent proofs can be generated based on a challenge, or a modified challenge. In accordance with various embodiments of the invention the composite proofs can have two (or more) constituent proofs, in several embodiments, each constituent proof can correspond to a constituent cryptographic system. In a number of embodiments, the multiple constituent proofs can be generated using the same constituent cryptographic system configured using different parameters. Furthermore, in some embodiments, the constituent proofs of a composite proof can be composite proofs. In this case the constituent cryptographic systems would be composite cryptographic systems. For instance, a first composite cryptographic system can combine a second composite cryptographic system and a third composite cryptographic system.

While specific components relating to ledgers associated with composite cryptographic systems are described above, any of a variety of components can be utilized in relation to a ledger associated with a composite cryptographic system as appropriate to the requirements of specific applications. In some embodiments, one or more of the above components may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 23:
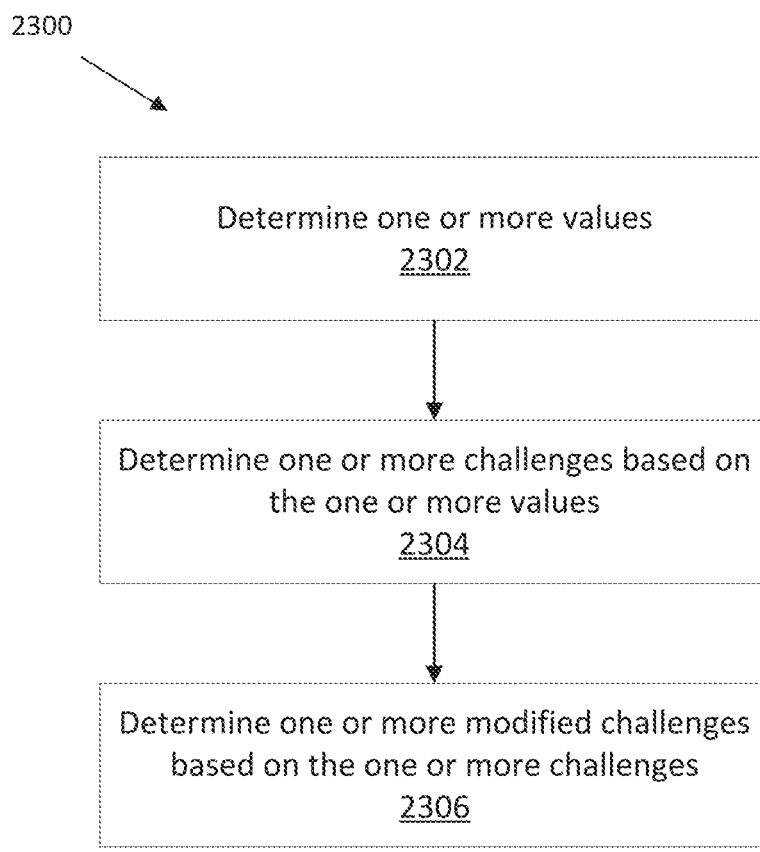
FIG. 23 conceptually illustrates an example of a process for generating challenges.

In some embodiments, challenges or modified challenges are used to generate composite proofs using composite cryptographic systems. In some cases, the challenges can be used to generate a modified challenge and the modified challenge can be used to generate a constituent proof. The challenges can be determined based on one or more values that can be accessed on a ledger associated with the composite cryptographic system. An example of a process for generating challenges is conceptually illustrated in FIG. 23. Processes for generating challenges in accordance with various embodiments of the invention can be executed by a miner.

Process 2300 determines (2302) one or more values. In some embodiments, challenges the one or more values can correspond to one or more proofs on a ledger associated with a cryptographic system. Determining one or more values can include accessing a ledger. In some embodiments one or more previously submitted proofs are identified by accessing a ledger.

Process 2300 determines (2304) one or more challenges based on the one or more values. For example, one or more challenges may be determined based on a first constituent proof and a second constituent proof. In various embodiments the first constituent proof and the second constituent proof can be combined to generate a challenge. The first constituent proof and the second constituent proof can be combined by performing a process including (but not limited to) XORing them, by hashing them, by concatenating them, or using a combination of these and other methods. Determining the challenge may also include selecting a portion of the combined first constituent proof and second constituent proof. The selected portion may correspond to a suitable length. The suitable length can correspond to a requirement of a constituent cryptographic system. In accordance with various embodiments of the invention, a single challenge ci may be determined. The challenge may be determined based on the one or more values by performing a process including (but not limited to) combining them and/or computing a hash from the one or more values. In some embodiments, a challenge is generated for each constituent cryptographic system.

Process 2300 determines (2306) one or more modified challenges based on the one or more challenges. In a variety of embodiments, a first modified challenge can be based on a first challenge and a second challenge. Any of the various processes for determining modified challenges discussed herein can be utilized. In some embodiments a modified challenge can be determined for each constituent cryptographic system. Multiple different modified challenges can be determined based on a single challenge. In some embodiments, this step may be omitted.

While specific processes for determining one or more modified challenges are described above, any of a variety of processes can be utilized to determine one or more modified challenges as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Configuration Parameters

In many embodiments, a composite cryptographic system can rely on various configuration parameters to determine the characteristics of the composite cryptographic system. In addition, the constituent cryptographic systems can rely on various configuration parameters to determine the characteristics of each constituent cryptographic system. In many embodiments, the configuration parameters can be varied based on rules. In some embodiments of the invention, changing the parameters associated with a composite cryptographic system can vary the relative and/or absolute difficulty parameter of each constituent cryptographic system. When the difficulty parameter is modified in this way, challenges associated with one or more constituent cryptographic systems can be based on the corresponding difficulty parameter.

In some embodiments, changing the configuration parameters of the composite cryptosystem can improve the security, the energy efficiency and/or other properties of the cryptographic system. In several implementations of the invention, the configuration parameters can be changed in response to one or more detected conditions. In various embodiments, the detected conditions can relate to an attack on the security of the system. In some embodiments an attack can be detected based on changes to the state of a ledger (e.g. proof interarrival times). In various embodiments an attack can be detected based on evidence generated by a miner. The verification of the evidence generated by the miner can be sufficient to trigger an attack detection. The evidence can be an evidence combination including two proofs. In some embodiments, the detected conditions can relate to one or more criteria including (but not limited to) a defined number of proofs having been generated, an amount of time elapsing, a proof generation time, and/or other conditions.

In some embodiments, the configuration parameters can determine what properties a composite cryptographic system will inherit from its constituent cryptographic systems. For example, by modifying the difficulty parameter associated with mining for different component cryptographic systems, an intended balance between different properties may be achieved. When more insights are gained related to the properties (such as the security) of the underlying constituent cryptographic systems, the configuration parameters can be updated to reflect a new preferred balance between the constituent cryptographic systems.

Figure 24:
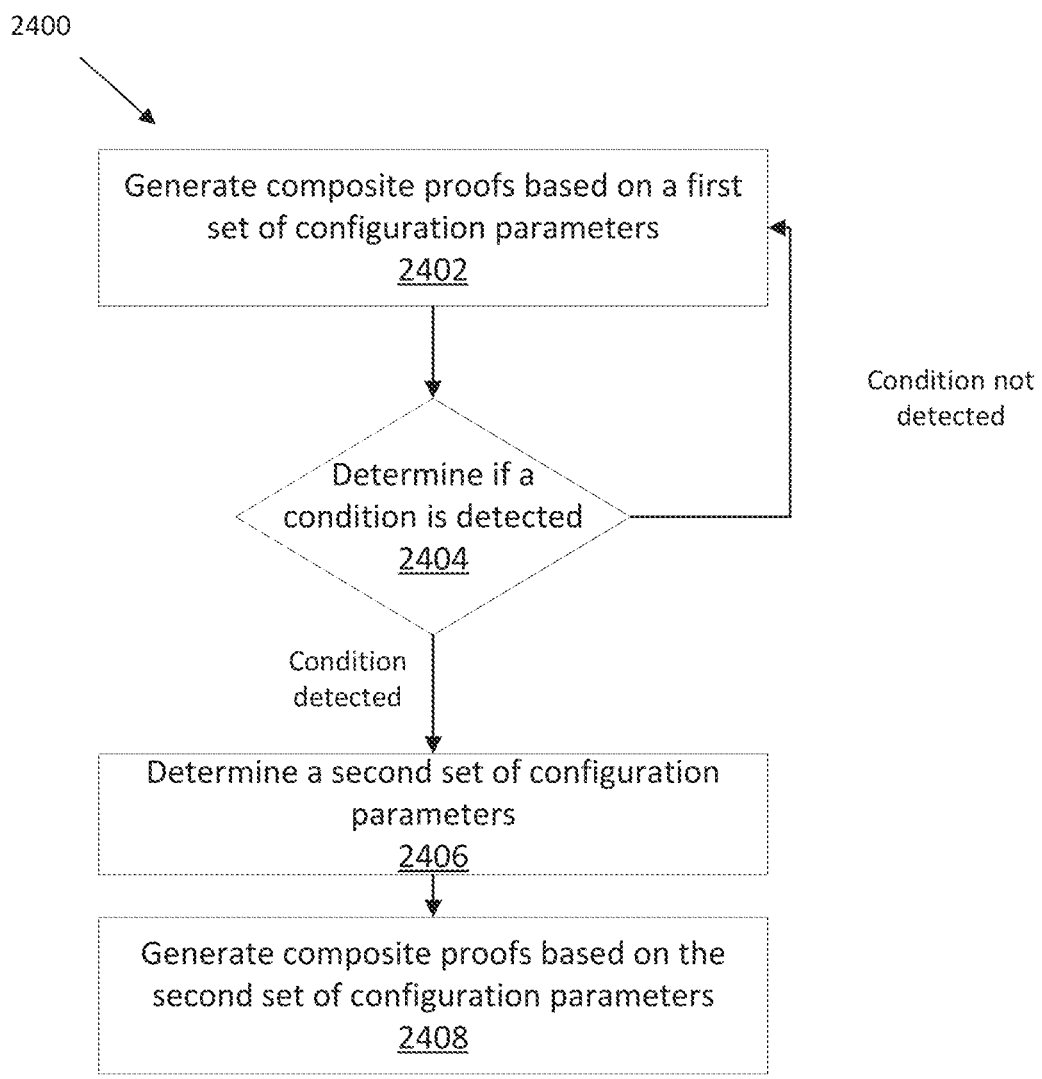
FIG. 24 conceptually illustrates an example of a process for generating composite proofs based on variable configuration parameters.

In accordance with various embodiments of the invention, generating composite proofs can be at least partially based on configuration parameters. Configuration parameters can be varied based on detected conditions. Varying the configuration parameters can change the characteristics of a composite cryptographic system. In various embodiments, the configuration parameters can include difficulties associated with one or more constituent cryptographic systems. Detected conditions can include (but are not limited to) detecting an attack on the security of one or more constituent cryptographic systems. Conditions can be detected in various ways. An example of a process for generating composite proofs based on variable configuration parameters is conceptually illustrated in FIG. 24. Processes for generating composite proofs based on variable configuration parameters in accordance with various embodiments of the invention can be executed by a miner.

Process 2400 generates (2402) composite proofs based on a first set of configuration parameters. Composite proofs can be generated in accordance with various embodiments and examples described herein. Composite proofs can be generated based on difficulties associated with constituent cryptographic systems. For example, a first constituent proof can be generated using a first constituent cryptographic system with one or more first configuration parameters (e.g. first difficulty parameter). A second constituent proof can be generated using a second constituent cryptographic system with one or more second configuration parameters (e.g. second difficulty parameter).

Process 2400 determines (2404) if a condition is detected. When process 2400 determines that the condition is detected, the process 2400 moves on to step 2406. If process 2400 determines that the condition is not detected, the process 2400 returns to step 2402. In various embodiments, the detected condition can be a threshold number of miners taking an action. The detected condition can be receiving an indication over a network. The detection of a condition can be based on a quorum agreement among one or more miners. In some embodiments that condition determination may include receiving data from a network. In some embodiments, the data could be supplied by a network of miners, or some other source. Determining if a condition is detected could include determining if an attack on the composite cryptographic system is occurring or has occurred. The detection of an attack can be based on a quorum agreement among one or more miners. Further discussion of detecting an attacking on a cryptographic system is discussed below.

In accordance with various embodiments of the invention, the process can determine if a first condition is detected, and based on the outcome determine if one or more additional conditions are detected. For example, the process may first determine if a first attack took place, and then determine if a second attack took place. The configuration parameters selected in response to detecting a first condition (e.g. first attack) or a second condition (e.g. attack) may correspond to a first set of configuration parameters (e.g. a first difficulty parameter) and a second set of configuration parameters (e.g. a second difficulty parameter).

Process 2400 determines (2406) a second set of configuration parameters. In some embodiments, the second set of configuration parameters can correspond to a new first difficulty parameter associated with a first constituent cryptographic system. The second set of configuration parameters can correspond to a new second difficulty parameter associated with a second constituent cryptographic system. In some embodiments, various factors can affect the difficulties selected. For example, the selected difficulty parameter might be determined based on characteristics of the attack, and/or on information distributed via a quorum agreement among one or more miners. In some embodiments the selected difficulty parameter can be determined based on information received from a network. In a number of embodiments, when an attack is detected, the difficulty parameter is modified to compensate for the risk associated with the attack. As noted above, varying the configuration parameters in this way can change the security and/or other characteristics of a cryptographic system including (but not limited to) energy consumption, block speed and/or other characteristics of the cryptographic system.

In some embodiments, modifications to the configuration parameters can occur once per time interval. For example, configuration parameter changes may only be permitted once per day. In various embodiments, configuration parameter changes can occur at a specific time (e.g. midnight Eastern Standard Time). Time information may be obtained from a time provider. In some embodiments, some configuration parameter changes may be permitted to happen at any time, while others are limited to certain times. For example, depending on whether a first condition is detected, or a second condition is detected can also determine whether the parameter change takes effect immediately or that the parameter change will take place at a particular time.

Process 2400 generates (2408) composite proofs based on a second set of configuration parameters. Composite proofs can be generated using any of the processes described herein. Composite proofs can be generated based on difficulties associated with constituent cryptographic systems. For example, a first constituent proof can be generated using a first constituent cryptographic system with a third set of configuration parameters (e.g. third difficulty parameter). A second constituent proof can be generated using a second constituent cryptographic system with a fourth set of configuration parameters (e.g. fourth difficulty parameter).

While specific processes for determining composite proofs based on configuration parameters are described above, any of a variety of processes can be utilized to composite proofs based on configuration parameters as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a composite cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 25:
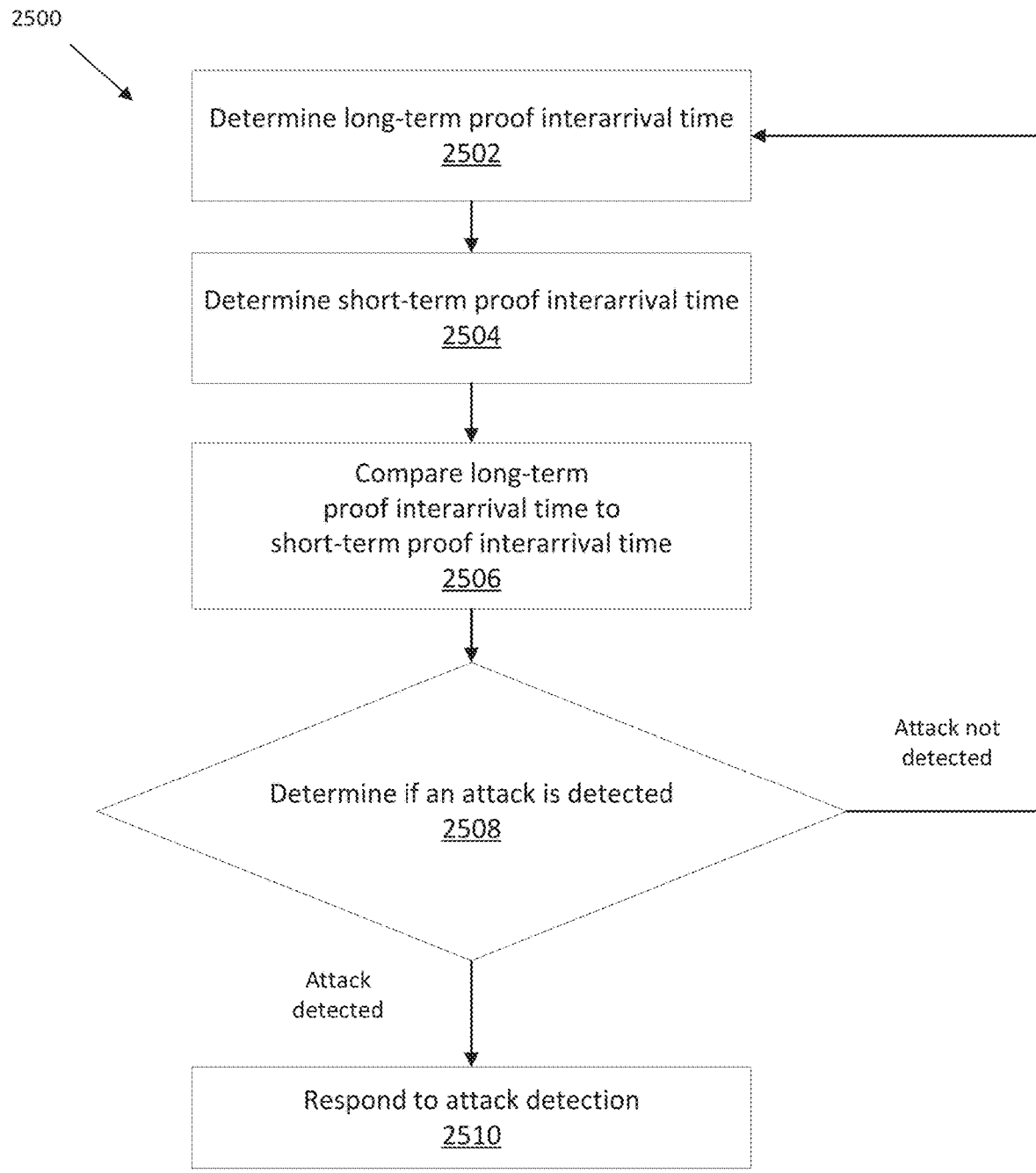
FIG. 25 conceptually illustrates an example of a process for detecting an attack by comparing long-term proof interarrival times and short-term proof interarrival times.

In some embodiments, configuration parameters of a cryptographic system can be varied based on one or more detected conditions. Configuration parameters can be based on a detection of an attack. In various embodiments an attack can be detected by comparing long-term proof interarrival times and short-term proof interarrival times. The proof interarrival time can be the time between consecutive proofs. An example of a process for detecting an attack by comparing long-term proof interarrival times and short-term proof interarrival times is conceptually illustrated in FIG. 25. Processes for detecting an attack by comparing long-term proof interarrival times and short-term proof interarrival times in accordance with various embodiments of the invention can be executed by a miner.

Process 2500 determines (2502) a long-term proof interarrival time. In accordance with various embodiments of the invention, the long-term proof interarrival time can be determined based on one or more of sets of previous proofs. Each set may include two consecutive proofs. Each set can be associated with a set interarrival time equal to the time between the two consecutive proofs in the set. A calculation can be used to determine a long-term proof interarrival time based on a number of sets (e.g. based on a number of set interarrival times). In some examples the calculation can be a mean, median, mode, or another function. A long-term proof interarrival time can be an average interarrival time determined based on a first number of previous proofs.

Process 2500 determines (2504) a short-term proof interarrival time. In accordance with some embodiments of the invention, the short-term proof interarrival time can be determined based on one or more sets of previous proofs. Each set may include two consecutive proofs. Each set can be associated with a set interarrival time equal to the time between the two consecutive proofs in the set.

In a number of embodiments, a calculation can be used to determine a long-term proof interarrival time based on a number of sets (e.g. based on a number of set interarrival times). In many embodiments, the long-term proof interarrival time can be based on more sets than are utilized to determine the short-term proof interarrival time. In several embodiments, the sets utilized to determine the short-term proof interarrival time can be more recent than the sets utilized to determine the long-term interarrival time. In certain embodiments, the short-term proof interarrival time can be an average interarrival time determined based on a second number of previous proofs. In some embodiments the long-term proof interarrival time is determined based on a larger number of previous proofs than the short-term proof interarrival time.

Process 2500 compares (2506) the long-term proof interarrival time and the short-term proof interarrival time. In some embodiments a proof interarrival time ratio is calculated, the ratio can be a ratio of the short-term proof interarrival time to the long-term proof interarrival time, or vice-versa.

Process 2500 determines (2508) whether an attack is occurring. When an attack is detected the process 2500 can continue to 2510. When an attack is determined not to be occurring, the process 2500 can continue to 2502. In some embodiments first information related to a first set of one or more proofs is compared to second information related to a second set of one or more proofs. In some embodiments, an attack can be detected based on the comparison of the first and second information. As an example, where the last 10000 proofs were added in 50000 seconds (a time of, on average, 5 seconds per proof), and the last 100 proofs were added in 100 seconds (a time of 1 second per proof, on average) an attack detection can be detected. In various embodiments, when the proof interarrival ratio exceeds (or fails to exceed) a threshold value, the system can determine that an attack has been detected (or not detected). As can readily be appreciated the specific manner in which long-term proof interarrival times and the short-term proof interarrival times can be utilized to detect attacks is largely dependent upon the requirements of a specific application.

In various embodiments, determining whether an attack has occurred can include receiving information from one or more miners. The detection of an attack can be based on quorum agreement among one or more miners. In some embodiments determining that an attack has occurred can include determining that a quorum of miners have detected that an attack has occurred. In this way, a determination can be made as to whether an attack took place based on quorum agreement among one or more miners.

Process 2500 responds (2510) to attack detection. In some embodiments the process can send the proof interarrival ratio, the long-term proof interarrival time, and/or the long-term proof interarrival time to one or more miners. In various embodiments, the process can be used to automatically modify configuration parameters (e.g. to increase security and/or modify the cryptographic system to make the system less susceptible to the attack) in accordance with the various processes for modifying parameters of cryptographic systems described herein.

While specific processes for detecting an attack are described above, any of a variety of processes can be utilized to detect an attack as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to varying configuration parameters of a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Evidence Combination for Detecting Attacks

Cryptographic systems in accordance with many embodiments of the invention can detect attack based on evidence generated by one or more miners. The verification of the evidence generated by the miner can be sufficient to substantiate an attack detection. In various embodiments, the evidence is a combination of evidence that includes a proof corresponding to a first challenge (e.g. a graph corresponding to a Proof Space) and a second proof corresponding to a second challenge (e.g. a graph corresponding to a Proof Space). In certain embodiments, the proofs are sequential new proofs. If a verifier determines that both proofs are valid relative to the corresponding challenges an attack can be detected. For a secure cryptographic system, it should be difficult for a miner to generate a first proof. It should be effectively impossible for a miner to determine the next two proofs prior to another miner computing the next one proof. Therefore, if a miner submits the next two proofs (and they are valid) together, this, by itself, demonstrates a security weakness. While specific examples of processes for detecting attacks are described below, the methods described herein should be understood as applicable to various cryptographic systems including cryptographic systems that employ PoW, PoS, PoSt, PoB, PoM and/or any other appropriate proof mechanism.

Figure 26:
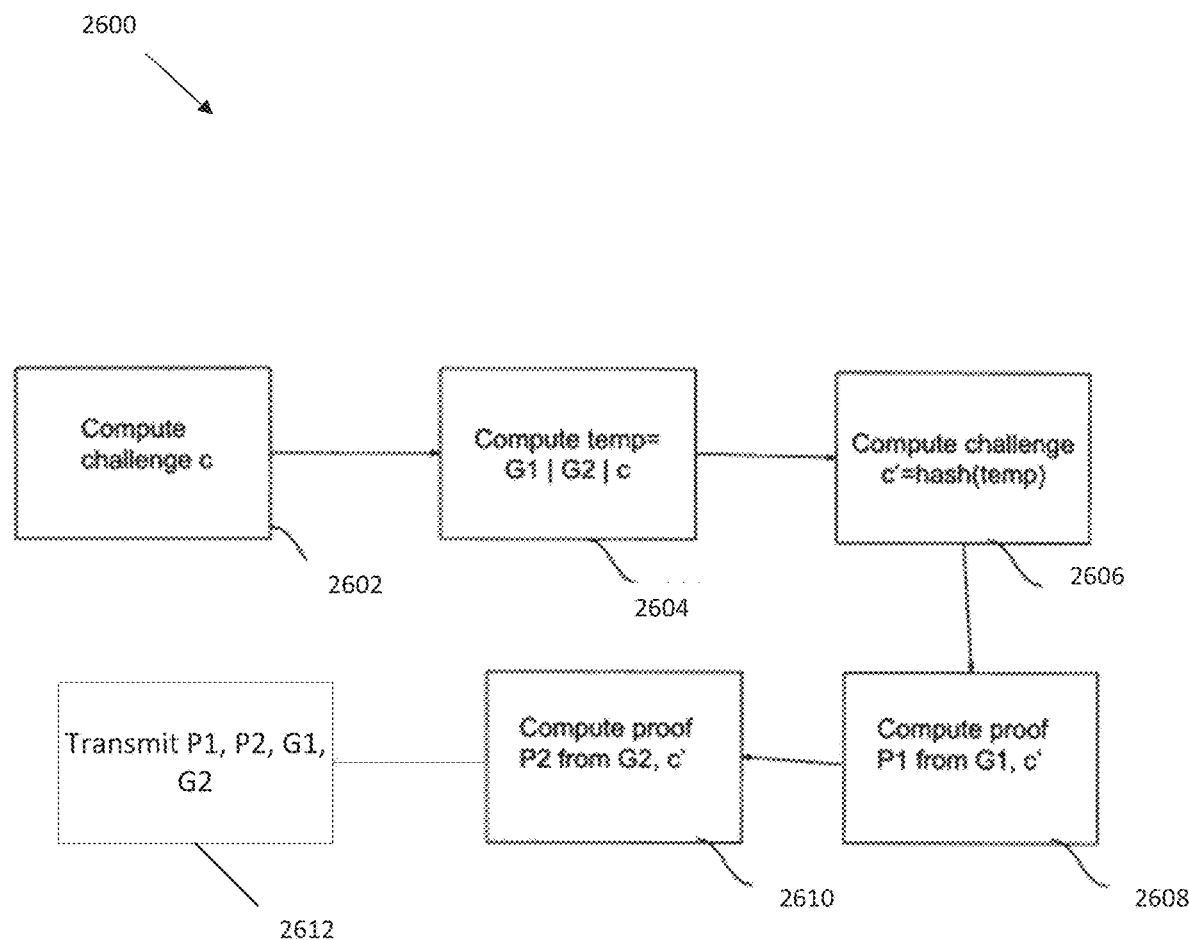
FIG. 26 conceptually illustrates an example of a process for generating an evidence combination for detecting an attack.

In some embodiments, configuration parameters of a cryptographic system can be varied based on one or more detected conditions. For example, configuration parameters can be modified based on a detection of an attack. In various embodiments a process can generate an evidence combination to demonstrate an attack occurred. The evidence combination can be verified in another process. An example of a process for generating an evidence combination with respect to an attack is conceptually illustrated in FIG. 26. Processes for generating an evidence combination for detecting an attack in accordance with several embodiments of the invention can be executed by a miner.

Process 2600 computes (2602) a challenge (e.g. c). The challenge can be computed using any of the various processes for computing challenges described herein.

Process 2600 computes (2604) a temporary value. In some embodiments the temporary value can be a combination (e.g. concatenation, Hash, XOR) of G1, G2 and the challenge. In this example, G1 corresponds to a first proof-of-space graph describing a first space instance and G2 corresponds to a second proof-of-space graph describing a second space instance. In various embodiments, the first proof-of-space graph can correspond to a first constituent cryptographic system. The second proof-of-space graph can correspond to a second constituent cryptographic system.

Process 2600 computes (2606) a hash of the temporary value. In some embodiments the hash of the temporary value can be a commitment (e.g. c') to generate a proof for the first instance, corresponding to graph G1, as well as for the second instance, corresponding to graph G2.

Process 2600 computes (2608) a first proof (e.g. P1) from the first space instance, corresponding to graph G1, based on using the commitment (e.g. c') as a challenge.

Process 2600 computes (2610) a first proof (e.g. P2) from the second space instance, corresponding to graph G2, based on using the commitment (e.g. c') as a challenge.

Process 2600 transmits (2612) the evidence combination. The evidence combination can include P1 and P2, along with information related to G1 and G2. In various embodiments P1, P2, and information related to G1, and G2 can be transmitted to a verifier. The evidence combination can be evidence of an attack.

While the example above discusses generating an evidence combination with respect to a PoS cryptographic system, the process can be adapted to apply to a system incorporating one of, or a combination of cryptographic systems including PoW, PoS, PoSt, PoB, PoM. In various embodiments, adapting the example merely requires generating proofs according to a different cryptographic system's proof requirements instead of as described.

While specific processes for generating an evidence combination for detecting an attack are described above, any of a variety of processes can be utilized to generate an evidence combination for detecting an attack as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to varying configuration parameters of a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Figure 27:
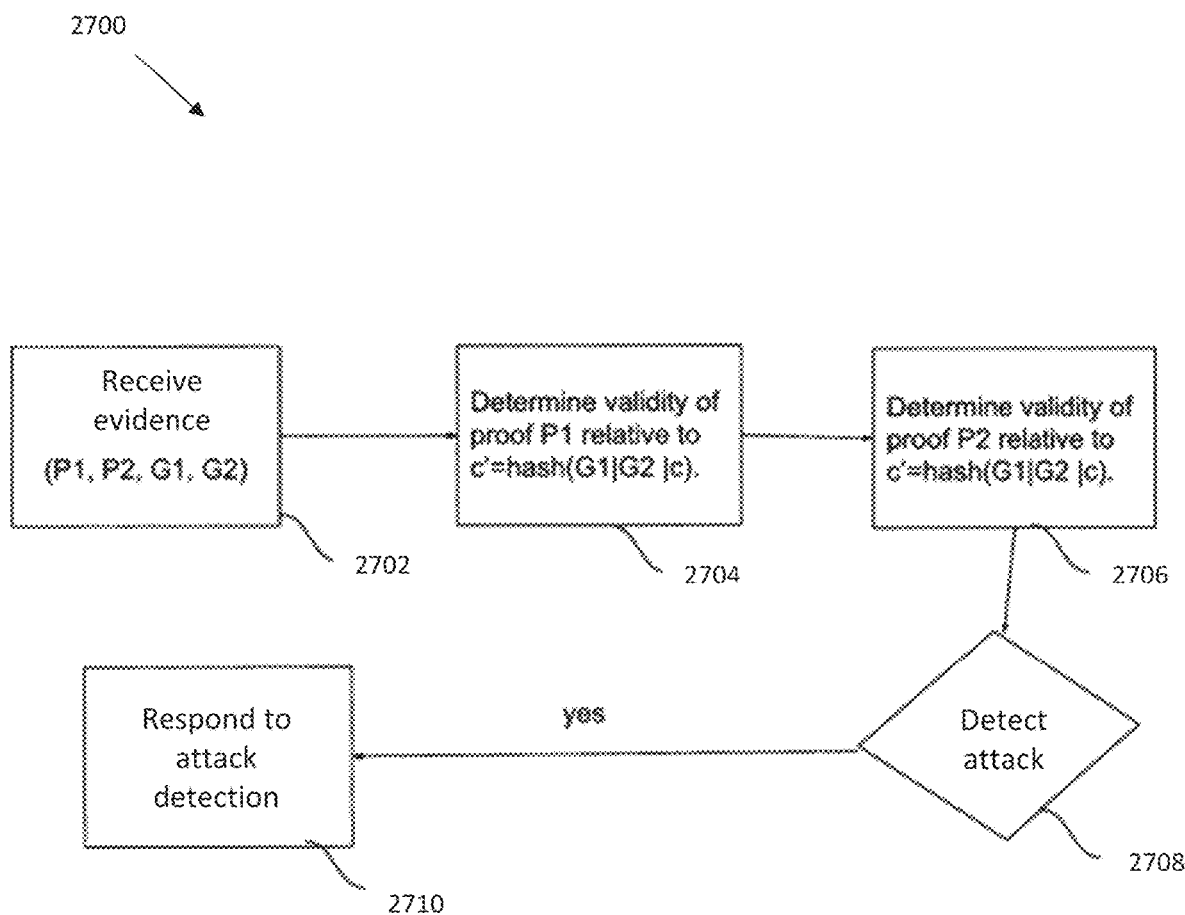
FIG. 27 conceptually illustrates an example of a process for detecting an attack based on an evidence combination.

In some embodiments, configuration parameters of a cryptographic system can be varied based on one or more detected conditions. Configuration parameters can be based on a detection of an attack. In various embodiments an attack can be detected based on a generated evidence combination. An example of a process for detecting an attack based on a generated evidence combination is conceptually illustrated in FIG. 27. processes for detecting an attack based on a generated evidence combination in accordance with embodiments of the invention can be executed by a verifier.

Process 2700 receives (2702) an evidence combination. The evidence combination can be evidence of an attack. In various embodiments, the evidence combination can be P1, P2, and information related to G1, and G2 (see above), can be transmitted to a verifier which computes (2602) a challenge (e.g. c). In various embodiments, the challenge can be computed using any of the processes for computing challenges described herein. In some embodiments the process can read the evidence combination. For example, the process can read P1, P2, G1 and G2.

Process 2700 determines (2704) whether P1 is a valid proof for graph G1, based on a challenge (e.g. c' as described elsewhere).

Process 2700 determines (2706) whether P2 is a valid proof for graph G2, based on a challenge (e.g. c' as described elsewhere).

Process 2700 detects (2708) if an attack occurred. In various embodiments, detecting if an attack occurred is based on w whether P1 is a valid proof for graph G1, based on a challenge (e.g. c' as described elsewhere) and whether P2 is a valid proof for graph G2, based on a challenge (e.g. c' as described elsewhere). If both P1 and P2 are valid an attack is detected and the process continues to 2710. Different correctness thresholds can be used in accordance with various embodiments of the invention.

Process 2700 responds (2710) to attack detection. In some embodiments the process can send a message to one or more miners. In various embodiments, the process can be used to automatically modify configuration parameters as described elsewhere.

While the example above discusses detecting an attack based on an evidence combination with respect to a PoS cryptographic system, the process can be adapted to apply to a system incorporating one of, or a combination of cryptographic systems including PoW, PoS, PoSt, PoB, PoM. In various embodiments, adapting the example merely requires verifying proofs according to a different cryptographic system's proof requirements instead of as described.

While specific processes for detecting an attack based on a generated evidence combination are described above, any of a variety of processes can be utilized to detect an attack based on a generated evidence combination as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to varying configuration parameters of a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described herein.

Cross-Timestamping Between Cryptographic System

Composite cryptographic systems in accordance with many embodiments of the invention perform cross-timestamping between cryptographic systems, which can provide security benefits typically not achievable using a single cryptographic system. In several embodiments, cross-timestamping allows records associated with a first blockchain to be stored on a second blockchain. If the security of the first blockchain is attacked, the security of past records can be maintained by the second blockchain. In some embodiments, records from the first blockchain can be recorded to the second blockchain based on one or more conditions. In some embodiments, cross-timestamping can be triggered upon detection of a condition. In several embodiments, the quantity and nature of timestamping can be a parameter of a cryptographic system. For example, cross-timestamping frequency can be a parameter that can be altered dependent on a detected condition (e.g. based on a detected attack).

In some embodiments cross-timestamping can be used to store records associated with a first blockchain (or ledger) on a second blockchain (or ledger). This can be useful for generating an immutable record of (or reference to) the first blockchain on the second blockchain. Cross-timestamping can be implemented in response to a detected condition such as (but not limited to) in response to detection of an attack. An example of a process for cross-timestamping in response to a detected condition is conceptually illustrated in FIG. 28. Processes for cross-timestamping in response to a detected condition in accordance with various embodiments of the invention can be executed by a miner.

Process 2800 determines (2802) one or more challenges. In various embodiments one or more challenges or modified challenges can be determined as described elsewhere. In some embodiments, the challenge for the proof can be based on a previous proof from the second cryptographic system, a previous proof from the first cryptographic system and/or a ledger entry from the second cryptographic system. In some cases, determining the challenge can be attempted using a first process or a second process. For example, a challenge can be attempted using a first process, and if the first process fails, the challenge can be attempted using a second process. In various embodiments, the first process for determining the challenge can be based on a previous proof from the second cryptographic system and/or a ledger entry from the second cryptographic system. A second process for determining the challenge can be used in response to information related to the second cryptographic system being unavailable. The second process for determining the challenge can be based on an alternative input, such as (but not limited to) a previous proof and/or ledger entry from a first cryptographic system.

In some embodiments, a challenge generated using the first process can be associated with a first indicator. A challenge generated using the second process can be associated with a second indicator. In some embodiments, generating the challenge using the second process can be associated with a failure to cross-timestamp a ledger entry. An indicator can be associated with a proof on a ledger based on a failure to cross-timestamp. In various embodiments, a failure to cross-timestamp can result in a previously issued token amount or value being reduced.

In accordance with various embodiments of the invention, one or more tokens may be related to a first challenge. For example, one or more tokens may be generated based on generating a proof based on the first challenge. The number of tokens generated can be based on whether the first challenge was completed using the first process or the second process. A first number of tokens may be generated if a successful proof is based on the use of a first process for determining the challenge. A second number of tokens may be generated if a successful proof is obtained using a second process for determining the challenge. The first number of tokens may be larger than the second number of tokens. The second number of tokens may be larger than the first number of tokens. In some embodiments there can be more than two process that can be utilized for determining a challenge. In several embodiments, each of the processes for determining the challenge can be associated with different amounts of tokens. In various embodiments, the generated tokens are associated with a public key. The public key can be associated with the process generating the proof.

In accordance with various embodiments of the invention, one or more token transfers may be related to a first challenge. For example, one or more tokens may be transferred based on generating a proof based on the first challenge. The number of tokens transferred can be based on whether the first challenge was completed using the first process or the second process. A first number of tokens may be transferred if a successful proof is based on the use of a first process for determining the challenge. A second number of tokens may be transferred if a successful proof is obtained using a second process for determining the challenge. The first number of tokens may be larger than the second number of tokens. The second number of tokens may be larger than the first number of tokens. In some embodiments there can be more than two process that can be utilized for determining a challenge. In several embodiments, each of the processes for determining the challenge can be associated with different amounts of transferred tokens. In various embodiments, the transferred tokens are associated with a receiving public key and a sending. The receiving public key can be associated with the process generating the proof.

Process 2800 generates (2804) one or more proofs based on the one or more challenges. In various embodiments one or more proofs (e.g. constituent proofs or composite proofs) can be determined using any of the various processes described herein.

Process 2800 determines (2806) if a condition is detected. When the condition is detected, the process 2800 can continue to 2808. In some embodiments, the condition can be detected based on various conditions. For example, the condition can be detected in response to a predetermined number of proofs (e.g., every 100 proofs, or any other number of proofs). The condition can be detected based on the contents of the proof (e.g. if the challenge used to compute the proof has a trailing series of ten bits which are all zero—an event that should happen with a probability of 1/1024). In a number of embodiments, the condition can be detected based upon any of a variety of criteria including (but not limited to) the challenge used to generate the proof; the form of the proof; an output of a function, where the inputs to the function can be the challenge, proof, and/or other received information; a reduction in proof inter-arrival time; a reduction in a difficulty parameter associated with a cryptographic system; detecting an attack; and/or a combination of these and/or any other conditions. As can readily be appreciated, the specific criterion and/or criteria that can trigger detection of a condition in accordance with various embodiments of the invention are dependent upon the requirements of specific applications.

Process 2800 cross-timestamps (2808) the one or more proofs. In various embodiments, cross-timestamping includes transmitting information associated with a first ledger for inclusion into a second ledger. In some embodiments, a value (e.g. K(j)2) can be computed from the contents of the first ledger. The value can then be committed to a second ledger. For example, the value may be computed as a hash value of the most recent proof associated with the first cryptographic system. In accordance with embodiments of the invention, the value can be computed as a hash value of one or more elements of first ledger. In several embodiments, the value can be a hash of one or more elements that were added to the first ledger since the last cross-timestamping. In some embodiments, the value can be a hash of a specific number of proofs last committed to the first ledger (e.g. the last 256 proofs committed to a ledger). In a number of embodiments, a proof on the first ledger may only be valid if it is subsequently cross-timestamped to the second ledger within a bounded period of time. The bounded period of time can be determined based on a number of future proofs being generated. For example, a proof may be required to be cross-timestamped within 1, 2, 3 or more future proofs being generated. In some embodiments, a proof may be flagged if it is not adequately cross-timestamped (e.g. if it is not cross-timestamped within 1, 2, 3 or more future proofs being generated).

While specific processes for cross-timestamping in response to detecting a condition are described above, any of a variety of processes can be utilized to cross-timestamping in response to detecting a condition as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to cross-timestamping, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

In some embodiments cross-timestamping can be used to store records associated with a first blockchain (or ledger) on a second blockchain (or ledger). This can be useful for generating an immutable record of (or reference to) the first blockchain on the second blockchain. An example of cross-timestamping is conceptually illustrated in FIG. 29. Processes for cross-timestamping can be executed by a miner.

Figure 28:
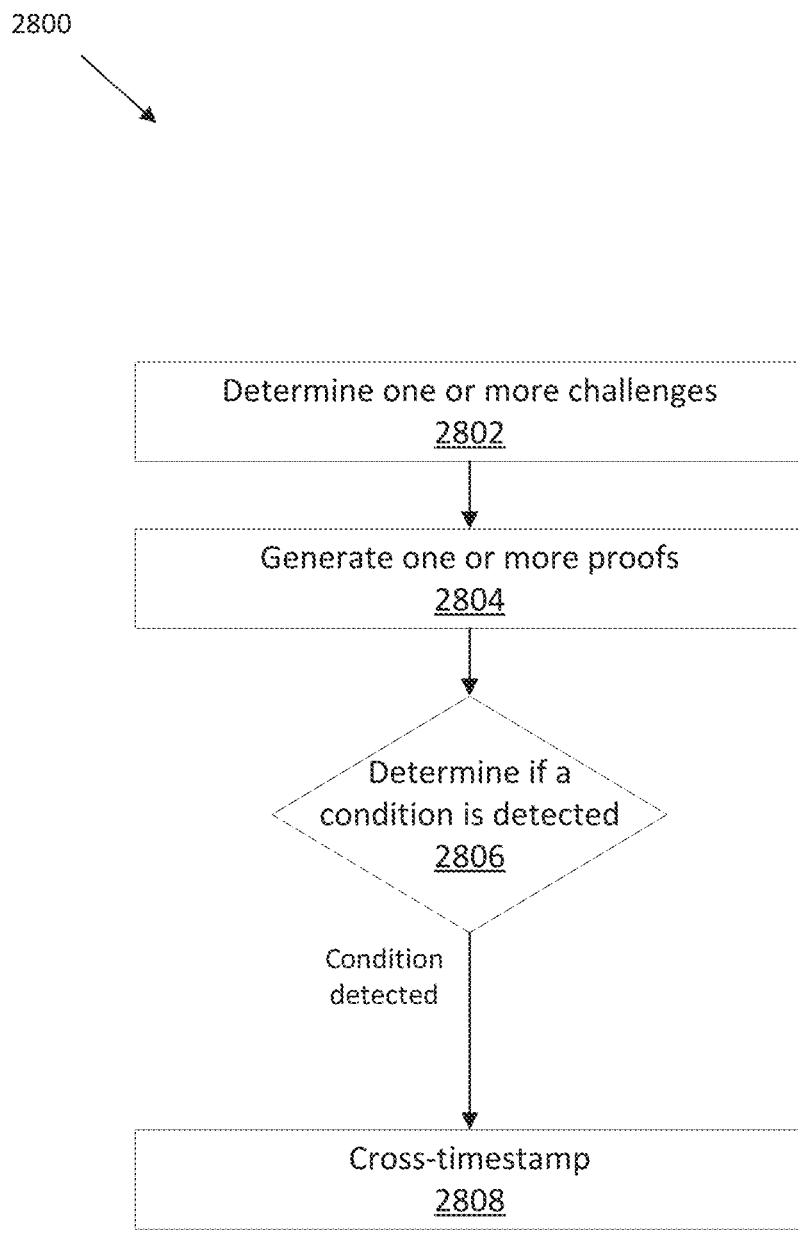
FIG. 28 conceptually illustrates an example of a process for cross-timestamping in response to a detected condition.
Figure 29:
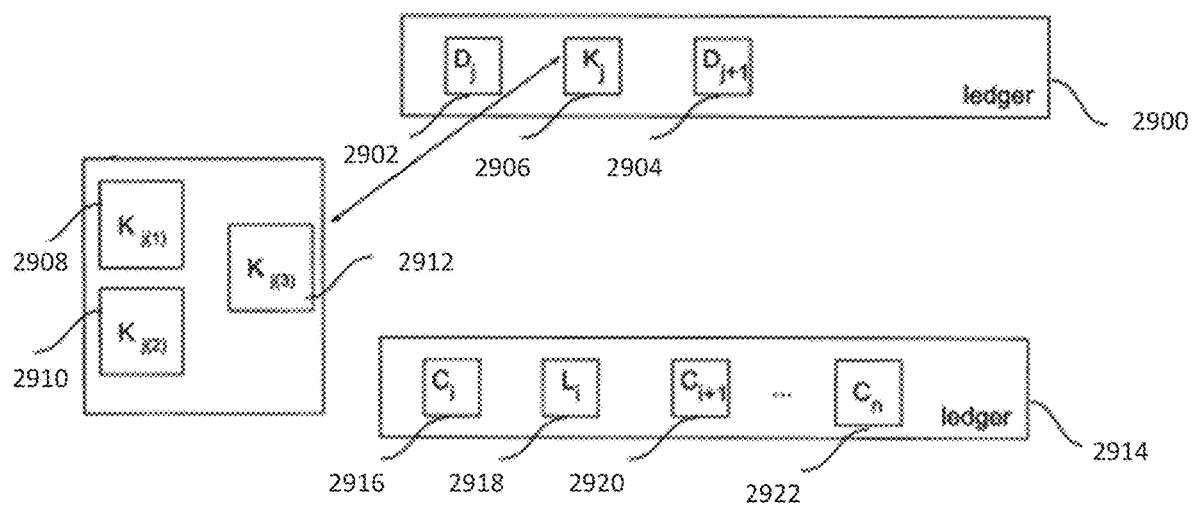
FIG. 29 conceptually illustrates an example of cross-timestamping.

The process depicted in FIG. 28 is further illustrated by the example of cross-timestamping depicted in FIG. 29. The ledger 2900 contains proof Dj 2902 and proof D(j+1) 2904, along with ledger entry Kj 2906. The proof D(j+1) 2904 can be a function of proof Dj 2902 and the ledger entry Kj 2906. The proof D(j+1) 2904 can be generated based on using a challenge that is computed from proof Dj 2902 and ledger entry Kj 2906. The ledger entry Kj 2906 can include information to be timestamped. For example, the ledger entry Kj 2906 can correspond to values Kj(1) 2908, value Kj(2) 2910 and Kj(3)2912. In some embodiments, the information to be timestamped can correspond to any number of values. The ledger 2900 can correspond to a cryptographic system, such as a constituent cryptographic system or a composite cryptographic system. Ledger 2914 can include proof Ci 2916, ledger entry Li 2918, proof C(i+1) 2920 along with additional ledger entries and additional proofs, including a proof Cn 2922.

While specific components for cross-timestamping are described above, any of a variety of components can be utilized to cross-timestamp as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to cross-timestamping, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Qualifying Proofs

Cryptographic systems in accordance with several embodiments of the invention utilize composite proofs. In a number of embodiments, a composite proof is generated using a qualitative-qualifying proof system. Initially, a qualitative proof can be generated using a cryptographic system such as PoW, PoS, PoSt, PoB, or PoM. A qualifying proof can be generated conditionally on a successful generation of the qualitative proof. The qualitative-qualifying proof system can enable processor downtime for some miners on a network who have failed to generate a successful qualitative proof. The substitution of a large qualitative proof with a smaller qualitative proof and a smaller, and conditional, qualifying proof, can maintain the expected workload for winning miners, but reduces the system-wide energy consumption (e.g. by almost half).

Figure 30:
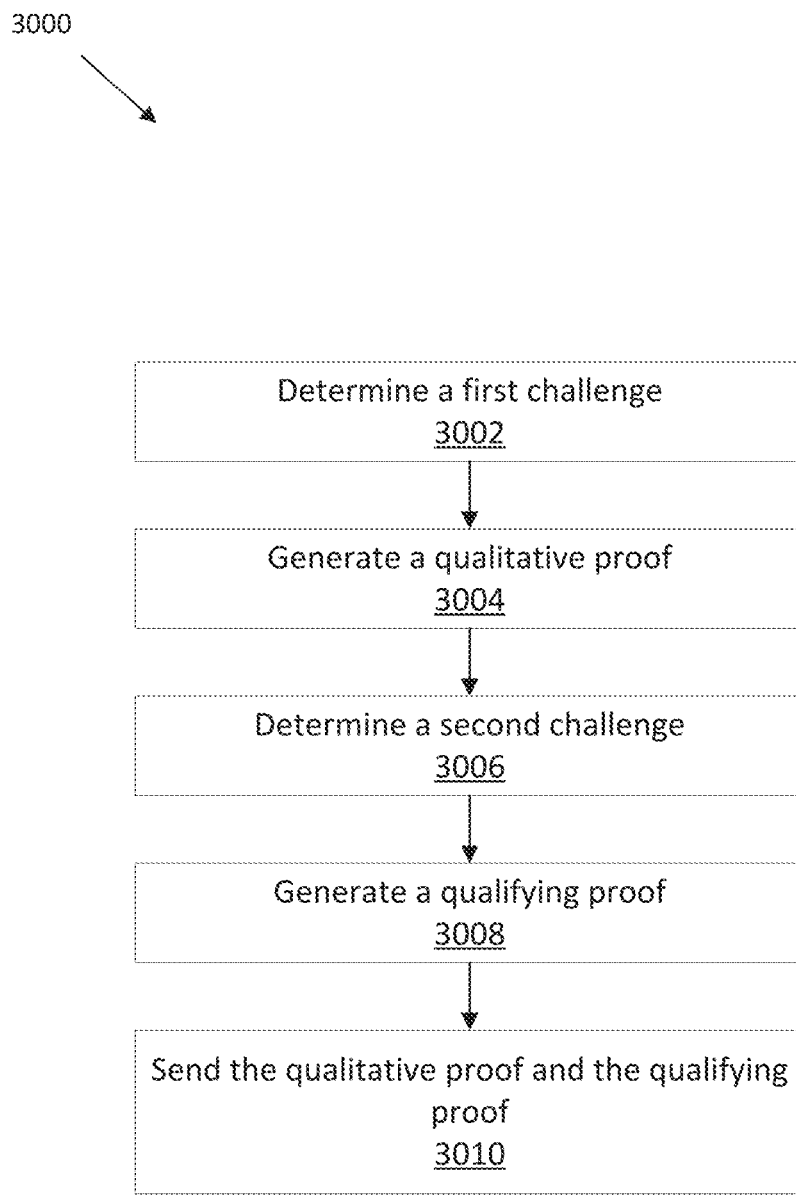
FIG. 30 conceptually illustrates an example of a process for generating a qualitative proof and a qualifying proof.

In some embodiments a cryptographic system can generate composite proofs with two components. The first component can be a qualitative proof and the second component can be a qualifying proof. An example of a process for generating a qualitative proof and a qualifying proof is conceptually illustrated in FIG. 30. Processes for generating a qualitative proof and a qualifying proof can be executed by a miner.

Process 3000 determines (3002) a first challenge. In some embodiments determining the first challenge can be based on one or more configuration parameters. The configuration parameters can be varied based on one or more conditions as described throughout. In various embodiments, one or more configuration parameters can correspond to an initialization configuration.

Process 3000 generates (3004) a qualitative proof. In some embodiments, the system uses a first function F1 for the derivation of a qualitative proof P1, based on a challenge w (e.g. P1:=F1(w)). For example, F1 can be a probabilistic function.

Process 3000 determines (3006) a second challenge. In some embodiments determining the second challenge can be based on one or more configuration parameters. The configuration parameters can be varied based on one or more of the various conditions described herein. In various embodiments, one or more configuration parameters associated with the second challenge can correspond to an initialization configuration.

In various embodiments, the second challenge and the first challenge can be based on a configuration parameter. In several embodiments, a first configuration parameter (e.g. C) can be associated with a cryptographic system incorporating a system associated with the qualitative proof and a system associated with the qualifying proof. The qualitative proof can be associated with a configuration parameter (e.g. C1). The qualifying proof can be associated with a configuration parameter (e.g. C2). The configuration parameter associated with the cryptographic system can be related to the configuration parameter for the qualitative proof and the qualifying proof according to $C=\log_2(2C1*2C2)$. For example, where a miner is to perform a task that corresponds to a configuration parameter C=20, the miner can be required to perform a qualitative task that corresponds to a first configuration parameter C1, and a qualifying proof that corresponds to a second configuration parameter C2, where $C=\log_2(2C1*2C2)$. In this case, the equation may be satisfied, for example, by setting C1=C2=19, assuming C=20.

In some embodiments, a proof can be composed of multiple components. For example, a composite proof can include one or more constituent proofs. In a number of embodiments, a proof may include two separate proofs of the same type, but the two separate proofs can be generated using different configuration parameters. For example, a proof may be composed of proofs P11 and P12, where proof P11 can use configuration parameter C11 and proof P12 can use configuration parameter C12. The configuration parameters C11 and C12 can be selected to correspond to C1, where C1 is set according to a desired difficulty parameter. For example, where a desired difficulty parameter corresponds to C1=18.58, (C11,C12) may be set to (18,17), creating a combined effort of P1 and P2, per miner, that is proportional to $2^{C11}+2^{C12}=2^{18}+2^{17}=393216$, which is approximately $2^{C11}+2^{C12}=2^{18.58}$. Thus, this corresponds to a proof P1 with configuration parameter C1=18.58. In some embodiments a first configuration parameter associated with a first constituent proof and a second configuration parameter associated with a second constituent proof can be selected such that a desired effective configuration parameter for a composite proof is achieved. In some embodiments the configuration parameters C11 and C12 can be selected to correspond to a proof with a difficulty parameter corresponding to a non-integer configuration parameter. As can readily be appreciated the specific manner in which a difficulty parameter is chosen and/or modified is largely dependent upon the requirements of a specific application.

Process 3000 generates (3008) a qualifying proof. In some embodiments, the qualifying proof (E.g. P2) is performed in a manner that is conditional on the successful creation of the qualitative proof (E.g. P1). For example, based on a condition that P1 is a valid proof relative to w, the qualifying proof P2 can computed relative to the challenge w. In various embodiments, the generation of the qualifying proof can only commence after the generation the qualitative proof. For example, the determination of the qualifying proof can be dependent on the qualitative proof (E.g. P2 may be a function F2 of P1, which we may describe as P2:=F2(P1)).

In some embodiments, a composite proof can have two or more components (e.g. qualitative proof and qualifying proof). The size of the composite proof can grow in proportion to the number of components. In various embodiments, the one or more constituent proofs of the composite proof can be required to have segments of identical bit strings. This additional requirement can significantly increase the demands associated with generating the constituent proofs. Instead of making the computational effort additive (e.g. where the burden is 2*C11+2*C12), this additional requirement makes the burden 2t(2*C11+2*C12), where t is the number of bits of the segment that needs to be identical. This requirement can be a form of compression of the size of a composite proof. As can readily be appreciated the number of constituent proofs that are utilized is largely dependent upon the requirements of a specific application.

Process 3000 sends (3010) information related to the qualitative proof and the qualifying proof. Information related to the qualitative proof and the qualifying proof can be sent over a network. In various embodiments, the qualitative proof and the qualifying proof can be constituent proofs. A combination (e.g. a list) of the qualitative proof and the qualifying proof can be a composite proof. Processes in accordance with numerous embodiments of the invention can transmit the composite proof and use write access to write the proof to a ledger. In some embodiments, decentralized proof selection methods for identifying and selecting the most suitable proof can be used. Decentralized proof selection methods in accordance with several embodiments of the invention can be based on quorum agreement among one or more miners. In some embodiments, the process can submit the composite proof to a verifier in order to validate a ledger associated with one or more challenges. In certain embodiments, the process can also submit the composite proof to be accessed by a 3rd-party verifier. In various embodiments, the process can send one, or any combination, of the qualitative and qualifying proofs over a network.

While specific processes for generating qualitative proofs and qualifying proofs are described above, any of a variety of processes can be utilized to generate a qualitative proof and a qualifying proof as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to generating a qualitative proof and a qualifying proof, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 31:
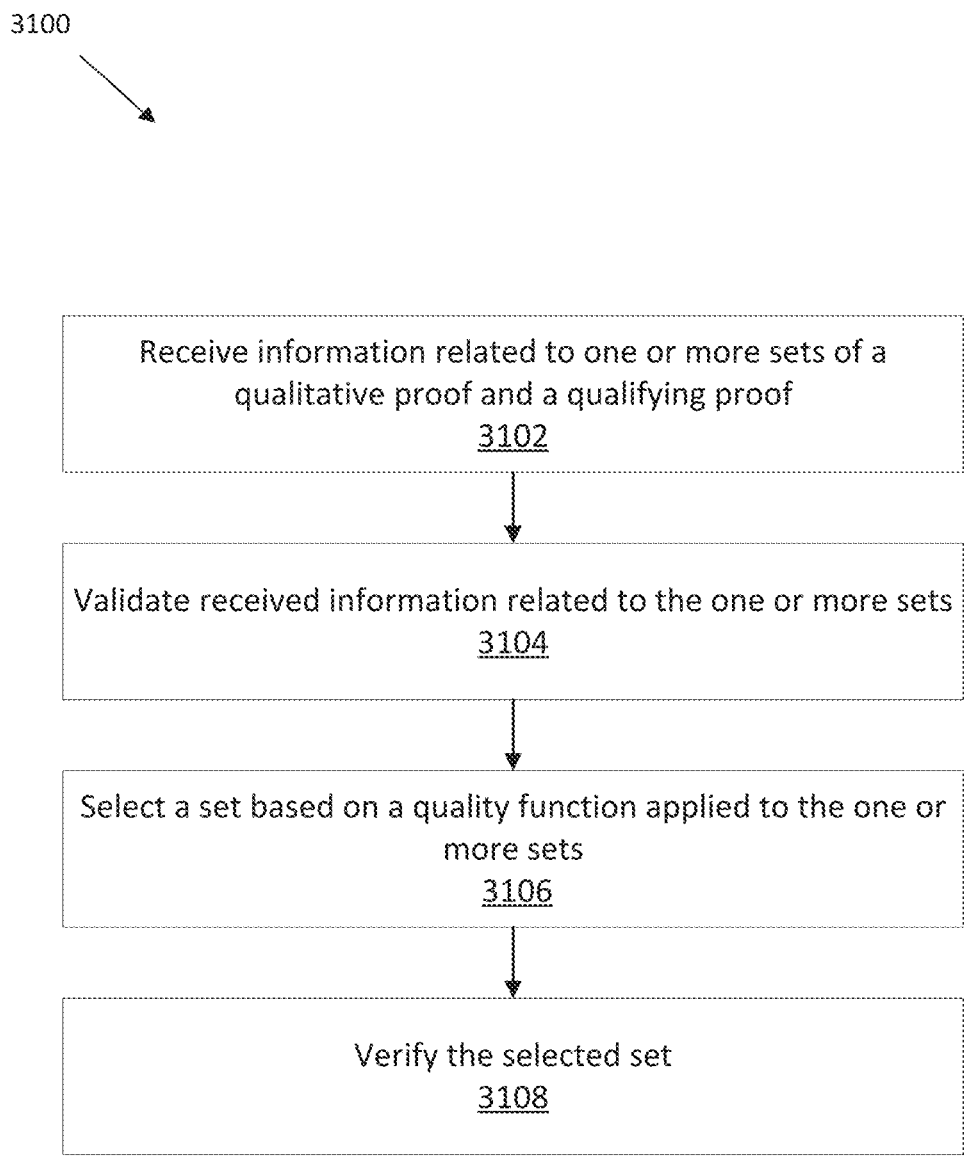
FIG. 31 conceptually illustrates an example of a process for verifying a qualitative proof and a qualifying proof.

In some embodiments, a cryptographic system can generate proofs with two components. The first component can be a qualitative proof and the second component can be a qualifying proof. Once generated these components can be verified. An example of a process for verifying a qualitative proof and a qualifying proof is conceptually illustrated in FIG. 31. Processes for verifying a qualitative proof and a qualifying proof can be executed by a verifier.

Process 3100 receives (3102) information related to one or more sets of a qualitative proof and a qualifying proof. In various embodiments, the process can receive one or more composite proofs. The one or more composite proofs can each include a qualitative proof and a qualifying proof. For example, the information received can correspond to the information sent by process 3000. In other embodiments, the information can be generated using an alternative process. In some embodiments, the information received can correspond to information from one or more miners. For instance, a first miner can submit a first proof (e.g. (P1a, P2a) determined in response to w), and a second miner can submit a second proof (e.g. (P1b, P2b) in response to w).

Process 3100 validates (3104) the received information related to the one or more sets of proofs. In various embodiments, the process validates one or received composite proofs. The one or more composite proofs can each include a qualitative proof and a qualifying proof. In some embodiments, the process determines, which if any, of the received composite proofs are valid proofs. A composite proof can be a valid proof if its constituent proofs are valid. For example, a composite proof can be valid if its constituent qualitative proof and qualifying proof are valid.

Process 3100 selects (3106) a set of a qualitative proof and a qualifying proof. In various embodiments, the process selects a composite proof. The selected composite proof can be selected from the validated composite proofs. In accordance with various embodiments of the invention, a quality function can be applied for selecting one composite proof among multiple competing correct composite proofs relative to one challenge. In some embodiments, the quality function can be applied only to a qualitative portion of a composite proof. The verifier can check whether a qualifying proof is valid or not valid.

In many embodiments, a proof can be selected among more than one proof by applying a quality function Q to the proofs received by the process. For example, the quality function can be applied to the submitted qualitative proofs (e.g. P1a and P1b). The quality function Q can be applied to P1a and P1b. In some embodiments, there is no quality function applied to P2a and P2b. The selection of the proof can be determined based on the qualitative components of the mining responses.

Process 3100 verifies (3108) the selected set of proofs. The selected set can be a composite proof. In several embodiments, the selected set includes a qualitative proof and a qualifying proof. In various embodiments, the verification of the selected proof can result in a block being added to a blockchain.

In certain embodiments, a search space for finding a proof can be limited. For example, the search space can be limited based on a configuration parameter (e.g. the range of random or pseudo-random numbers that can be used in a proof can be determined based on the configuration parameter). In a number of embodiments, the search space can be changed based on a new configuration parameter. In various embodiments, the search space can be changed in response to a new challenge. In certain embodiments, the search space can be determined using consensus mechanisms. For instance, consensus mechanisms can be used to determine the configuration parameter. In some embodiments, the search space can be selected based on a condition being met. For instance, the search space can be selected based on no miners succeeding in finding a solution based on a first search space. In many embodiments, a second search space can be selected. The second search space can be larger than a first search space. As can readily be appreciated, the specific manner in which a search space is determined is largely dependent upon the requirements of a given application.

In various embodiments, determining a proof can be based on a range. The range can correspond to a search space. An example mining instance can be expressed as $P1:=F1(w,R)$ where R is a range indicator, and F1 is a proof (e.g. proof of work, proof of stake, proof of space, proof of bus) function governed by the range R.

In some embodiments, determining a proof can be based on an identifier. For example a mining instance can be expressed as $P1:=F1(w,R,id)$ where id can be an identity (e.g. a public key, an email address, a unique identifier, or another identifier). In a number of embodiments, the identifier can be limited in terms of how many such identifiers a given miner may have. For example, the identifiers can correspond to a fungible or non-fungible transferrable asset. In certain embodiments, identifiers can be associated with different search spaces (e.g. ranges), different sized ranges, and different configuration parameters. In various embodiments, identifiers are associated with different search spaces (e.g. ranges), different sized ranges, and different configuration parameters based on their identity. As can readily be appreciated, the particular identifier that is used is largely dependent upon the requirements of a specific application.

In some embodiments, configuration parameters can be selected to change the characteristics (e.g. energy usage, security, ledger closing speed) of a cryptographic system. In several embodiments, a cryptographic system can change parameters in response to detecting a condition. A condition can include information related to energy usage, security, ledger closing speed, and other factors.

In some embodiments, the energy usage can be determined as proportional to $2C1$, times the number of miners N. This equation can be used when the ratio $2C1/(2C1+2C2)$ is close to zero. C1 can correspond to a configuration parameter for a qualitative challenge, and C2 can correspond to a configuration parameter for a qualifying challenge. The value X can indicate the number of successful proofs to a qualitative challenge. If X is large (e.g. in the order of millions), that corresponds to a more complex resolution task to determine a winner, which may slow down the consensus process practiced by miners and other verifiers. In some embodiments, X is inversely related to C1. In many embodiments, if X exceeds a threshold (e.g. exceeding $0.01*N$ or determined by another function), then C1 can be increased. In certain embodiments, increasing C1 can decrease X. In various embodiments, if the time between ledger closings, which is related to $2C1+2C2$, exceeds a threshold then one of C1 and C2, or both, can be reduced. In some embodiments, if the energy consumption of the computation exceeds a threshold, then C1 can be reduced. In a number of embodiments, the detection of a condition can trigger a parameter change. In certain embodiments, conflicting requirements can be addressed by having a set of rules indicating the precedence of different requirements. This evaluation of rules can be automated, and may be performed by the distributed nodes, such as the miners. In some embodiments a party submitting an entry to a ledger can include a transaction to modify one or more configuration parameters. The modification can be temporary (e.g., for the next one, two, three or more challenges). The modification can increase the values of C1, C2 or both, in order to increase security of the transaction. In various embodiments, a transaction can accompany data to be added to the ledger. The transaction can be identified and the identification of the token transfer transaction can be linked to a direct and/or indirect increase of one or more configuration parameters. As can readily be appreciated, the specific manner in which configuration parameters are modified during and/or as a result of transactions is largely dependent upon the requirements of a given application.

In various embodiments, the qualitative proof (e.g. P1) can be a Proof of Work, Proof of Space, Proof of Stake, Proof of Bus, a composite proof or another proof. The qualifying proof (e.g. P2) can be a Proof of Work, Proof of Space, Proof of Stake, Proof of Bus, a composite proof and/or another proof. P1 and P2 can be different types or the same type. Furthermore, the type of the different proofs may be fixed and/or static, and/or may be configured over time, e.g., based on a rule or a measurement. In addition, each of the proofs may be a composite proof or a single proof.

In an example embodiment, a miner can be configured to evaluate $P1:=F1(C1, w)$, where F1 is a Proof of Bus with a configuration parameter C1, and w is a challenge. The miner can also be configured to evaluate $P2:=F2(P1)$. In this example, P1 is a qualitative proof and P2 is a qualifying proof. Miners and verifiers alike can be configured to verify triplets such as (w,P1,P2) to determine whether (P1,P2) are valid proofs relative to w. Miners and verifiers can also be configured to perform tie-breaking determinations in contexts where there are multiple candidate proofs submitted. In some embodiments, the tie-breaking verification can be performed on the provided qualitative proofs, which in the above example correspond to P1. In various embodiments, the tie-breaking verification can be performed on the provided qualifying proofs, which in the above example correspond to P2.

In accordance with a number of embodiments of the invention, one or more constituent proofs can be a first proof based on a first set of configuration parameters and determined using a first cryptosystem or can be a second proof based on a second set of configuration parameters and determined using a second cryptosystem. For example, P1 may be either a first proof type (e.g. Proof of Work) or a second proof type (e.g. proof of stake), and P2 may be a third proof type (e.g. Proof of Bus). A process can be configured to perform a second proof type (e.g. proof of stake based on a registered stake to generate P1' based on a challenge w). A process can also be configured to perform a second proof type (e.g. a proof of work to generate P1" based on a challenge w). In several embodiments, the process can also be configured to perform a third proof type (e.g. P2) in accordance with any of the proof processes described herein. In a number of embodiments, the process can then submit either a first proof type and a third proof type or a second proof type and a third proof type as a valid composite proof (e.g. (w, P1', P2) or (w, P1", P2)). In some embodiments the composite proofs can include an indicator. The indicator can indicate a characteristic of a composite proof element. For example, the indicator can indicate whether s second element is a first proof type (e.g. Proof of Stake, P1') or a second proof type (e.g. Proof of Work, P1"), In various embodiments, the indicator can be a binary value. In a number of embodiments, more than two options can be associated with each constituent proof. In certain embodiments, one or more constituent proofs can be determined in one or more ways as described.

In some embodiments, a set of rules can be followed to generate acceptable proofs (e.g. constituent proofs, or composite proofs) for a cryptographic system. The various alternative proofs can each be associated with one or more limitations. In certain embodiments, an allowable proof can require determining a proof based on a particular configuration parameter. In a number of embodiments, an allowable proof can require generating the proof in accordance with a rule identifying whether a miner may participate for a given challenge. In some embodiments the miners can be assigned to a group based on a condition. For example, when the number of miners exceeds a value, the miners can be assigned to a group. Miners can be associated with a group number, such as (but not limited to) 0, 1, 2 or 3. The group number allowed to mine for a given instance may be identified based on some bits of the challenge or on a counter identifying what mining group is allowed to respond to the challenge for this instance. A round-robin approach can be used to select the group. Other group selection methods are also possible, such as random, pseudo random, or another means of selection. The use of groups, the number of groups, and the group selection method can be configuration parameters. As can readily be appreciated, the specific manner in which groups, the number of groups, and/or group selection is performed is largely dependent upon the requirements of a particular application.

In some embodiments, configuration parameters (e.g. configuration parameters associated with miner groups) can be varied. Configuration parameters can be varied according to rules. In various embodiments, the rules can be evaluated by miners and verifiers on a periodic basis. In several embodiments, the periodic basis can be based on a time (e.g. once a day). In a number of embodiments, the periodic basis can be based on a ledger event (e.g. a ledger closing). In some instances, the number of miner groups (or another configuration parameter) can be changed in response to a condition. For example, if an activity (e.g., the number of submitted proofs (or a windowed average of such values)) falls below a threshold the number of miner groups can be reduced. As can readily be appreciated, the specific manner in which configuration parameters are modified is largely dependent upon the requirements of a given application.

While specific processes for verifying a qualitative proof and a qualifying proof are described above, any of a variety of processes can be utilized to verify a qualitative proof and a qualifying proof as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to verifying a qualitative proof and a qualifying proof, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Memory-Bound Functions

Cryptographic systems in accordance with a number of embodiments of the invention can utilize memory bound functions in a variety of ways to achieve security in a computationally efficient manner. In some embodiments, memory-bound functions can be configured so that their performance is closely linked to the performance of the bus and/or the caches of a processor. In several embodiments, memory-bound functions can be used to cause a delay in proof-of-space (PoS) settings, to control ledger closing speed as a qualifying proof, and to increase energy efficiency for proofs of work (PoW). In many embodiments, memory-bound functions enable efficient proof-based crypto-mining on mobile devices.

A memory-bound function can be a processing task that does not primarily correspond to execution of instructions, as a PoW does, but where the delay associated with the proof is associated with waiting for responses to memory requests. For example, configuring a Proof of Space cryptographic system so that the graph does not fit in the cache creates the need for many memory requests. For example, if a graph is of a size that only 10% of it fits in the cache, then this graph results in a very large number of cache misses, which corresponds to a memory-bound function. A memory-bound function, such as a Proof of Bus, can measure computational capabilities. A proof of Bus function can include waiting for responses as a limiting aspect.

A function can be memory bound when it causes repeated loading of content to the cache. Content can be loaded block by block from memory into the cache. In many instances, the amount of data that is transferred between the memory and the cache can be substantial. This is so because as the memory bound function is evaluated, a cache miss results in more data being loaded, and therefore, additional lag. Since the bus limits how much data can be transferred, its limited throughput becomes a resource. In this way, Proof of Bus can be considered to be a memory-bound proof in which bus bandwidth acts as a limited resource.

Figure 32:
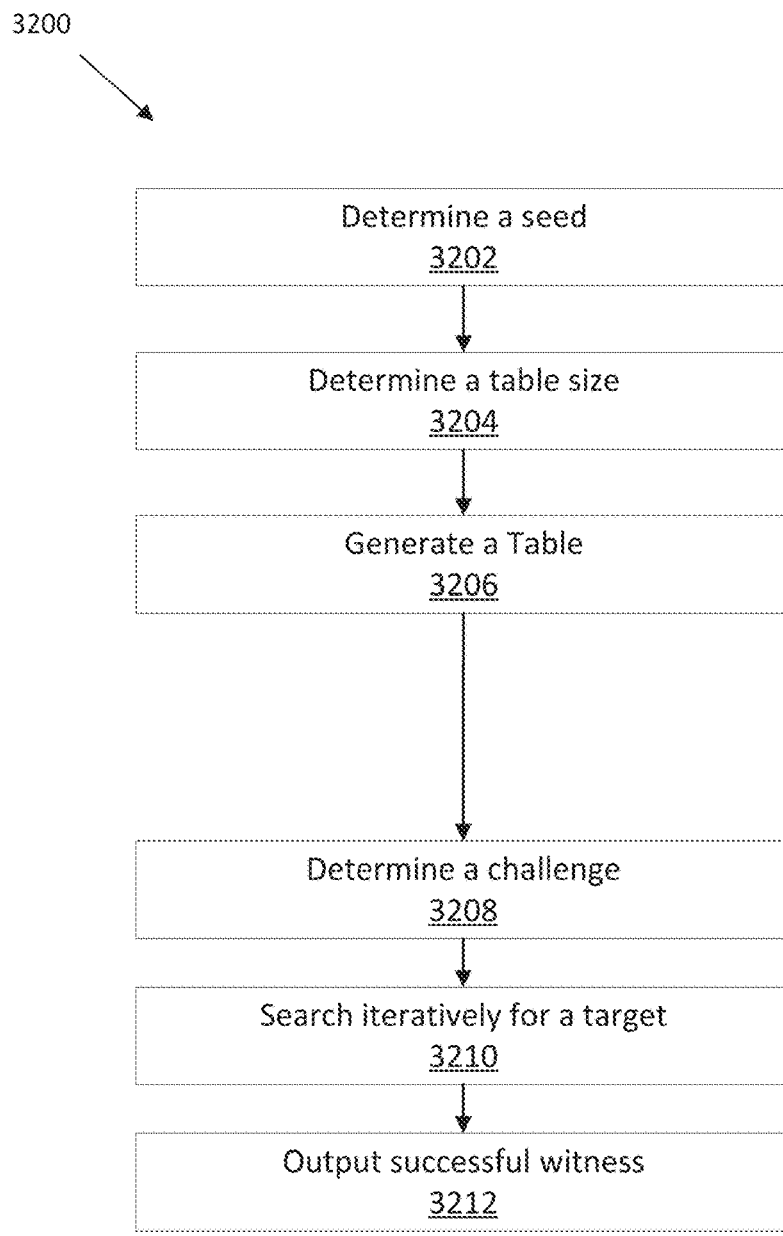
FIG. 32 conceptually illustrates an example of a process for a memory-bound function that can include generating a table from a seed.

In some embodiments, a cryptographic system can utilize a memory-bound function for a variety of purposes including (but not limited to) as a delay function and/or in proof generation. An example of a process for performing a memory-bound function is conceptually illustrated in FIG. 32. Processes for implementing memory-bound functions can be executed by miners.

Process 3200 determines (3202) a seed. In various embodiments the seed can be received by the process. In some embodiments, the seed can be selected from a received set of seeds. In many embodiments, the process utilizes a series of values for the seeds. In a number of embodiments, a new seed can be generated based on the detection of a condition. In various embodiments, a new seed can be generated from an old seed. A new seed can be generated from the old seed using a one-way function (e.g. a hash function). A new seed can also be generated from the old seed by setting the seed using based on a ledger, or on publicly available information. As can readily be appreciated, the specific manner in which the seed is generated is largely dependent upon the requirements of a particular application.

Process 3200 determines (3204) a table size. In some embodiments, determining a table size can include determining a size (e.g. L) for each table entry. In several embodiments, determining a table size can include determining a number (e.g. N) of table entries. In many embodiments, a table entry Ti can be the size L. The size L can correspond to a size of a hash function output. For example L=32 bytes can correspond to the output from the hash function SHA256, and L=64 bytes can correspond to an output from the hash function SHA512. In accordance with various embodiments of the invention, the table size can be around 8 kilobytes, around 8 megabytes, around 16 megabytes, or another size. In some embodiments, the table size N is set based on the type of usage that is desired. In a number of embodiments, the table size can correspond to a memory size. For example, L=32 bytes and N=256, the size of the table will be 32*256 bytes=8 kilobytes. In certain embodiments, the table size corresponds to a typical L1 cache. In another example, L=32 and N=262144, then the size of the table will be 32*262144 bytes=8 megabytes. In many embodiments, the table size corresponds to a large L2 cache. In a third example, L=64 and N=262144, then the size of the table will be 32*262144 bytes=16 megabytes. In various embodiments, the table is too large to fit in a typical large L2 cache. In various embodiments, the table is sized to be loaded at least in part from DRAM on a typical device.

In some embodiments, a process can be an S1-demanding function. An S1-demanding function can utilize a memory size S1 to operate efficiently. S1 can correspond to 16 megabytes. For example, a 16 megabytes-demanding function utilizes 16 megabytes of memory to operate efficiently. In various embodiments, computing an S1-demanding function on a computational device with less than S1 of memory available for processing of the function can be much slower. For example, a 16 megabytes-demanding function evaluated in an environment with only 8 megabytes of memory may be a thousand times slower than in a 16 megabytes environment. In some embodiments, the process may require data (e.g. a table) to be constantly recomputed from a seed state or a compressed state if the S1 memory is smaller than the S1-demand of the function. In many embodiments, S1 can be set to enable efficient processing of the function on a mobile phone.

In some embodiments an S1-demanding function can be S2-expandable. S2-expandable functions can generate the information (e.g. the table contents) that utilizes space S1 from a value (e.g. a seed) of size S2. In various embodiments, an S2-expandable function can utilize a table of size S1, and the content of the table can be generated from a seed of size S2 efficiently. For example, S1 may be 16 megabytes and S2 may be 32b.

In various embodiments, a table T can be transportable. A transportable table may correspond to a function with S1 much greater than S2. In some embodiments the size of the table T corresponds to the size S1. In some embodiments, the table T can be efficiently generated from the seed. In several embodiments, the seed is the size of S2. In certain embodiments, efficiently generating the table may correspond to an execution time of less than around 10 milliseconds, around 100 milliseconds, around 200 milliseconds, around 300 milliseconds, or another time. While various memory and table constraints are described above, any of a variety of processes can be utilized that operate efficiently given a specified minimum available memory allocation as appropriate to the requirements of specific applications.

Memory bound applications can also be utilized in which the table can be contained within at least one level of the processing systems memory caching hierarchy. In some embodiments, the table (e.g. T) is small enough to fit in a typical L1 cache. In many embodiments, the table can be no more than 8 Kilobytes. In many embodiments, a function can be L1 cache-bound. In a L1 cache-bound function. The speed of evaluation can depend primarily on the processor clock frequency.

In some embodiments, the table can be small enough to fit in a typical L2 cache, and too large to fit in the L1 cache. In many embodiments, the table can be no more than 1 megabytes. In several embodiments, the function can be L2 cache bound. In an L2 cache-bound function the speed of function evaluation is largely dependent on the speed of the L2 cache and the bus to the L2 cache. In some embodiments, an L2 cache-bound function can be a bus-bound function.

In some embodiments, the table can be too large to fit in a typical L2 cache. In many embodiments, the table can be around 1 Gb. In such a function (e.g. a bus-bound function), the evaluation speed can depend mostly on the bus speed to DRAM. While various constraints and table sizes are described above with reference to the size of various components of a memory hierarchy, any of a variety of table sizes can be utilized as appropriate to the requirements of specific miner systems and/or applications in accordance with various embodiments of the invention.

Process 3200 generates (3206) a table. In some embodiments, the table is generated based on the seed. N table entries T0 ... TN can be generated. In several embodiments, table entries can be generated with a non-indexable function. In various embodiments, table entries can be generated with an indexable function. In certain embodiments, a table entry Ti can be the size L. The size L can correspond to a size of a hash function output. In some embodiments, the table entries are determined based on the seed and an identifier. For example, the table entries can be determined based on a concatenation of the seed and the identifier. In a number of embodiments, the identifier can be a public key, a unique identifier, and/or another value. As can be readily appreciated, the specific manner in which table entries are generated and/or the content of the table entries is largely dependent upon the requirements of a given application.

In some embodiments, the table can be indexable. An indexable table can have the characteristic that an entry Ti at position i of T can be generated from a seed such as S2 with an effort that is significantly lower than i times the effort of generating Ti. An example of an indexable table is a table where the ith table item Ti is computed as Ti=hash(SEED,i), where hash is a cryptographic hash function such as SHA256. In many embodiments, an indexable function can be selectively computed in real-time, without storing the entire table.

In several embodiments, the table T can be non-indexable. Generating the ith table entry for a non-indexable table can involve generating the previous table entry. For example, to generate the ith table item, the i−1st table item must be known, for i>1, where T0 is a known value. In a cryptographic sense, table entries generated in this manner can be referred to as chained. An example of a non-indexable table is one that is generated by using a pseudo-random function generator (PRFG) that uses a pseudo-random state that is updated. "Pseudo-random generation from one-way functions", R. Impagliazzo, L. A. Levin and M. Luby disclose such techniques. Another example non-indexable table T can be generated as T0=hash(SEED), Ti=hash(Ti−1), for i>0, for values up to a desired maximum value of i. In some embodiments, a non-indexable table cannot efficiently be selectively computed (e.g., to compute a specific table entry Ti is not efficient for a non-indexable table).

In accordance with various embodiments of the invention, some processes can be indexable. An indexable process can be based on an indexable table. In accordance with various embodiments of the invention, processes can be utilized that are non-indexable. A non-indexable process can be based on a non-indexable table.

In several embodiments, the table can be based on an identifier. For example, the table can be generated based on a concatenation of the seed (e.g. SEED) and the identifier (e.g. ID). One example of such a table is T0=hash(SEED|ID), Ti=hash(Ti−1), for i>0. In various embodiments, the identifier can be a public key. In some cases, the public key can be a public key associated with a first generation of the table T and a first evaluation of a function based on the table T. In a number of embodiments, the identifier may be a proof that was generated by a process associated with a public key.

In various embodiments, a table can be used by more than one entity (e.g. miner). The table T can be installed with one or more entities at a time of initial configuration. In some embodiments, the table T can be transmitted in real-time. In some embodiments, tables can be used by multiple users for a period of time, and are then updated, patched or replaced. Patching or replacement of a table can include receiving a new seed, and using the new seed to calculate a new table. In some embodiments, the timing for table updates can be based on scheduled events or unscheduled events. A scheduled event can include (but is not limited to) the beginning of each day. An unscheduled event can include a determination that a condition has been detected. In a number of embodiments, detected conditions can include (but are not limited to) the detection of an attack using any of the various processes for detecting attacks described herein. As can readily be appreciated, the specific processes utilized for detection of conditions and/or attacks can be any of the processes described herein and the specific processes utilized are largely dependent upon the requirements of a given application.

In some embodiments, a process can receive one or more seeds before the associated table is required to be generated. In several implementations each seed can be expanded to the associated tables when needed. In a number of embodiments, the entire table can be communicated. In certain embodiments a process can send a seed to one or more miners. As can readily be appreciated the specific manner in which a seed and/or table is communicated to one or miners is largely dependent upon the requirements of a specific cryptographic system.

Process 3200 determines (3208) a challenge. The determined challenge can be a value C. In some embodiments the challenge can be determined based on a proof. The proof having been previously received, computed, or accessed.

Process 3200 searches (3210) iteratively for a target. In some embodiments the iterative search can be based on the challenge and the table. In many embodiments, iterated attempts at matching a target are performed until a solution is found, or until a time-out takes place. In some embodiments a function like the one described below can be used to iteratively search for the target, Step 1: Select a witness W, e.g., by drawing it at pseudo-random from a range RANGE of values. In some embodiments, the pseudo-random draw can be based on a second seed that may be a function of the table seed, the identifier, or a combination thereof. In many embodiments, W can be chosen as a counter that is increased by one each time a new attempt is performed.

Step 2: Determine if a function f evaluated on the table (e.g. T), the challenge (e.g. C) and the witness (e.g. W) meets a target. If so, output the witness W; otherwise, go back to step 1 and select a new witness.

In several embodiments, function f can be evaluated as follows:

In many embodiments: A step 2a is performed involving setting a state STATE to hash(C,W), where hash is a cryptographic hash function such as SHA256. In some embodiments, the hash function output length corresponds to the value L.

In several embodiments, the step 2a is performed by setting a state STATE to hash(C) XOR W. This approach can allow each iteration to use a new candidate witness W without having to recompute the cryptographic hash function.

In some embodiments, the step 2a is performed by setting a state STATE to hash(C|ID) XOR W. Where ID corresponds to the party performing the computation, or on whose behalf it is performed. Here, | denotes concatenation. In some embodiments any of a variety of processes can be used to combine C and ID. As can readily be appreciated, the state can be set in a variety of ways and the specific manner in which the state is set is largely dependent upon the requirements of a given application.

Step 2b can be performed by repeating COUNT times. In some embodiments COUNT may be set to 1000 or another value. In several embodiments the count can be selected based on a challenge. The challenge can be based on one or more configuration parameters (e.g. difficulty parameter). The count can be selected such that the expected time to access a table entry Ti from memory is shorter than the expected time to generate the table from scratch. In a number of embodiments, the witness is efficiently verifiable to a verifier that has not computed the entire table T, but which only computes the COUNT for different table entries that are being used for a given witness W.

Step 2bi can include setting a location i to the log 2(N) least significant bits (LSB) of STATE.

Step 2bii can include loading the contents of the ith position of T, which is referred to as Ti.

In some embodiments, a step 2biii is performed that can involve updating the state as STATE:=STATE XOR Ti.

In certain embodiments step 2biii involves updating the state as STATE:=ROLx(STATE XOR Ti), where ROLx denotes rotation to the left by x steps, where x may be set to log 2(N), for example. Other alternatives for the update function for STATE can be used in accordance with various embodiments.

In some embodiments, step 2c is performed which can involve determining whether the D LSB bits of state matches a value TARGET. For example, if all these D bits are zero, and the value TARGET is the string of D zeroes, then there is a match. Here, D is a difficulty parameter. If D=20, for example, this will succeed with a probability of approximately one in a million, whereas if D=25, it will succeed with a probability of approximately one in 32 million. If the match succeeds, W is a valid witness; otherwise, the try fails and a new value W is attempted. In some embodiments alternative matching functions for selecting D bits can be used.

In some embodiments, step 2c can be performed by determining whether the D LSB bits of state matches a value TARGET. The current value STATE can be input to a one-way function. For example, the one-way function can be a cryptographic hash function. The output can be truncated to D bits and then compared to TARGET. Any of a number of other processes can be utilized to implement a step corresponding to step 2c including (but not limited to) partitioning STATE into 32-bit portions, each such component being XORed with the others, and the output being used for the comparison, potentially after truncating it to D bits. Another implementation corresponding to step 2c includes performing a two-stage comparison where a portion of STATE is compared to a first target value, and if there is a match, then hash(STATE) is computed and a portion of that compared to a second target value that may be the same as the first target value. As can readily be appreciated, the specific process utilized to determine whether a target value is met is largely dependent upon the requirements of a particular application.

In various embodiments, a verifier can determine whether W is a valid witness for a given challenge C by performing the function f as described above for the proposed witness. For example, a verifier can determine whether W is a valid witness for a given challenge C by generating T from the seed, obtained along with (C,W) and perform steps 2a, 2b and 2c, i.e., by evaluating the function f described above.

Process 3200 outputs (3212) the successful witness can be determined by the search. A witness can be a value than can enable verification of the function. In a number of embodiments, a function (e.g. a memory-bound function) can be efficiently verifiable using a witness.

Figure 33:
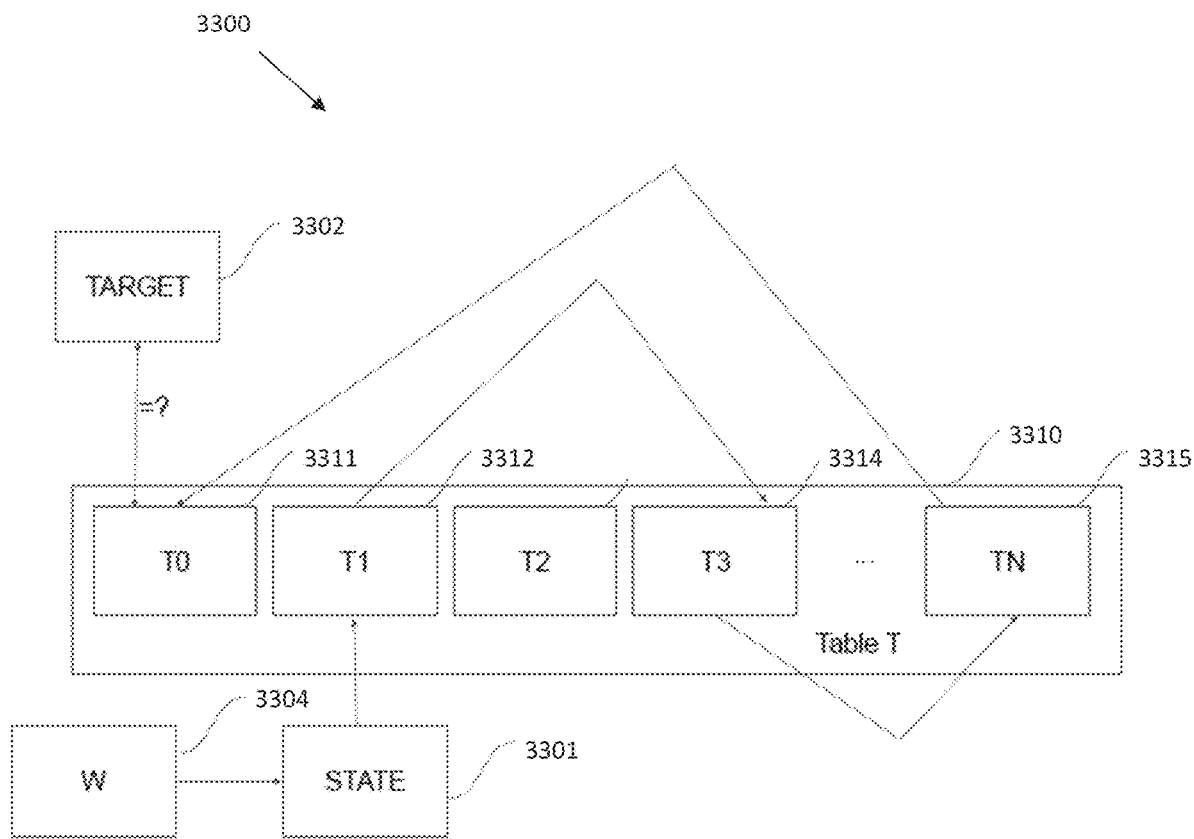
FIG. 33 conceptually illustrates an example of a memory-bound function that can update a state a pre-set number of times.

The memory-bound functions discussed above with respect to FIG. 32 can generate a table from a seed and an identifier, and iteratively search for a witness that matches a target. Memory-bound functions in accordance with various embodiments of the invention can iteratively search for a witness by updating a state a pre-set number of times before comparing the witness to a target. An example of an implementation of a memory-bound function that can having iteratively search for a witness by updating a state a pre-set number of times before comparing the witness to a target is conceptually illustrated in FIG. 33. Processes for implementing a memory-bound function can be executed by a miner. The example memory-bound function conceptually illustrated in FIG. 33 can be related to the example process for a memory-bound function conceptually illustrated in FIG. 32.

Function 3300 can be generated using a table T b310. The value STATE 3301 is based on a candidate witness 3304. The value STATE 3301 can be used to select a first table entry T1 3312. The first table entry T1 3312 can be combined with the original value STATE 3301 to update the STATE 3301 to an updated STATE 3301. The updated value of STATE 3301 can then be used to select a second table entry T3 3314. The table entry T3 3314 can be used to update the value of STATE 3301. The twice-updated value STATE 3301 can then be used to select a third table entry TN 3315. The table entry TN 3315 can be used to update the value of STATE 3301. The thrice-updated value STATE 3301 can be used to select a fourth table entry T0 3311. The fourth table entry T0 3311 can be used to generate a fourth-time updated value STATE 3301. The fourth-time updated value STATE 3301 an be used to perform a match with a value TARGET 3302. If there is a match, then the candidate witness W 3304 can be considered a valid witness, and can be output. If there is not a match, then the candidate witness W 3304 can be updated to a new witness and the function can start anew. In several embodiments, the process is repeated for a pre-set number of iterations. In this example, the pre-set number of iterations COUNT is 4.

Figure 34:
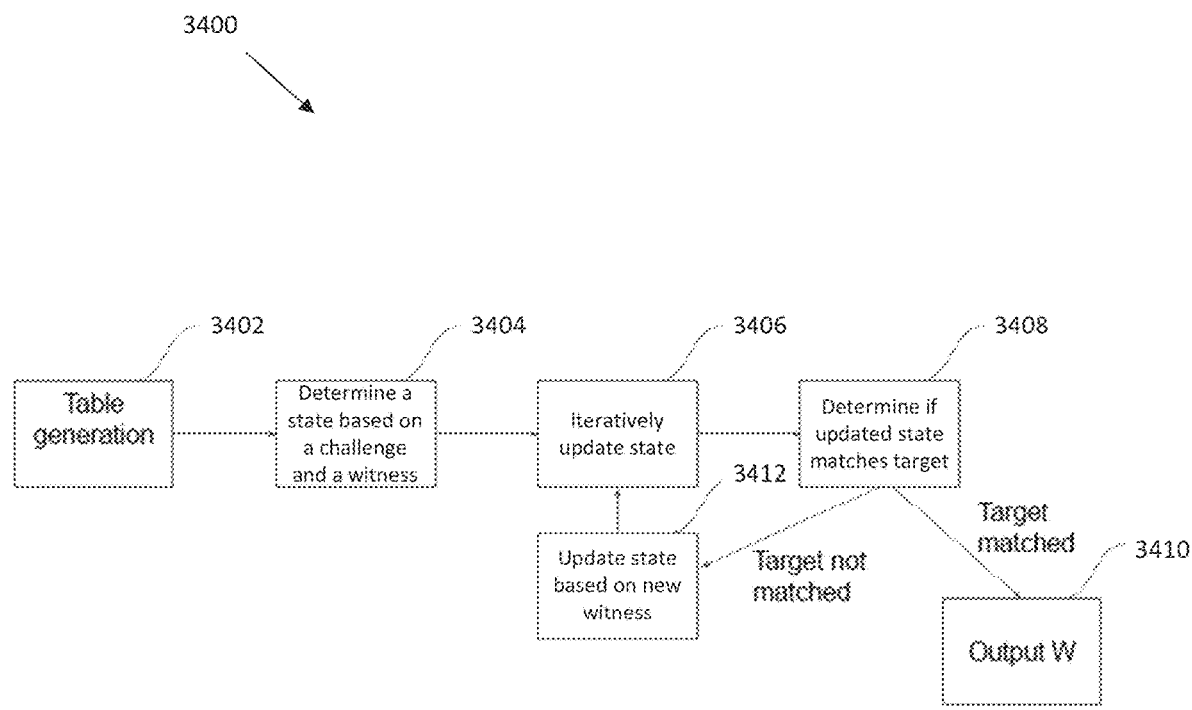
FIG. 34 conceptually illustrates example of a process for a memory-bound function that can including updating a state a number of times based on a configuration parameter.

The memory-bound functions discussed above with respect to FIGS. 32 and 33 can generate a table from a seed and an identifier, iteratively search for a witness that matches a target, and can iteratively search for a witness by updating a state a pre-set number of times before comparing the witness to a target. Memory-bound functions in accordance with various embodiments of the invention can iteratively search for a witness by updating a state a number of times determined by a configuration parameter before comparing the witness to a target. An example of an implementation of a memory-bound function that can iteratively search for a witness by updating a state a number of times determined by a configuration parameter before comparing the witness to a target is conceptually illustrated in FIG. 34. In accordance with various embodiments of the invention, a memory bound function can iteratively determine a valid witness based on comparing an iteratively updated state to a target. The iteratively updated state can be updated based on updating a state based on repeated access to a table. Processes for implementing a memory-bound function can be executed by a miner.

Process 3400 generates (3402) a table. In some embodiments the table can be an indexable table. In several embodiments the table can be an unindexable table.

Process 3400 determines (3404) a state based on a challenge and a witness. In various embodiments, a state can be determined as previously described in step 2a. In some embodiments, a state can be computed from a challenge and a candidate witness. The challenge can be based on configuration parameters.

Process 3400 iteratively updates (3406) the state. In various embodiments, an iterated access to the table can be performed. Each time the table is accessed the state can be updated based on the contents of the accessed value. In various embodiments, the number of iterations can be predetermined. In some embodiments the number of iterations can correspond to a configuration parameter. In certain embodiments, the number of iterations can correspond to a count as described elsewhere.

Process 3400 determines (3408) whether the updated state matches a target. If the updated state matches the target the process 3400 continues to 3410. If the updated state does not match the target the process 3400 continues to 3412.

Process 3400 outputs (3410) the witness. In various embodiments the witness can be transmitted over a network to one or more verifiers.

Process 3400 updates (3412) the state based on a new candidate witness. The process 3400 then continues to 3406 based on the updated state. In some embodiments, the update can be conditional on a time-out not having occurred. If the time-out has occurred, the processing ends.

While specific processes for implementing memory-bound function are described above with reference to FIGS. 32-34, any of a variety of processes can be utilized to result in a memory-bound function as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a memory-bound function, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 41:
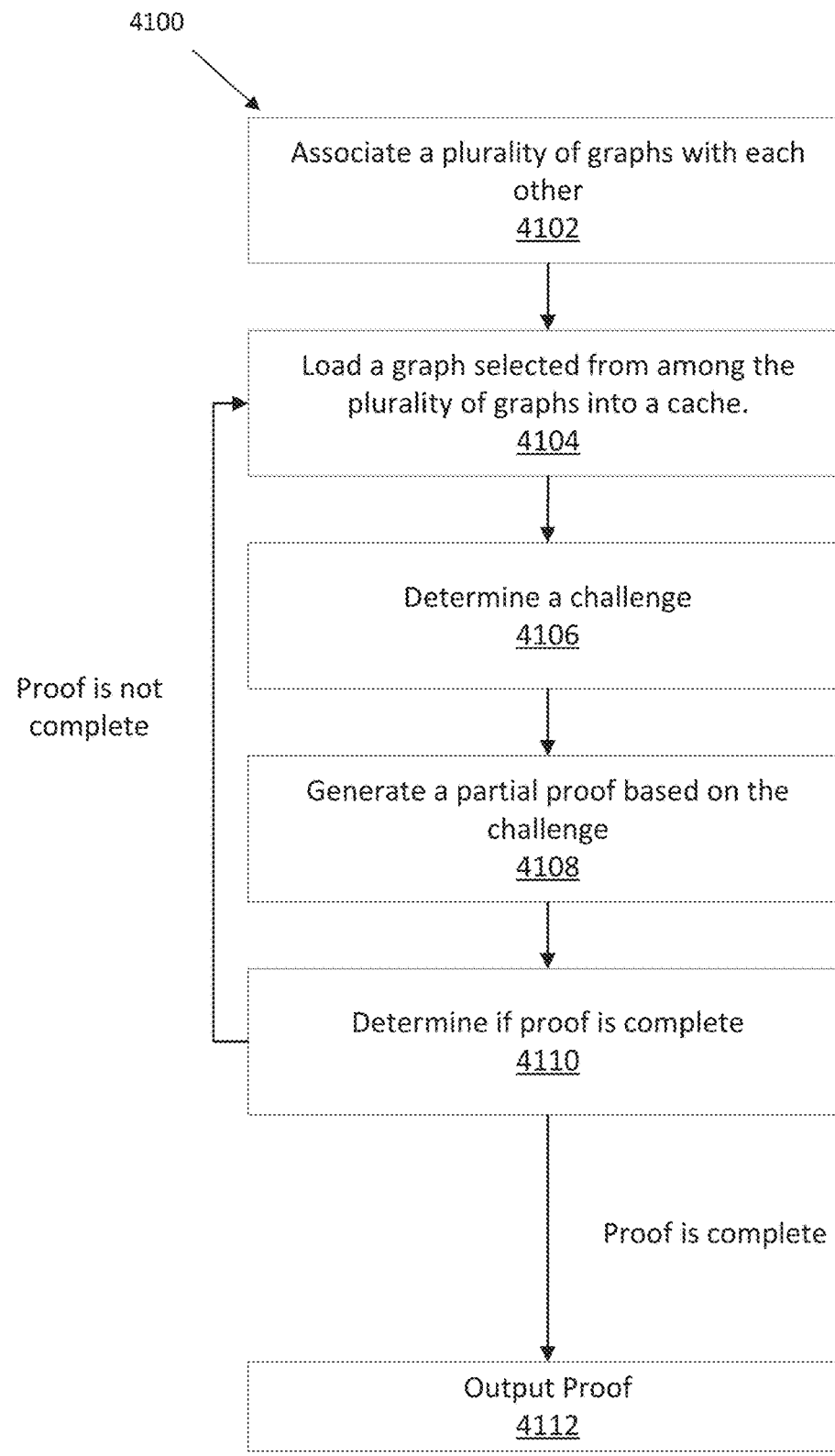
FIG. 41 conceptually illustrates an example memory-bound function relating to a plurality of proof of space graph instances.

In various embodiments a memory bound function can iteratively determine a proof. An example memory-bound function relating to a plurality of proof of space graph instances is conceptually illustrated in FIG. 41. Processes for implementing a memory-bound function relating to a plurality of proof of space graph instances can be executed by a miner.

Process 4100 associates (4102) a plurality of proof of space graphs with each other. In some embodiments, the process can associate a number of proof of space graphs (e.g. 256) with each other. In some embodiments, the number of graphs to be associated can be selected such that the odds of the required graph (for solving the Proof of Space) being in the cache are very small (e.g. such as less than a 1% chance) for each iteration. For example, if graphs are selected to be of a size that corresponds to a very common L1 data cache size, such as 8 kB, then a much larger L1 data cache, which may be 64 kilobytes of size, will be large enough to fit 8 graphs. A calculation based on a set of graphs that contains 1000 graphs will mean that the odds for the processor with the larger L1 data cache to get a cache hit will be 8/1000, which is less than 1%.

In some embodiments, a graph selecting process can be used to reduce the number of graphs in the set that need to be stored on the device's main memory while also minimizing the odds that a given needed graph will already be in the L1 cache. For example, a round-robin approach of accessing a number N of graphs can be used, where N is greater than what any commercial L1 cache can store. For example, N=10 may be used if the biggest L1 cache is 8 times bigger than the smallest acceptable L1 cache. The smallest acceptable L1 cache can refer to a cache for which the associated algorithm will run as intended (e.g., cause paging between graphs but not within graphs). In various embodiments the cache can be flushed before loading a graph.

Process 4100 loads (4104) a graph into a cache. In various embodiments the graph is selected from a plurality of associated proof of space graphs. In various embodiments, for each new graph that is loaded or partially loaded in the cache, the processor can have to wait for a response from the DRAM or other memory used. In some embodiments, during the wait, no computation relevant to the process can be made. In a number of embodiments, the selection of a new graph to use for the next partial proof can be based on the proof associated with the most recent graph computation. In a number of embodiments, a new graph is loaded into the cache with each iteration.

Process 4100 determines (4106) a challenge. In a number of embodiments, the challenge can be determined a first way for a first iteration and a second way for subsequent iterations. In some embodiments, the challenge can be determined based on a state of a ledger (e.g. a previous proof). In various embodiments the challenge can be determined based on a previous partial proof. A partial proof can be determined by the process during each iteration.

Process 4100 generates (4108) a partial task based on the challenge. A partial task can be a partial proof. Each partial proof can correspond to solving the challenge. In various embodiments, Proof of Space is used to solve the challenge. In a number of embodiments, a different number of partial proofs can be expected to be computed. Various embodiments can involve computing 100, 1000, 100000 or another number of partial proofs.

In some embodiments, a challenge wi can be the ith challenge. The challenge wi can correspond to the generation of the ith proof. In accordance with various embodiments of the invention a first challenge w1 may be set to a challenge based on a state of the ledger (e.g. w), and a second challenge w2 may be set based on a first proof (e.g. P1). The first proof can be the proof generated from a first challenge (e.g. w1). The second proof can be generated based on the second challenge (e.g. w2). Other proofs and challenged corresponding to later iterations can be determined similarly.

In some embodiments, a task that can be memory-bound can be a chained computation related to some number (e.g. N) of Proof of Space graphs. The Proof of Space graphs can be associated in a round-robin structure. The solution of one first iteration of Proof of Space can result in an output O1. The input to the first iteration can be a challenge (e.g. C1). The challenge can be derived from a previous proof and a selected value R., The output O1 can then be used to generate a second challenge (e.g. C2) for a second Proof of Space instance, that in turn generates a second output O2.

In various embodiments, a partial task (e.g. proof generating task) can be performed on a graph in the cache. After the partial task, a new graph can be to be loaded into the cache, at least in part. With the new graph loaded, another partial task of the corresponding Proof of Space can be performed. This process can be repeated until the entire task corresponding to the proof of space is complete.

In various embodiments, the Nth challenge CN can be used to generate an output ON, where ON is used to generate the N+1st challenge. The N+1st challenge can be used for a Proof of Space instance that corresponds to the first graph. As can readily be appreciated, a variety of processes including (but limited to) processes described herein can be utilized to implement a partial task and the specific process that is utilized is largely dependent upon the requirements of a given application.

Process 4100 determines (4110) whether the proof is complete. If the proof is complete the process 4100 continue to 4112. If the proof is not complete the process can continue to 4104 for another iteration. In some embodiments, the proof can be determined as complete when the partial proof satisfies a challenge requirement (e.g. based on a match requirement). In certain embodiments, the proof can be determined as complete based on a number of iterations. In many embodiments, the number of iterations can be predefined. In various embodiments, the number of iterations can be based on a configuration parameter. In a number of embodiments, the process determines if the Proof of Space has been completed. As can readily be appreciated, the specific manner in which a determination is made as to whether a proof is completed is largely dependent upon the requirements of a given application.

In various embodiments, a graph G(i mod N) can use a challenge Ci as input and can generate output Oi. Subsequent challenges, C(i+1) can be generated from Oi. Subsequent challenges can be generated according to C(i+1)=f2 (Oi). Where f2 is a function that may be the identity function, may truncate the input, may compute a cryptographic hash function such as SHA256, other functions, or a combination of such operations. Finally, an output value OE can be generated, where E can be a value that can indicates when to end, and where E can be a configuration value parameter. If OE matches a target value, e.g., as described above, then the memory bound function (e.g. delay function) is said to be successful, otherwise not.

While specific processes for implementing memory-bound functions are described above, any of a variety of processes can be utilized to result in a memory-bound function as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a memory-bound function, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Secure Delay Functions

Cryptographic systems in accordance with various embodiments of the invention utilize one or more secure delay functions to control the speed with which a ledger closes. In this way, delays can be introduced into the processing performed by miners to prevent abuse, and/or to level the playing field between miners with different constraints. Furthermore, delay functions can be implemented to reduce energy consumption of cryptographic systems by enabling additional CPU idle time for mining systems.

Secure delay functions in accordance with various embodiments of the invention can be utilized within a variety of cryptographic systems including (but not limited to) any of the cryptographic systems described herein. In many embodiments a secure delay function can be a memory bound function. In some embodiments, a secure delay function can be a bus-bound function. In accordance with various embodiments of the invention, a secure delay function can be performed by a network resource acting as a proxy for a process. Using a network resource or proxy to complete a delay function can reduce energy consumption by enabling additional CPU idle time for mining systems.

Figure 35:
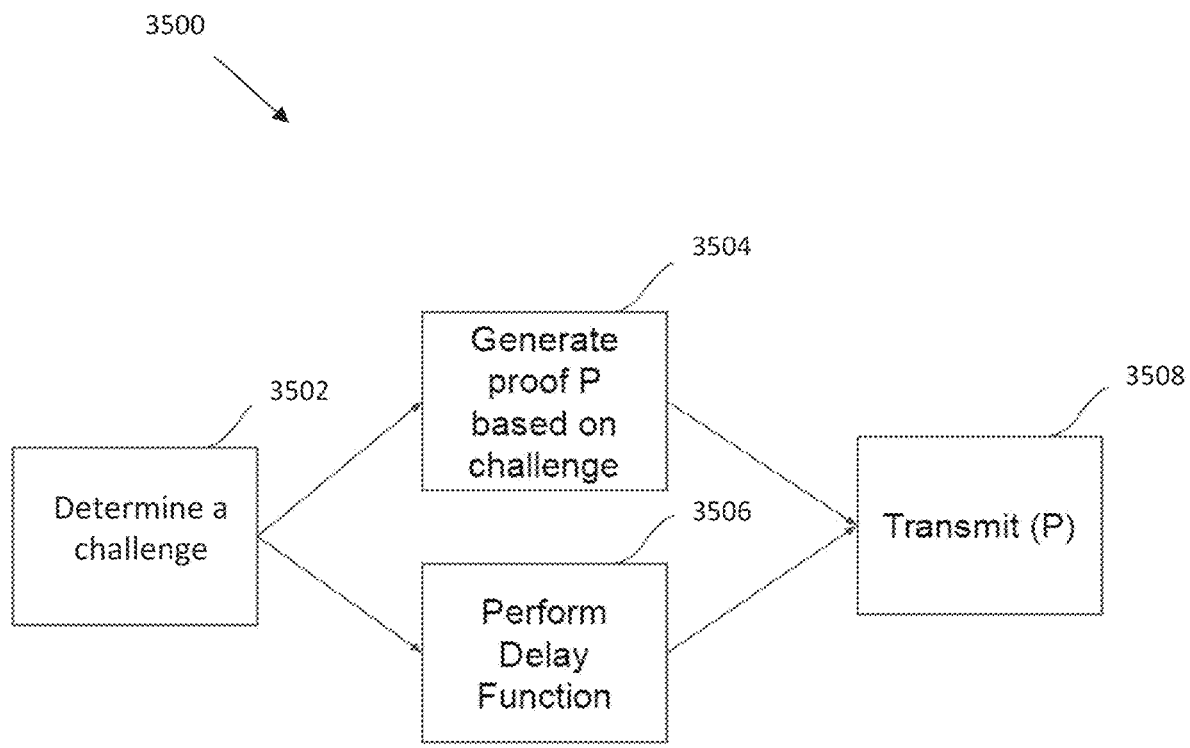
FIG. 35 conceptually illustrates an example of a process for generating a proof in parallel to performing a delay function.

In many embodiments, a delay function is utilized in parallel with a proof generating function. An example of a process for generating a proof in parallel to performing a delay function is conceptually illustrated in FIG. 35. Processes for generating a proof in parallel to performing a delay function can be executed by a miner.

Process 3500 determines (3502) a challenge. In many embodiments, the challenge can be implemented using any of the various processes for determining challenges described herein.

Process 3500 can generate (3504) a proof based on the challenge. The generated proof can be based on any of the various cryptographic systems discussed herein (e.g. composite proof, PoW, PoS, PoSt, PoB, PoM). As can readily be appreciated, the specific cryptographic system utilized to generate the proof is largely dependent upon the requirements of a given application.

Process 3500 performs (3506) the delay function. A variety of delay functions are discussed herein and the particular delay function that is utilized can depend upon the requirements of a specific application. When the delay function completes, the proof is sent (3508).

While specific processes for generating proofs in parallel with performing delay functions are described above, any of a variety of processes can be utilized to generate a proof in parallel to performing a delay function as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 36:
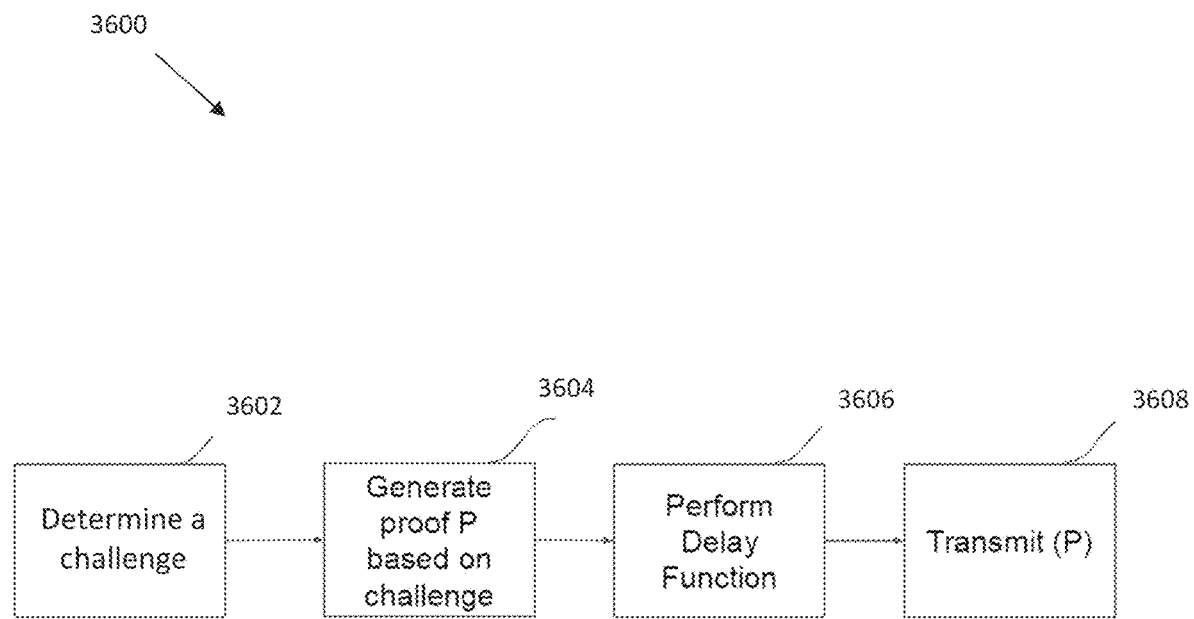
FIG. 36 conceptually illustrates an example of a process for generating a proof in series with performing a delay function.

In some embodiments, a delay function can be arranged in serial with a proof function. An example of a process for generating a proof in series with performing a delay function is conceptually illustrated in FIG. 36. Processes for generating a proof in series with performing a delay function can be executed by a miner.

Process 3600 determines (3602) a challenge. In many embodiments, the challenge can be implemented using any of the various processes for determining challenges described herein.

Process 3600 generates (3604) a proof based on the challenge. The generated proof can be based on any of the various cryptographic systems discussed herein (e.g. composite proof, PoW, PoS, PoSt, PoB, PoM). As can readily be appreciated, the specific cryptographic system utilized to generate the proof is largely dependent upon the requirements of a given application.

Process 3600 performs (3606) the delay function. In some embodiments the delay function is determined based on a generated proof. Accordingly, if no valid proof is found the delay function cannot be performed. For example, an input to the delay function can be based on a valid proof. In accordance with various embodiments of the invention, the inputs to the delay function may include a graph, a reference to a graph, a reference to one or more nodes in the graph, a challenge, a proof, other information, or a combination of the aforementioned items. A variety of delay functions are discussed herein and the particular delay function that is utilized can depend upon the requirements of a specific application. When the delay function completes, the proof is sent (3608).

While specific processes for generating proofs in series with performing delay functions are described above, any of a variety of processes can be utilized to generate a proof in series with performing a delay function as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 37:
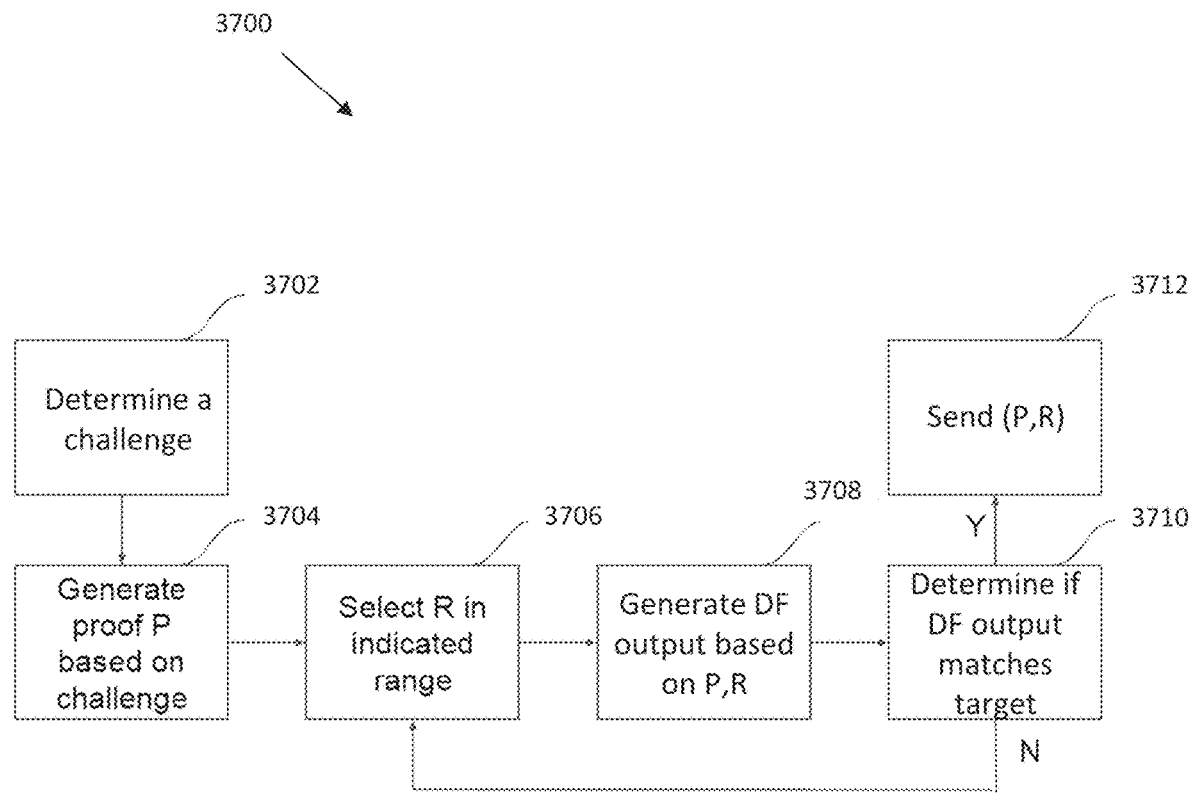
FIG. 37 conceptually illustrates another example of a process for generating a proof in series with performing a delay function.

In a number of embodiments, a delay function can be performed in serial with a proof function, where an output of the proof function is utilized as an input to the delay function. In some embodiments a delay function can be an iterative function performed based on a value that is iteratively selected from a range. An example of a process for generating a proof in series with performing an iterative delay function is conceptually illustrated in FIG. 37. Processes for generating a proof in series with performing an iterative delay function can be executed by a miner.

Process 3700 determines (3702) a challenge. In many embodiments, the challenge can be implemented using any of the various processes for determining challenges described herein.

Process 3700 generates (3704) a proof (e.g. P) based on the challenge. The generated proof can be based on any of the various cryptographic systems discussed herein (e.g. composite proof, PoW, PoS, PoSt, PoB, PoM). As can readily be appreciated, the specific cryptographic system utilized to generate the proof is largely dependent upon the requirements of a given application.

Process 3700 selects (3706) a value (e.g. R) from a range. In some embodiments, the range can be the same for all miners. In various embodiments, the range can be specific to a miner. The range can be based on an identifier. The identifier can be associated with the miner. The identifier can be a public key, a graph identifier of a graph used in a proof of space, an email address, or another identifier. In some embodiments the range may comprise a string (e.g. a twenty-bit string, or a string of another length), from which the process can select any number. In some embodiments the value R can be a combination of the identifier and a value (e.g. a value selected from a range). A combination can be (but is not limited to) a concatenation, a hash and/or any other process or combination of processes described herein for combining identifiers and/or values. In some embodiments the delay function can be outsourced to another processing system. In cases where the delay function is outsourced, the identifier can be related to the entity performing the computation.

In some embodiments, the range from a value can be drawn can be restricted. For example, the range from which R can be drawn can be restricted to cause the delay function to fail with a pre-computed probability. In many embodiments, a delay function can be used as a qualifying function. In a number of embodiments, the delay function can be a memory bound function. For example, the delay function can be a bus bound function. As can readily be appreciated, the specific delay function that is utilized is largely dependent upon the requirements of a given application.

Process 3700 generates (3708) a delay function (DF) output based on the proof (e.g. P) and the value (e.g. R). In some embodiments the DF output can be based on some combination of P and R. For example, the DF output can be a hash(P|R) where | denotes concatenation. In other embodiments, any of a variety of processes can be used to implement the delay function as appropriate to the requirements of a given application.

Process 3700 determine (3710) if the DF output matches a target. If the DF output matches the target, the process 3700 can continue to 3712. If the DF output does not match the target, process 3700 can continue to 3706. In many embodiments, when the criterion is met, then the value R is associated with a valid delay function for the proof P. In various embodiments, a selected portion of the DF output can be compared to a target value to determine a match. For example, the LSB25 (i.e., 25 least significant bits) of the DF output can be selected and compared to a target value. The target value can be, for example, an all-1 string of the same length as the selected portion. In accordance with embodiments of the invention a match may be determined based on a rule. For example, a match may require that the selected portion of the output and the target are the same, A match may require that the DF output and the target satisfy a mathematical criterion. For example, a match may require that the DF output and the target have a particular Hamming distance. In some embodiments, a determination of whether a DF output matches a target value includes comparing a portion of the DF output of the delay function to a target value. In various embodiments, the portion to compare may be determined by a difficulty parameter d. The difficulty parameter d may determine how many bits are compared. For example, if d=25, then the 25 least significant bits (LSB) of the delay function output may be compared to a pre-set 25 bit string. Other ways of comparing a portion can also be used as appropriate to the requirements of specific applications. For example, in some embodiments, the value d can determine the likelihood that a given attempt to solve the delay function, provided input (P,R), will succeed. The difficulty parameter d can be a configuration parameter. As discussed previously, a configuration parameter can be varied based on detected conditions.

In various embodiments, if no match between the DF output and the target is found, a new value R from the range is selected. In some embodiments, the new R may be selected by increasing the previous value R by one, by increasing it by one and performing a modular reduction, or by selecting a new value R at random or using a pseudo-random selection, among other methods. As can readily be appreciated, the specific process for selecting a new value largely depends upon the requirements of a given application.

In many embodiments, the process can continue iteratively until a DF output matches the target. In some embodiments, the process can continue iteratively until all values R from the range have been tested. When the delay function completes, the proof is sent (3712).

In some embodiments, sending the proof can include sending the value. In various embodiments, the process sends a composite proof. The composite proof may include the proof and the value R. The value R may be considered a proof corresponding to the delay function. As can readily be appreciated, the specific proof and/or composite proof that is provided is largely dependent upon the requirements of a specific application and any of the various processes for generating a proof can be incorporated into a process similar to the process shown in FIG. 37 as appropriate to the requirements of specific applications in accordance with various embodiments of the invention.

While specific processes for generating proofs in series with performance of delay functions that take information from earlier proof stages as inputs are described above, any of a variety of processes can be utilized generate a proof in series with performing a delay function as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

As previously described, a delay function can be arranged in serial or parallel with a proof function. Specific processes for implementing delay functions and producing delay function outputs in accordance with various embodiments of the invention are discussed further below.

Figure 38:
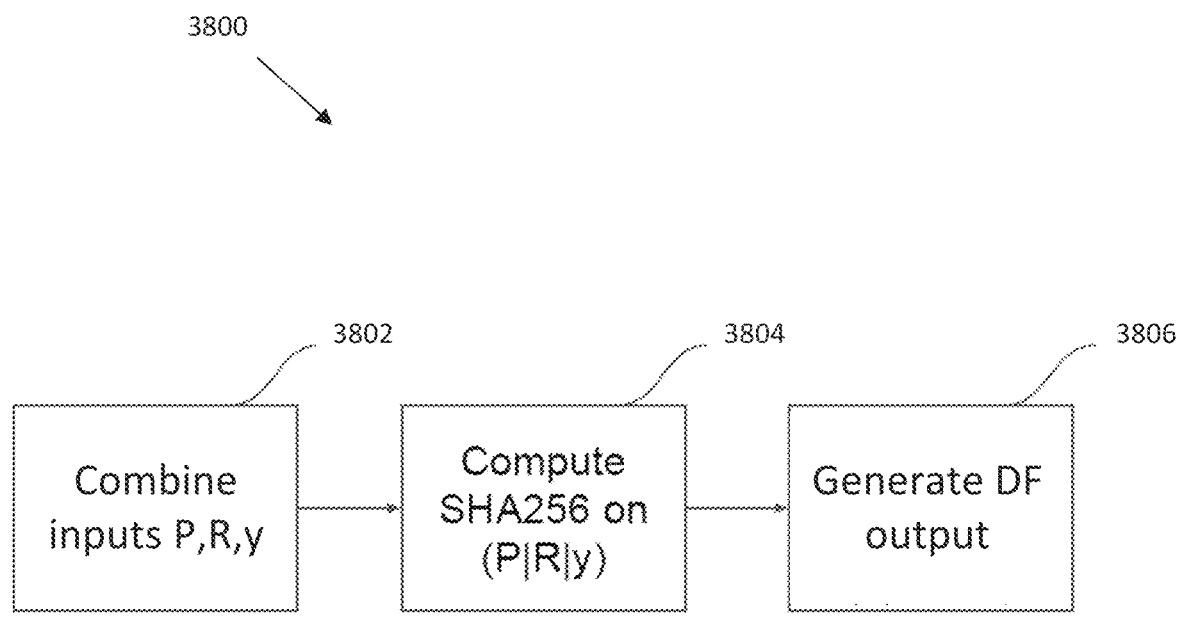
FIG. 38 conceptually illustrates an example of a process for generating a delay function output.

An example of a process for generating a delay function output is conceptually illustrated in FIG. 38. Processes for generating a delay function output can be executed by a miner. Process 3800 combines (3802) a proof (e.g. P), and selected value (e.g. R) and an additional input (e.g. y). In various embodiments, a proof (e.g. P), a selected value (e.g. R), and an additional input (e.g. y) can be combined using a process including (but is not limited to) concatenation. The concatenated value can be denoted as P|R|y. In various embodiments, the R value can be selected as previously described. In some embodiments, the additional input can be an optional input. The additional input can indicate a challenge associated with the proof, a counter identifying the ledger entries associated with the challenge, or related to a contract token issued by a miner to a proxy, another input, or a combination of such. As can readily be appreciated any of a variety of processes can be utilized to generate a concatenated value and/or combine information as part of a process of generating a delay function and the specific function that is utilized is largely dependent upon the requirements of a given application.

Process 3800 computes (3804) a hash function based on the combined proof, value, and additional input. In various embodiments the process computes SHA256 on (P|R|y). Other functions could be applied to P|R|y as described elsewhere. For example, the process can compute SHA512 (P|R|y)

Process 3806 generates (3806) a DF output. In various embodiments the DF output can be generated by truncating the output from 3804 (e.g., to its first 32 bits). In some embodiments truncating the output can speed up processing in determining a match.

While specific processes for generating delay function outputs are described above, any of a variety of processes can be utilized to generate a delay function output as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 39:
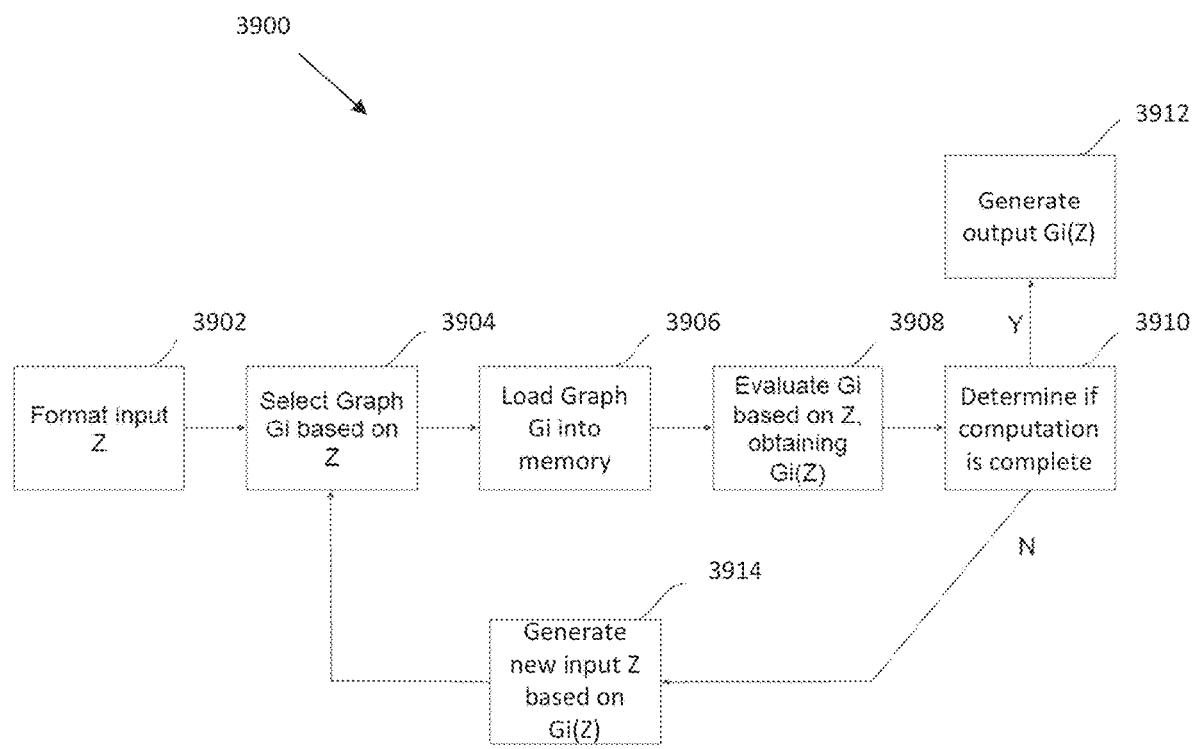
FIG. 39 conceptually illustrates another example of a process for generating a delay function output.

In various embodiments a delay function can be a memory-bound function. An example of a process for generating a delay function output is conceptually illustrated in FIG. 39. Processes for generating a delay function output can be executed by a miner.

Process 3900 formats (3902) an input. In various embodiments, the formatted input (e.g. Z) can be generated from an input (e.g. P|R|y, where | denotes concatenation). For example, Z can be set as Z=P|R|y, Z=SHA256(P|R|y), or another function.

Process 3900 selects (3904) a graph based on Z. In various embodiments, the graph can be selected based on a number of least significant bits associated with the formatted input. For example, by selecting i=LSB8(Z) to select a graph Gi based on an 8-bit portion of Z.

Process 3900 loads (3906) the graph (e.g. the graph Gi), or portions thereof, into memory. In some embodiments the graph (e.g. the graph Gi), or portions thereof can be loaded into the L1 cache of the processing system. In some embodiments the graph (e.g. the graph Gi), or portions thereof can be loaded into the L2 cache of the processing system. In accordance with various embodiments of the invention, the graph, or portions thereof, can be loaded into multiple caches.

Process 3900 evaluates (3908) the graph (e.g. the graph Gi) based on the formatted value (e.g. Z) or portions thereof. In various embodiments the process generates Gi(Z). In some embodiments, evaluating a graph can include selecting one or more godparent values based on Z. In many embodiments evaluating a graph can include loading one or more associated node values of the graph. In various embodiments, evaluating a graph can include computing a hash function of one or more loaded node values. In various embodiments, godparent values can be similar to parent values. Godparent values may differ from parent values in that the godparent values can be in positions selected based on a state.

Process 3900 determines (3910) if the computation is complete. If the computation is determined not complete the process 3900 can continue to 3914. If the computation is determined complete the process can continue to 3912. In various embodiments, the determination may include determining whether a specific number of iterations have been performed. In various embodiments determining if the computation is complete can include checking if Gi(Z) matches a target.

Process 3900 generates (3912) an output Gi(Z). In various embodiments the output Gi(Z) matches a target.

Process 3900 generates (3914) a new input Z based on Gi(Z). The process can then continue to 3904 for another iteration based on the new input Z. In some embodiments, Z may be set to Gi(Z), or a portion thereof.

While specific processes for generating a delay function output are described above, any of a variety of processes can be utilized to generate a delay function output as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

Figure 40:
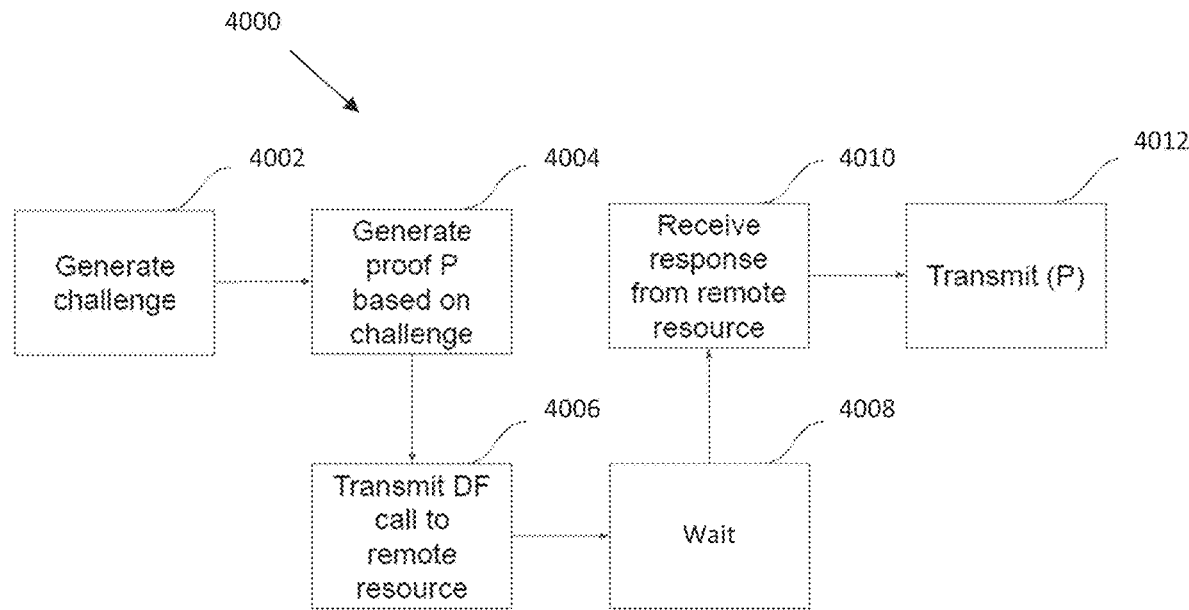
FIG. 40 conceptually illustrates an example of a process for generating a proof in series with a delay function performed by a network resource.

As previously described a delay function can be arranged in serial or parallel with a proof function. In various embodiments a delay function can be computed by a proxy. The proxy can be a cloud-based resource, a third-party computing system, or a network resource. An example of a process for generating a proof in series with a delay function performed by a network resource is conceptually illustrated in FIG. 40.

Process 4000 determines (4002) a challenge. In many embodiments, the challenge can be implemented using any of the various processes for determining challenges described herein.

Process 4000 generates (4004) a proof based on the challenge. The generated proof can be based on any of the various cryptographic systems discussed herein (e.g. composite proof, PoW, PoS, PoSt, PoB, PoM). As can readily be appreciated, the specific cryptographic system utilized to generate the proof is largely dependent upon the requirements of a given application. Process 4000 transmits (4006) a delay function call to a network resource. In various embodiments, the network resource can be a proxy, or a third-party computing system. In some embodiments the network resource can be any third-party or proxy computer system and communication with the network resource can be via any of a variety of methods of communication appropriate to the requirements of the specific application. In some embodiments, the network resource can be a centralized or decentralized network of computer resources. In many embodiments the network resource can be executable code residing within a public or private blockchain. For example, the executable code may reside within a smart contract. In this way, the network resource can be any computer system participating within the cryptographic system that has availability to execute the instructions contained within the smart contract. In various embodiments, unlike a conventional proxy, the proxy network resource may be unknown to the miner prior to issuing the delay function call to the cryptographic system requesting that a proxy determine the delay function.

Process 4000 waits (4008) while the remote resource performs a delay function. In embodiments where the proxy is unknown prior to the issuance of the delay function call, the response time may vary due to different systems being capable of computing the delay function at different speeds. For example, the delay function can be computed by an entity with high computational resources, such as a cloud server, to which the process transmits a delay function call and/or the delay function call is relayed by the cryptographic system. The network resource, which acts as a proxy to the process, can then solve the delay function. In some embodiments the network resource can submit the resulting values (e.g. P,R) to the ledger on behalf of the miner. In some embodiments the network resource can communicate the resulting values (e.g. P,R) back to the miner performing the process 4000.

In various embodiments of the invention, a proof can be based on an identifier related to the process. In various embodiments, the network resource can include, as an input to the delay function, an identifier associated with the network resource. For example, the proxy can include a public key (e.g. pk) associated with the network resource. A network resource public key can be associated with a value (e.g. a change in a ledger balance) based on the proof P and the associated delay function value R being accepted as the winning mining instance. For example, the delay function can use (P, R, pk) or a variation as an input. In some embodiments, the delay function can be partially precomputed based on the pk value. For example, a network resource may precompute a portion of a delay function related to the private key of the network resource. The precomputed portion can be stored. In some embodiments, the network resource computes a portion of the delay function associated with (P, R) when these values are received.

In many embodiments, the proof P is included in a request to perform a delay function from a process to a network resource. In some embodiments, the requirements for the execution of the delay function can be determined by configuration parameters. The configuration parameters may include information related to the proof protocol, the challenge, and/or other information. For example, a process, having completed the challenge, can be required to ping a network resource and await a response. In some cases, the process can wait for the response, or until a preset time-out occurs. The ping, may include information related to the requested duration of the delay function. The ping can include configuration parameters, network time information, expected network delay compensation, and/or security information. As can readily be appreciated, the specific method for executing the delay function is largely dependent upon the requirements of a given application.

In some embodiments, the network resource can respond to the ping. The process can receive a response from the network resource. The response can include simple acknowledgment to continue, an indication of delay completed, or a secure communication containing protections to prevent the process from cheating and abusers from interrupting communications. For example, the network resource can cause a delay by performing a delay function. In various embodiments, the network resource can issue a digital signature attesting to the delay. The digital signature can be associated with the network resource. The digital signature and/or the network resource can be associated with a trust rating. The trust rating can be related to the past performance of the network resource.

Referring again to FIG. 40, the process 4000 receives (4010) a response from the remote resource. In various embodiments the response can include an indication, which can be indicative that the delay function has been completed. A miner can then send (4012) the proof and the indication to the cryptographic system. In various embodiments the proof and indication can form a composite proof. In various embodiments, a process can include one or more configuration parameters when sending a proof. For example, the process can include a difficulty value associated with the proof. The process can also submit a value d along with P and R. As can readily be appreciated, the specific proof that is sent and/or any information accompanying the proof are largely dependent upon the requirements of a given application.

In various embodiments, the cryptographic system includes a verifier that can verify the transmitted proof in a manner consistent with the associated proof function approach. Furthermore, the verifier can verify the delay function solution R by evaluating the delay function on (P, R) and determining whether it matches a target value. In many embodiments, a verifier evaluation of a delay function based on (P, R) can be similar to the process used to generate the successful delay function proof based on (P, R).

In a number of embodiments, bounty hunters as described herein can provide proof of cheating to get rewards. For example, a bounty hunter can provide a time-stamped first response. The first response is sent by the network resource in response to a first message from a miner or from the bounty hunter. The first response is related to the receipt of a request for a delay function for proof P. The bounty hunter can further provide a time-stamped second response. The second response is sent by the network resource is response to a second message from the miner or bounty hunter. If the two time stamps indicate that the requisite time was not spent by the network resource, then this can be proof of cheating. In some embodiments, proof of cheating can be submitted by the bounty hunter for a reward. Other methods for identifying cheating by the network resource are also possible. For example, two separate bounty hunters can collaborate to generate the proof of cheating. As can readily be appreciated, one or more bounty hunters can gather any of a variety of pieces of information that can be utilized in the evaluation of whether anomalous behavior is occurring within a cryptographic system as appropriate to the requirements of specific applications in accordance with various embodiments of the invention.

While specific processes for generating proofs in series with delay functions utilizing network resources are described above, any of a variety of processes can be utilized to generate a proof in series with a delay function performed by a network resource as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to a cryptographic system, the techniques disclosed herein may be used in any type of cryptographic system. In particular, the techniques disclosed herein may be used in a system incorporating one of, or a combination of cryptographic systems including PoW, PoS, PoSt, PoB, PoM. The techniques disclosed herein may be used within any of the rich media systems, permissioned blockchains, composite cryptographic systems, reparameterization techniques, attack detection techniques, qualitative-qualifying proof techniques, secure delay function techniques, proof of memory mechanisms and/or proof of bus mechanisms described elsewhere herein.

In the following sections the implementation of composite cryptographic systems, configuration parameters, attack detection techniques, cross-timestamping, qualifying proof techniques, proof of memory mechanisms, proof of bus mechanisms, and secure delay function techniques in components of systems such as (but not limited to) rich media systems and permissioned blockchains in accordance with various embodiments of the invention are described.

NFT Platform Constituent Devices and Applications

A variety of computer systems that can be utilized within NFT platforms and systems that utilize NFT blockchains and incorporate cryptographic systems that include one or more of the various features described above in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
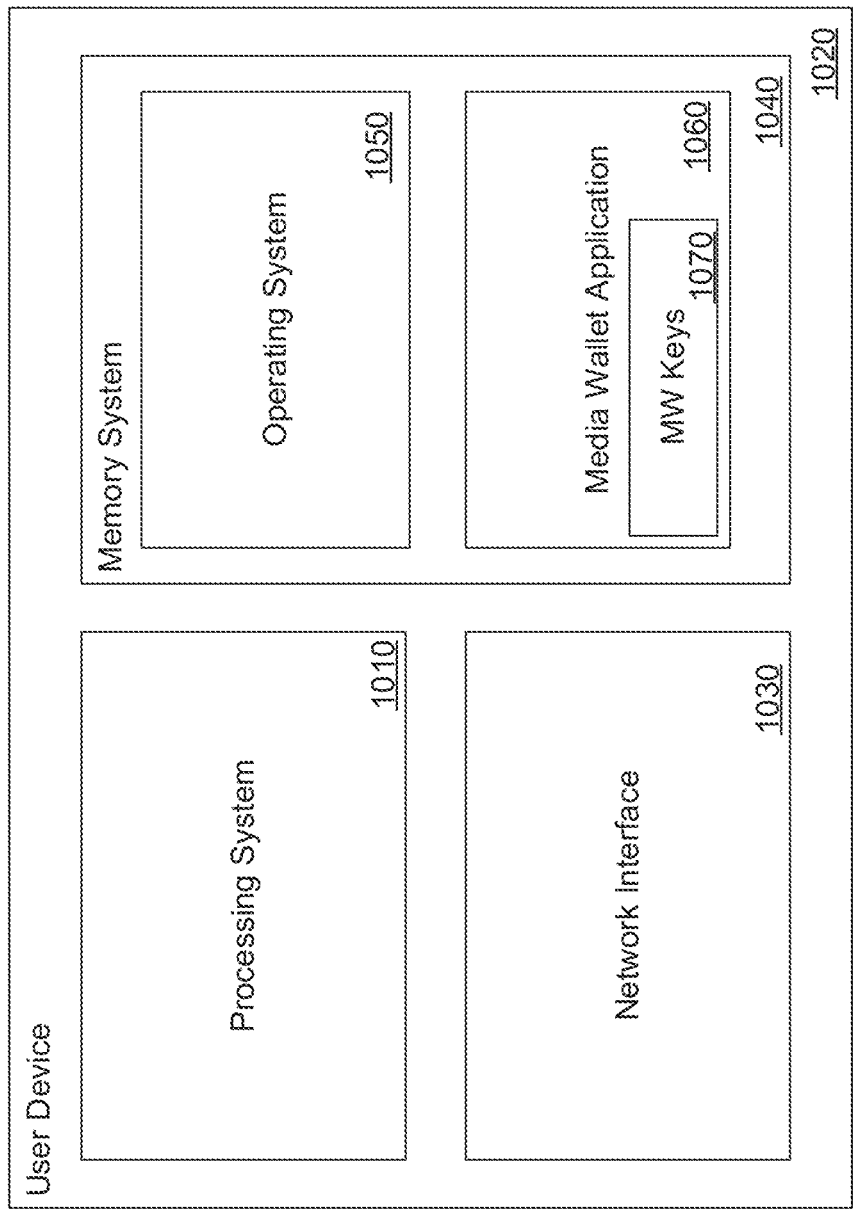
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
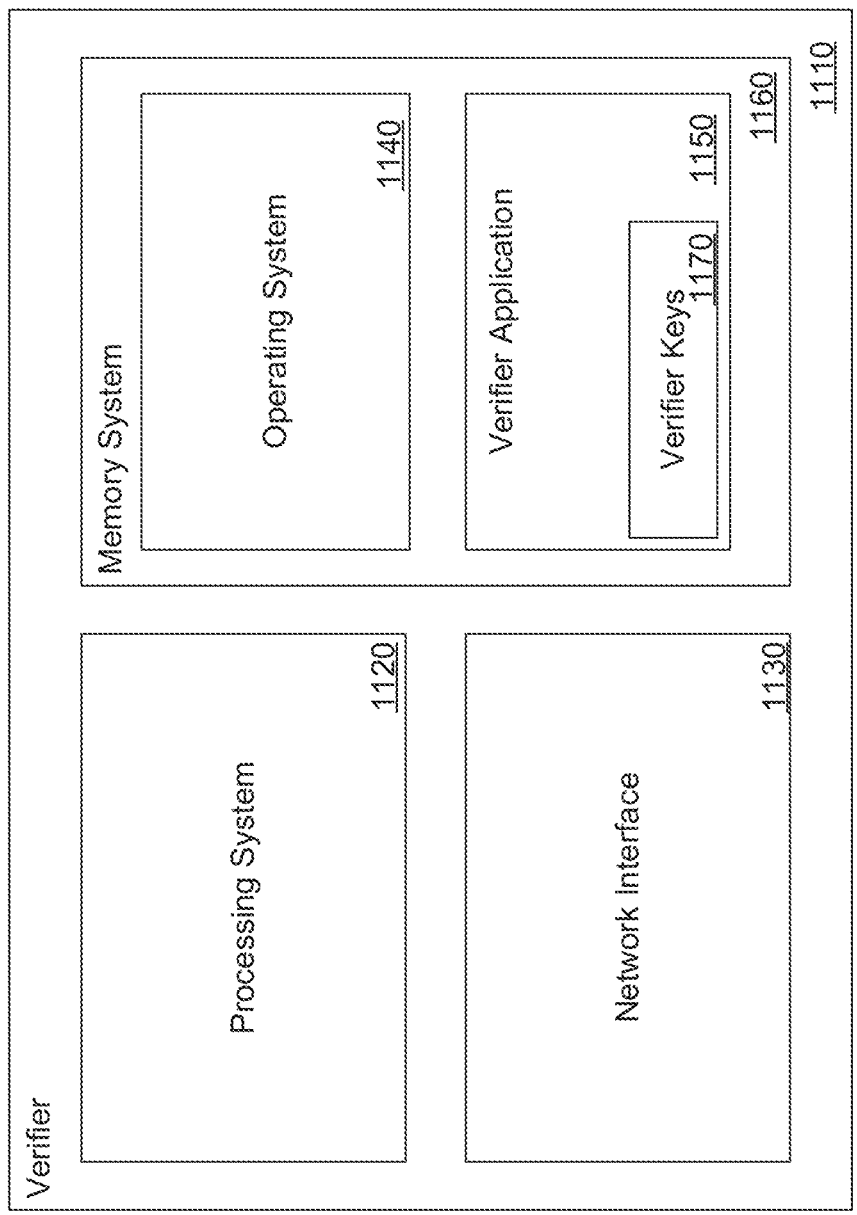

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
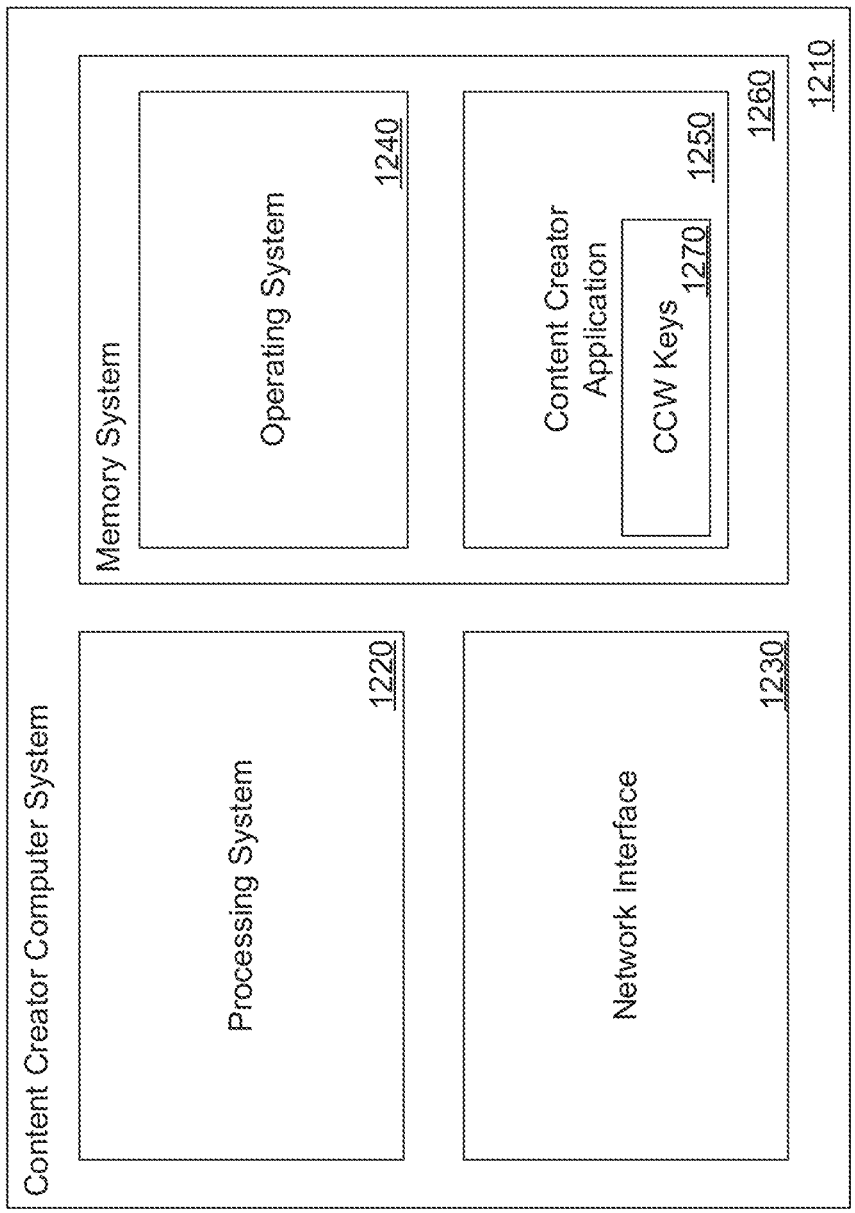

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but is not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to the peruse the content; whether they can place bids to purchase the content; whether they can borrow the content, and/or whether they are biometrically authenticated.

Figure 13:
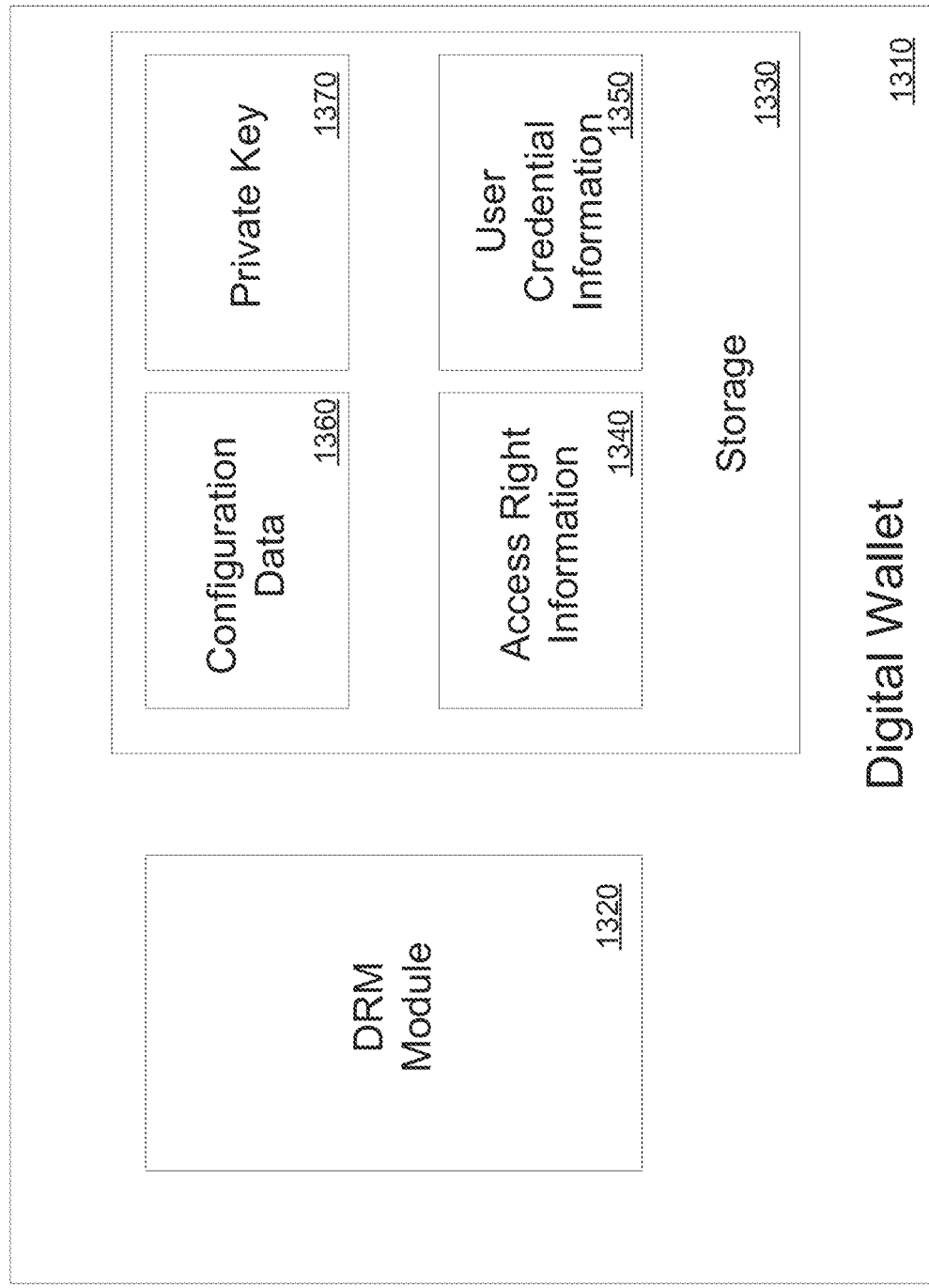
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions."

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
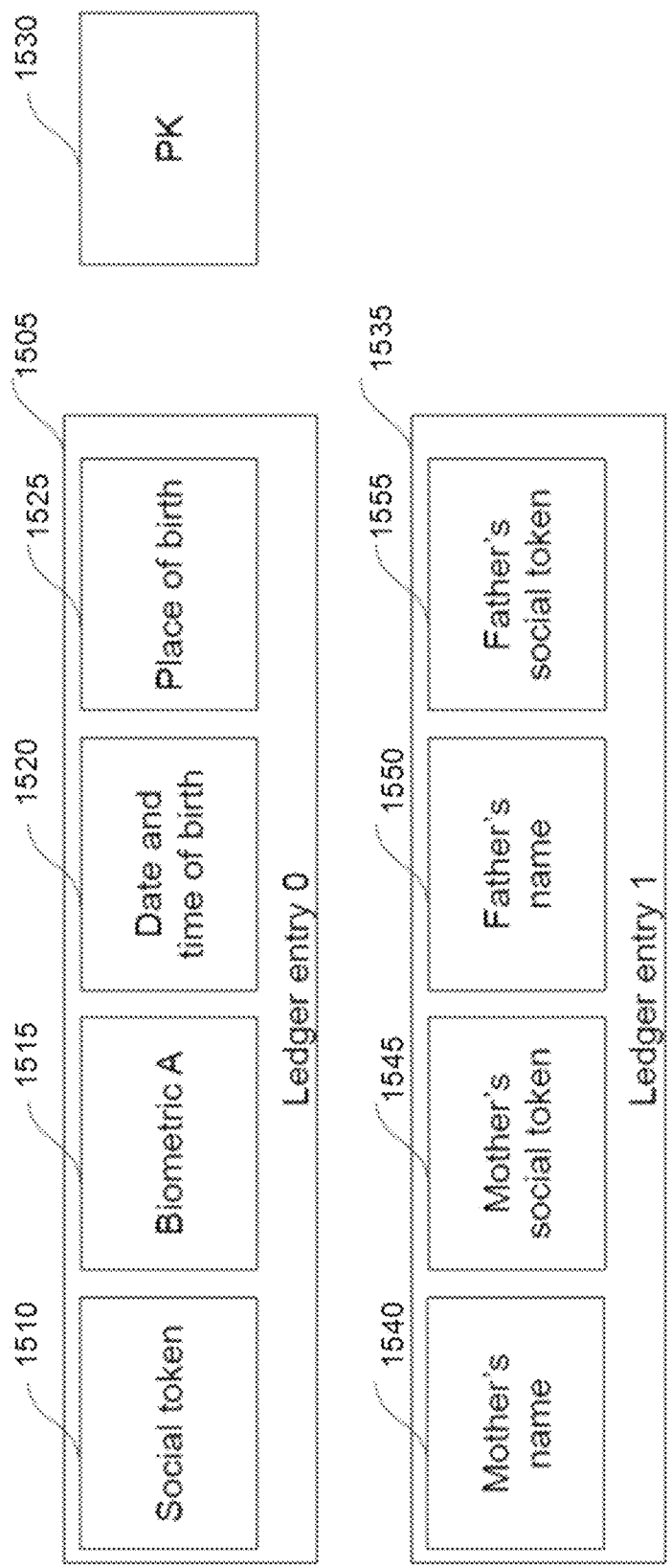
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form.

In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
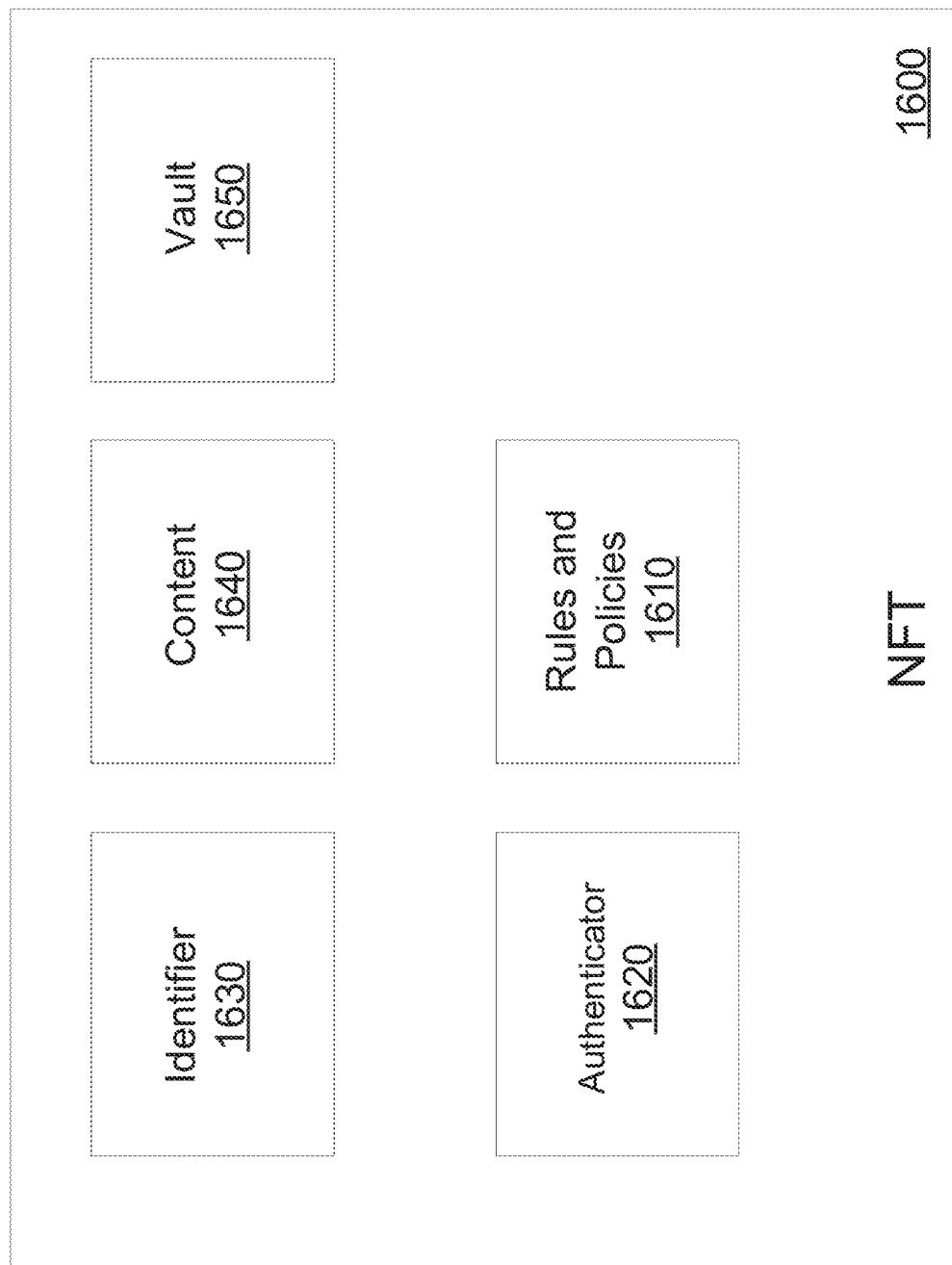
FIGS. 16A-16B illustrate an NFT arrangement relationship with corresponding physical content in accordance with an embodiment of the invention.
Figure 16B:
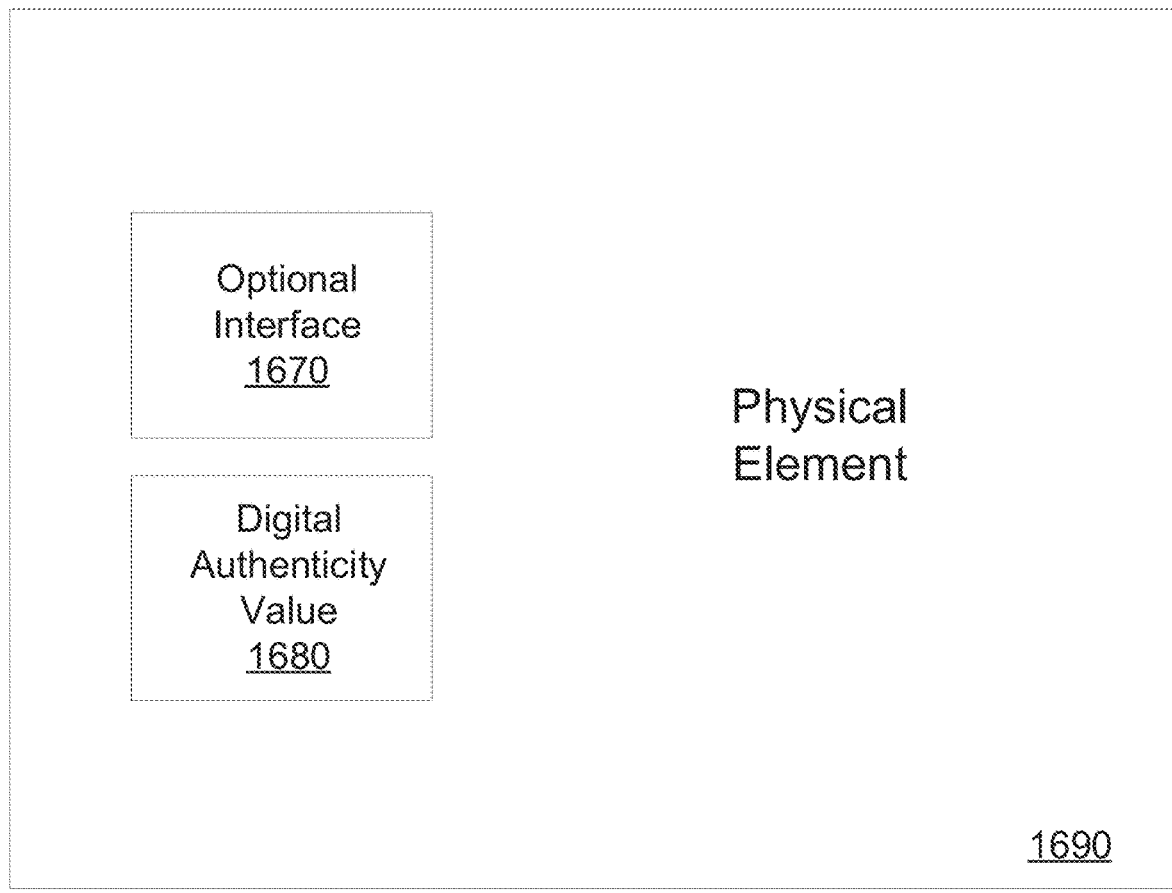

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
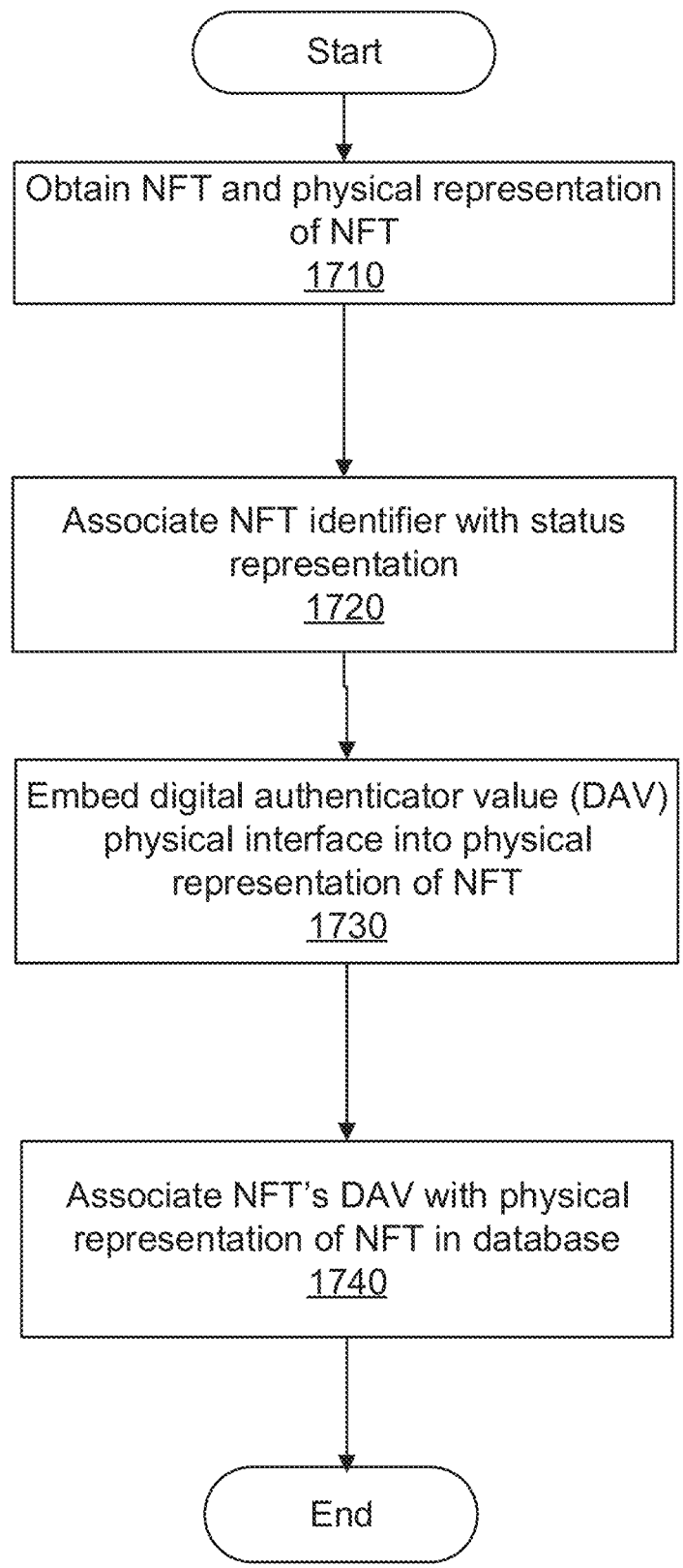
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A device configured to add a block to a distributed ledger maintained by a composite cryptographic system, the device comprising:
   a network interface;
   memory; and
   a processor, the processor configured to:
      obtain a first proof using a first cryptographic system, wherein the first proof utilizes a Proof of Bus mechanism in which bus bandwidth acts as a limited resource;
      obtain a second proof using a second cryptographic system; and
      broadcast a block to securely add the block to a distributed ledger, wherein the block is capable of being validated by using the first cryptographic system to generate the first proof and by using the second cryptographic system to generate the second proof.

2. The device of claim 1, wherein:
   the processor is further configured to receive the block; and
   the first proof is obtained based on the block, and the second proof is obtained based on the block.

3. The device of claim 1, wherein the first proof is generated based on an iterative process, and the second proof is generated based on an iterative process.

4. The device of claim 1, wherein the processor is further configured to generate the block.

5. The device of claim 1, wherein the second proof is obtained based on at least the first proof.

6. The device of claim 1, wherein the first cryptographic system utilizes a first cryptographic process and the second cryptographic system utilizes a different cryptographic process to the first cryptographic process.

7. The device of claim 1, wherein the first proof and the second proof are each constituent proofs and the processor is further configured to combine the first proof and the second proof to obtain a composite proof.

8. The device of claim 1, wherein the first cryptographic system utilizes a memory bound function.

9. The device of claim 1, wherein obtaining a first second proof is based on a configuration parameter.

10. The device of claim 1, wherein:
the first cryptographic system and the second cryptographic system form a composite cryptographic system; and
a characteristic of a composite cryptographic system is based on a configuration parameter.

11. The device of claim 9, wherein the processor is further configured to vary the configuration parameter in response to a detected condition.

12. The device of claim 9, wherein the configuration parameter is varied in response to a detected attack.

13. The device of claim 9, wherein the configuration parameter is a difficulty parameter associated with the second cryptographic system.

14. The device of claim 1, wherein the block includes the first proof.

15. The device of claim 1, wherein obtaining a first proof is based on a first modified challenge.

16. The device of claim 1, wherein obtaining a second proof is based on a second modified challenge.

17. The device of claim 15, wherein the first modified challenge is based on a first challenge and a second challenge.

18. The device of claim 16, wherein the second modified challenge is based on a first challenge, a second challenge, and a third challenge.

19. The device of claim 18, wherein a third challenge is based on the first proof.

20. The device of claim 17, wherein the first challenge is based on a state of the distributed ledger.

21. The device of claim 17, wherein the second challenge is based on a state of the distributed ledger.

22. The device of claim 15, wherein the first modified challenge is generated by selecting a portion of a combination of a first challenge and a second challenge.

23. The device of claim 22, wherein the selected portion has a length corresponding to an input requirement of the first cryptographic system.

24. The device of claim 16, wherein the second modified challenge is generated by selecting a portion of a combination of a first challenge, a second challenge, and a third challenge.

25. The device of claim 24, wherein the selected portion has a length corresponding to an input requirement of the second cryptographic system.

* * * * *